(12) United States Patent
Tonomura et al.

(10) Patent No.: US 11,855,894 B2
(45) Date of Patent: Dec. 26, 2023

(54) CONTROL SYSTEM, SERVER, TERMINAL DEVICE, CONTROL DEVICE, COMMUNICATION CONTROL METHOD, AND RECORDING MEDIUM

(71) Applicant: Mitsubishi Electric Corporation, Tokyo (JP)

(72) Inventors: Takayoshi Tonomura, Tokyo (JP); Takamitsu Yamada, Tokyo (JP); Kazuaki Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/998,873

(22) PCT Filed: May 13, 2021

(86) PCT No.: PCT/JP2021/018170
§ 371 (c)(1),
(2) Date: Nov. 15, 2022

(87) PCT Pub. No.: WO2022/074871
PCT Pub. Date: Apr. 14, 2022

(65) Prior Publication Data
US 2023/0216793 A1 Jul. 6, 2023

(30) Foreign Application Priority Data
Oct. 6, 2020 (WO) .................. PCT/JP2020/037826

(51) Int. Cl.
*H04L 45/745* (2022.01)
*H04L 45/00* (2022.01)
(Continued)

(52) U.S. Cl.
CPC ............ *H04L 45/745* (2013.01); *H04L 45/54* (2013.01); *H04L 69/22* (2013.01); *H04L 61/4511* (2022.05)

(58) Field of Classification Search
CPC ... H04L 12/4633; H04L 45/54; H04L 45/745; H04L 61/4511; H04L 69/22
See application file for complete search history.

(56) References Cited

U.S. PATENT DOCUMENTS 6,721,353 B1 * 4/2004 Taubert ............... H04L 12/4633
375/220
7,379,454 B2 * 5/2008 Ogasawara ............. H04L 45/54
370/466

(Continued)

FOREIGN PATENT DOCUMENTS

JP 07-250100 A 9/1995
JP 10-013469 A 1/1998

(Continued)

OTHER PUBLICATIONS

International Search Report of the International Searching Authority dated Dec. 15, 2020 for the corresponding international application No. PCT/JP2020/037826 (and English translation).

(Continued)

*Primary Examiner* — Thomas R Cairns
*Assistant Examiner* — Kai Chang
(74) *Attorney, Agent, or Firm* — POSZ LAW GROUP, PLC

(57) ABSTRACT

A cloud server includes an equipment information storage that stores equipment table information; an equipment controller that generates control information; an encapsulator that generates control notification information by encapsulating the control information and adding header information for specifying a control device as a sending destination; and a notification information sender that sends the control (Continued)

notification information to the control device based on the header information. Upon acquiring the control notification information from the server, the control device removes the header information from the control notification information and decapsulates to extract the control information, and sends the extracted control information to a controlled equipment.

19 Claims, 38 Drawing Sheets

(51) Int. Cl.
*H04L 69/22* (2022.01)
*H04L 61/4511* (2022.01)

(56) References Cited

U.S. PATENT DOCUMENTS

| | | | | |
|---|---|---|---|---|
| 9,385,886 | B2* | 7/2016 | Lin | H04L 47/12 |
| 10,182,132 | B2* | 1/2019 | Zheng | H04L 41/083 |
| 2003/0202536 | A1* | 10/2003 | Foster | H04L 69/08 |
| | | | | 370/469 |
| 2005/0083934 | A1* | 4/2005 | Tan | H04L 9/40 |
| | | | | 370/465 |
| 2005/0220099 | A1 | 10/2005 | Igarashi | |
| 2008/0235358 | A1 | 9/2008 | Moribe et al. | |
| 2010/0166017 | A1* | 7/2010 | Na | H04L 12/4633 |
| | | | | 370/474 |
| 2014/0334490 | A1 | 11/2014 | Nakata et al. | |
| 2016/0081127 | A1 | 3/2016 | Lee et al. | |

FOREIGN PATENT DOCUMENTS

| | | |
|---|---|---|
| JP | 2005-286883 A | 10/2005 |
| JP | 2008-236344 A | 10/2008 |
| JP | 2008-288771 A | 11/2008 |
| JP | 2009-077017 A | 4/2009 |
| JP | 2011-004424 A | 1/2011 |
| JP | 2014-220610 A | 11/2014 |
| JP | 2020-014134 A | 1/2020 |

OTHER PUBLICATIONS

International Search Report of the International Searching Authority dated Jun. 29, 2021 for the corresponding international application No. PCT/JP2021/018170 (and English translation).

Japanese Office Action dated Sep. 14, 2021 issued in corresponding JP Patent Application No. 2021-544417 (and the English translation).

Japanese Notice of Allowance dated Oct. 26, 2021 issued in corresponding JP Patent Application No. 2021-544417 (and the English translation).

* cited by examiner

FIG. 5

EQUIPMENT INFORMATION STORAGE 231

MAC ADDRESS INFORMATION (CONTROL DEVICE)

MAC ADDRESS INFORMATION (CONTROL DEVICE) : AA-BB-CC-DD-EE-FF

| MAC ADDRESS INFORMATION | IP ADDRESS INFORMATION | MODEL TYPE INFORMATION | IDENTIFICATION NUMBER INFORMATION |
|---|---|---|---|
| AA-BB-CC-EE-EE | 192.168.32.101 | DAT1 (AIR CONDITIONER) | ID1 |
| AA-BB-CC-FF-FF | 192.168.32.102 | DAT2 (TELEVISION) | ID2 |
| ⋮ | ⋮ | ⋮ | ⋮ |

CONTROL SYSTEM, SERVER, TERMINAL DEVICE, CONTROL DEVICE, COMMUNICATION CONTROL METHOD, AND RECORDING MEDIUM

CROSS REFERENCE TO RELATED APPLICATIONS

This application is a U.S. national stage application of International Patent Application No. PCT/JP2021/018170 filed on May 13, 2021, which claims priority to International Patent Application No. PCT/JP2020/037826 filed on Oct. 6, 2020, the contents of which are incorporated herein by reference.

TECHNICAL FIELD

The present disclosure relates to a control system, a server, a terminal device, a control device, a communication control method, and a program.

BACKGROUND

A proxy device has been proposed that (i) is connected to a home network, (ii) for a message that can only be communicated within the home network and that cannot be sent across the Internet, encapsulates the message so as to enable communication across the Internet and then sends the message across the Internet, and (iii) when an encapsulated message is received, decapsulates the message and then sends the message within the home network to which the proxy device is connected (for example, see Patent Literature 1). Here, when a DLNA® compliant equipment within one home network performs multicast transmission of a search message, the proxy device within the home network to which the equipment belongs encapsulates the search message and then sends the search message to the Internet via a home router. Meanwhile, a proxy device within another home network decapsulates the received search message and then sends the message to a DLNA® compliant equipment within the home network to which that proxy device belongs. Then, when the DLNA® compliant equipment sends a search response to the search message, the proxy device within the home network to which that DLNA® compliant equipment belongs encapsulates the received response by adding to the received search response the IP address of the DLNA® compliant equipment that is the sender of the search response and the IP address of the DLNA® compliant equipment that is the sender of the corresponding search message, and then sends the encapsulated search response to the Internet via a home router.

PATENT LITERATURE

Patent Literature 1: Unexamined Japanese Patent Application Publication No. 2008-236344

Some home routers have dynamic host configuration protocol (DHPC) functions for dynamically assigning IP addresses to equipment within the home network to which the home router belongs. For various reasons, such home routers may reassign the IP addresses to the equipment within the home network. In such a case, with the technology described in Patent Literature 1, the IP address of each of the equipment within the one home network recognized by the equipment within the other home network differs from the IP address actually assigned to each of the equipment within the one home network. As a result, the equipment within the other home network may send an electronic message to an equipment different from the intended equipment within the one home network.

SUMMARY

The present disclosure is made in view of the aforementioned circumstances, and an objective of the present disclosure is to provide a control system, a server, a terminal device, a control device, a communication control method, and a program that enable appropriately sending control information to an equipment that belongs to a local network in which the IP address assigned to the equipment can dynamically change.

To achieve the aforementioned objective, a control system according to the present disclosure includes:
  a control device to control an equipment; and
  a server connected to the control device across a broadband network,
  the server including
    an equipment information storage to store equipment table information in which equipment identification information unique to the equipment is associated with device identification information, the equipment identification information identifying the equipment on a datalink layer within a local network to which the equipment belongs, the device identification information identifying the control device to control the equipment on the datalink layer within the local network,
    an equipment controller to generate control information including control parameter information for controlling the equipment, the equipment identification information, and the device identification information stored in the equipment information storage and corresponding to the equipment identification information,
    a first encapsulator to generate control notification information by encapsulating the control information and adding first header information for specifying the control device as a sending destination, and
    a first notification information sender to send, based on the first header information, the control notification information to the control device,
  the control device including
    a first decapsulator to, when the control notification information to which the first header information is added is received from the server, remove the first header information from the control notification information and decapsulate to extract the control information, and
    an equipment electronic message sender to send, based on the equipment identification information included in the control information, the control information to the equipment.

According to the present disclosure, the server includes the equipment information storage that stores the equipment identification information identifying the equipment on the datalink layer within the local network to which the equipment belongs in association with the device identification information identifying on the datalink layer the control device that belongs to the local network. Moreover, the server sends, to the control device, the control notification information generated by encapsulating the control information that includes the control parameter information, the equipment identification information, and the device identification information stored in the equipment information storage and corresponding to the equipment identification information. Additionally, upon receiving the control notification information, the control device decapsulates the received control notification information to extract the control information, and sends the acquired control information to the equipment based on the equipment identification information included in the control information. This configuration enables, in cases of changing in the IP addresses assigned to the equipment on a higher level than the datalink layer in the local network to which the equipment belongs, such as a level of the network layer, appropriately sending the control information to the equipment identified by the equipment identification information without acquiring the IP address information of that equipment.

BRIEF DESCRIPTION OF DRAWINGS

FIG. 5 is a drawing illustrating an example of information stored in an equipment information storage according to Embodiment 1;

DETAILED DESCRIPTION

Embodiment 1

Hereinafter, a control system according to embodiments of the present disclosure is described while referencing the attached drawings. The control system according to the present embodiment includes a control device that controls an equipment, and a server that is connected to the control device across a broadband network. Here, the server includes an equipment information storage that stores equipment table information in which equipment identification information that is unique to the equipment and that identifies the equipment on a datalink layer within a local network to which the equipment belongs is associated with device identification information that identifies the control device to control the equipment on the datalink layer within the local network; an equipment controller that generates control information including control parameter information for controlling the equipment, the equipment identification information, and the device identification information stored in the equipment information storage and corresponding to the equipment identification information; a first encapsulator that generates control notification information by encapsulating the control information and adding first header information for specifying the control device as a sending destination; and a first notification information sender that sends the control notification information to the control device on the basis of the first header information. Additionally, the control device includes a first decapsulator that, when the control notification information is received from the server, removes the first header information from the control notification information and decapsulates to extract the control information, and an equipment electronic message sender that sends the control information to the equipment on the basis of the equipment identification information included in the control information.

Figure 1:
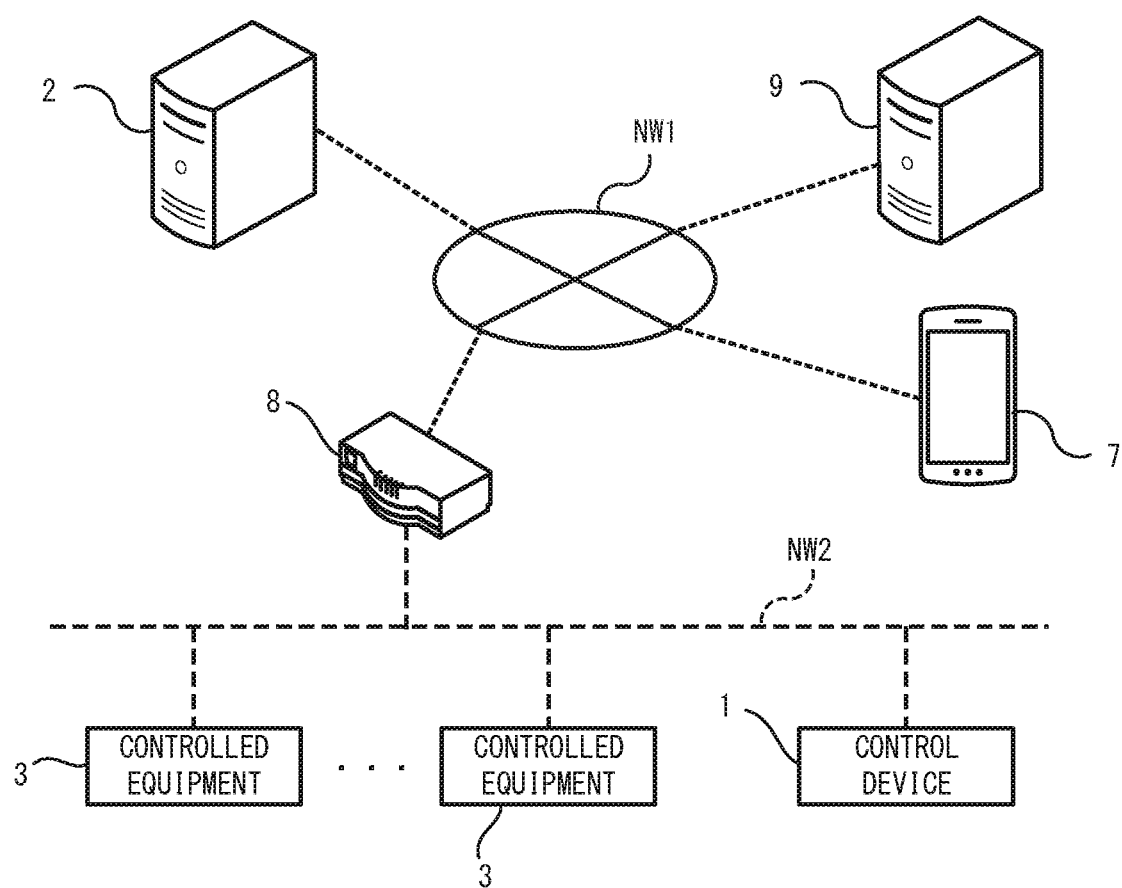
FIG. 1 is a schematic configuration drawing of a control system according to Embodiment 1 of the present disclosure.

As illustrated in FIG. 1, the control system according to the present embodiment includes a controlled equipment 3 installed in a house, a control device 1 that controls the controlled equipment 3, and a cloud server 2. Here, the controlled equipment 3 and the control device 1 are capable of communicating with each other across a local network NW2 such as a wireless local area network (LAN). The cloud server 2 is capable of communicating across a broadband network NW1 such as the Internet and a broadband router (hereinafter referred to as "BBR") 8. Furthermore, a terminal device 7 possessed by a user is connected to the broadband network NW1. Additionally, a domain name system (DNS) server 9, that associates domain name information included in uniform resource locator (URL) information and an IP address of the server to which that domain name information is assigned, and manages that information, is connected to the broadband network NW1. The controlled equipment 3 is, for example, an air conditioner including a wireless module, and communicates with the BBR 8 and the control device 1 across the local network NW2. Additionally, the controlled equipment 3 includes a non-illustrated address acquirer that acquires IP address information from the BBR 8 by sending connection request information to the BBR 8, and a non-illustrated address storage that stores the IP address information that the address acquirer acquires from the BBR 8. Furthermore, the controlled equipment 3 includes a non-illustrated address resolution protocol (ARP) replier that, upon acquiring ARP request information from the BBR 8, sends, in accordance with the ARP request information and to the BBR 8, ARP reply information including the IP address information assigned to the controlled equipment 3 and MAC address information of the controlled equipment 3.

The terminal device 7 is, for example, a smartphone, and when the user performs an operation for changing an operating setting of the controlled equipment 3 while an application for operating the controlled equipment 3 is running, the terminal device 7 sends, to the cloud server 2, operating setting change command information commanding a change of the operating setting of the controlled equipment 3. Upon receiving DNS inquiry information from the BBR 8, the DNS server 9 identifies the IP address information corresponding to the domain name information included in the DNS inquiry information, and sends DNS reply information including the identified IP address information to the BBR 8.

Figure 2:
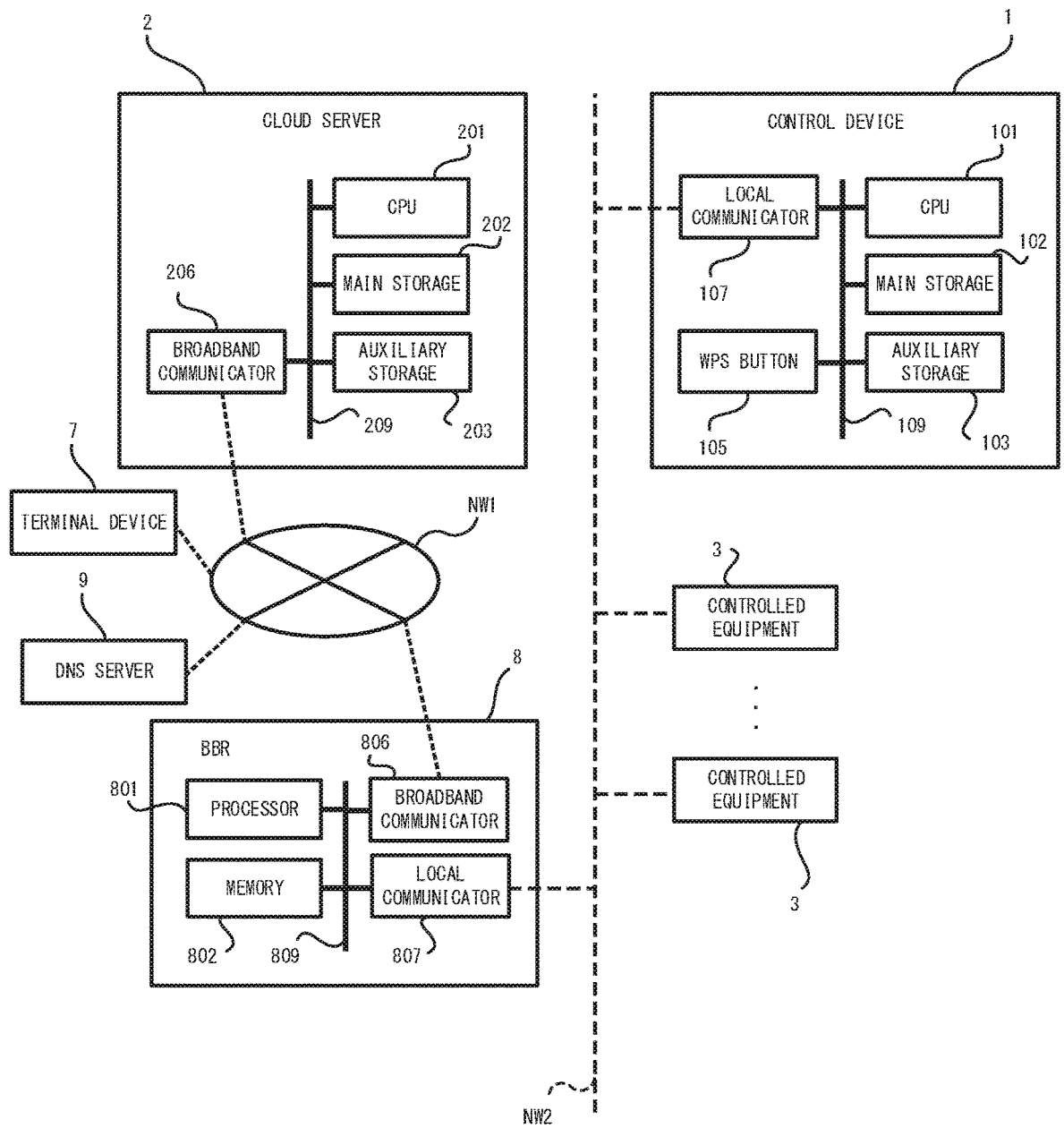
FIG. 2 is a block diagram illustrating the hardware configuration of the control system according to Embodiment 1.
Figure 3:
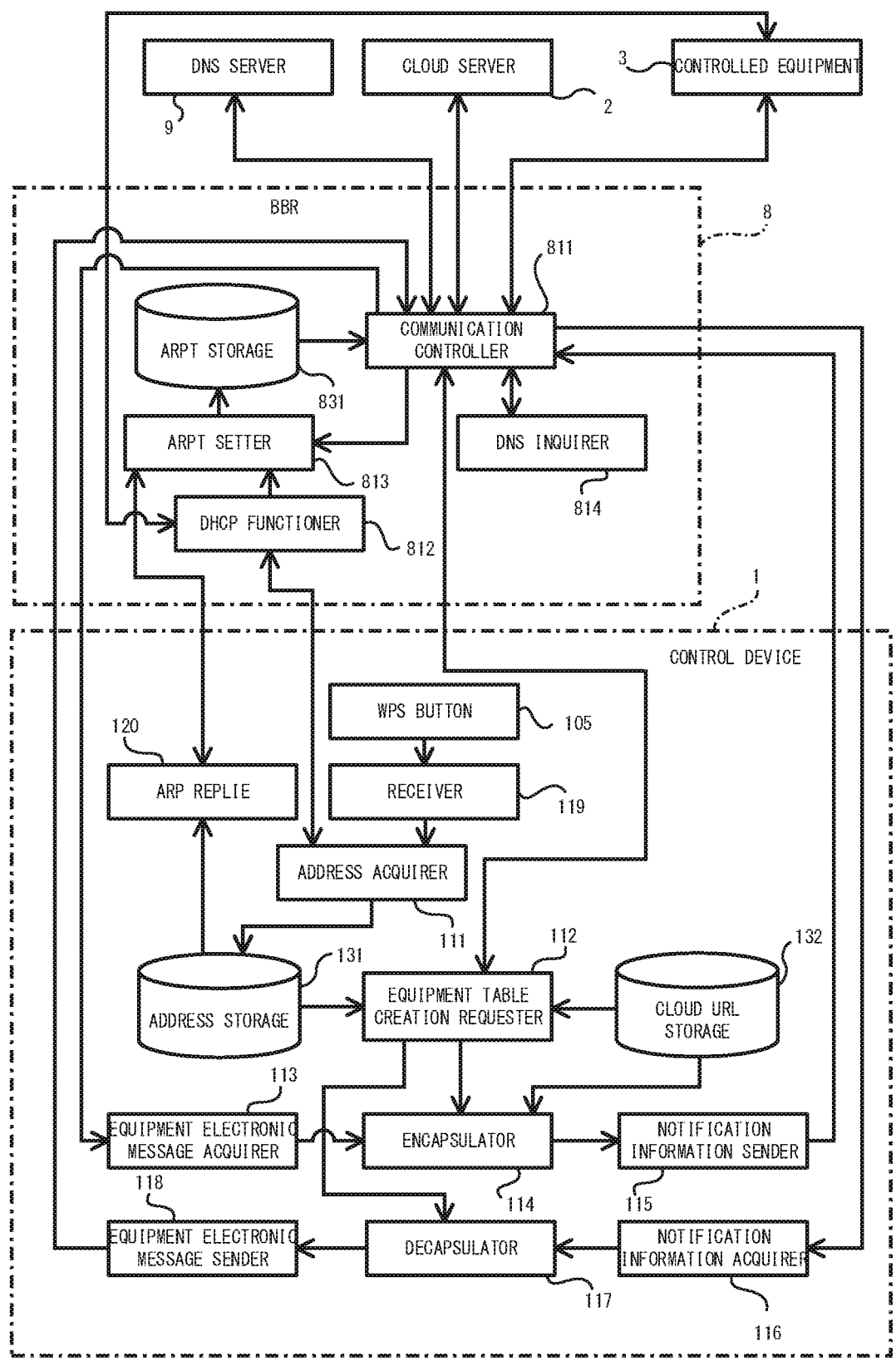
FIG. 3 is a block diagram illustrating the functional configuration of a control device and a broadband router according to Embodiment 1.

As illustrated in FIG. 2, the BBR 8 includes a processor 801, a memory 802, a broadband communicator 806, a local communicator 807, and a bus 809 that connects the various components. The memory 802 is, for example, non-volatile memory such as semiconductor memory, and stores a program for achieving the various functions of the BBR 8. The broadband communicator 806 communicates with the cloud server 2 across the broadband network NW1. The local communicator 807 includes, for example, a wireless module, and carries out wireless communication between the controlled equipment 3 and the control device 1. Here, the wireless module includes a signal generation circuit that generates a wireless signal and an antenna and, communicates using, for example, a communication protocol with a data link layer such as IEEE802.11a, b, g, n, or the like. The processor 801 executes the program stored in the memory 802 to function as a communication controller 811, a DHCP functioner 812, an ARP table setter (hereinafter referred to as "ARPT setter") 813, and a DNS inquirer 814, as illustrated in FIG. 3. Additionally, as illustrated in FIG. 3, the memory 802 illustrated in FIG. 2 includes an ARP table storage (hereinafter referred to as "ARPT storage") 831 that stores ARP table information of the local network NW2.

Upon receiving equipment state information sent from the controlled equipment 3 to the IP address of the control device 1, the communication controller 811 sends, on the basis of the ARP table information stored in the ARPT storage 831, the received equipment state information to the control device 1. Additionally, upon receiving control information sent from the control device 1 to the IP address of the controlled equipment 3, the communication controller 811 sends the received control information to the controlled equipment 3. Furthermore, upon receiving control notification information or preparation completion notification information sent from the cloud server 2 to the IP address of the control device 1, the communication controller 811 sends, on the basis of the ARP table information stored in the ARPT storage 831, the received control notification information or the preparation completion notification information to the control device 1. Additionally, upon receiving state notification information including the domain name information of the cloud server 2 from the control device 1, the communication controller 811 extracts the domain name information from the state notification information and notifies the DNS inquirer 814. Moreover, when the communication controller 811 is notified by the DNS inquirer 814 of the IP address information of the DNS server 9, the communication controller 811 sends, to the DNS server 9, DNS inquiry information including the domain name information of the cloud server 2. Additionally, upon acquiring the IP address information of the cloud server 2 from the DNS server 9, the communication controller 811 replaces the domain name information of the state notification information acquired from the control device 1 with the acquired IP address information and sends the resulting IP address information to the cloud server 2. Here, a communication protocol with higher reliability than user datagram protocol (UDP), such as transmission control protocol (TCP), is used as the communication protocol of the transport layer for the state notification information.

Upon receiving connection request information from the controlled equipment 3 or the control device 1, the DHCP functioner 812 identifies, from among a predetermined plurality of IP addresses, the IP address assigned to the controlled equipment 3 or the control device 1 that is the sender of the connection request information. Moreover, the DHCP functioner 812 sends, to the controlled equipment 3 or the control device 1 that is the sender, IP address information expressing the identified IP address. Specifically, upon receiving the connection request information (DHCP discover) from the controlled equipment 3 or the control device 1, the DHCP functioner 812 identifies the IP address assigned to the controlled equipment 3 or the control device 1, and sends the identified IP address information (DHCP offer) to the controlled equipment 3 or the control device 1. Thereafter, upon receiving connection request information (DHCP request) for requesting the IP address expressed by the IP address information sent from the controlled equipment 3 or the control device 1, the DHCP functioner 812 sends the IP address information (DHCP response) to the controlled equipment 3 or the control device 1.

The ARPT setter 813 notifies the communication controller 811 of ARP request information. At this time, the communication controller 811 sends, to the controlled equipment 3 and the control device 1, the ARP request information notified by the ARPT setter 813. Thus, the communication controller 811 acquires ARP reply information including the IP address information and the MAC address information from the controlled equipment 3 and the control device 1, and notifies the ARPT setter 813 of the acquired ARP reply information. Upon acquiring the ARP reply information, the ARPT setter 813 extracts the IP address information and the MAC address information included in the ARP reply information, associates these pieces of information, and stores the associated information in the ARPT storage 831. Upon notification of the DNS inquiry information from the communication controller 811, the DNS inquirer 814 notifies the communication controller 811 of the IP address information of the DNS server 9.

The control device 1 controls the controlled equipment 3 on the basis of the control information acquired from the cloud server 2. As illustrated in FIG. 2, the control device 1 includes a central processing unit (CPU) 101, a main storage 102, an auxiliary storage 103, a Wi-Fi® protected setup (WPS) button 105, a local communicator 107, and a bus 109 that connects the various components. The main storage 102 is volatile memory such as random-access memory (RAM), and is used as the working area of the CPU 101. The auxiliary storage 103 includes non-volatile memory such as semiconductor memory, functions as read only memory (ROM) and storage, and stores a program for achieving the various functions of the control device 1. The WPS button 105 is, for example, a push-button switch provided on a peripheral wall of a housing of the control device 1 and outputs, upon being pressed, to the CPU 101, a signal expressing that pressing has occurred. The local communicator 107 includes, for example, a wireless module, and carries out wireless communication between the controlled equipment 3 and the BBR 8. The wireless module includes a signal generation circuit that generates a wireless signal and an antenna, and communicates using, for example, a communication protocol with a data link layer such as IEEE802.11a, b, g, n, or the like.

In the control device 1, the CPU 101 reads out the program stored in the auxiliary storage 103 to the main storage 102 and executes the program to function as an address acquirer 111, an equipment table creation requester 112, an equipment electronic message acquirer 113, an encapsulator 114, a notification information sender 115, a notification information acquirer 116, a decapsulator 117, an equipment electronic message sender 118, a receiver 119, and an ARP replier 120, as illustrated in FIG. 3. Additionally, as illustrated in FIG. 3, the auxiliary storage 103 illustrated in FIG. 2 includes an address storage 131 and a cloud URL storage 132. The address storage 131 stores address information, acquired from the BBR 8, expressing the IP address assigned to the control device 1. The cloud URL storage 132 stores URL information including the domain name information of the cloud server 2.

When an operation of pressing the WPS button 105 is performed, the receiver 119 receives that operation and notifies the address acquirer 111 of operation information expressing that said operation is received. When the address acquirer 111 is notified of the operation information from the receiver 119, the address acquirer 111 sends the connection request information to the BBR 8 to acquire the address information from the BBR 8, and stores the acquired address information in the address storage 131. When starting communication with the cloud server 2, the equipment table creation requester 112 generates equipment table creation request information for requesting, to the cloud server 2, creation of equipment table information, and sends the equipment table creation request information to the cloud server 2. Here, the equipment table creation requester 112 acquires the URL information of the cloud server 2 from the cloud URL storage 132, extracts the domain name information included in the acquired URL information, and generates equipment table creation request information to which header information including the extracted domain name information is added. Additionally, upon acquiring from the cloud server 2 the preparation completion notification information notifying that preparation for creating the equipment table information is completed, the equipment table creation requester 112 notifies the encapsulator 114 and the decapsulator 117 of the acquired preparation completion notification information. Upon acquiring the ARP request information from the BBR 8, the ARP replier 120 sends, in accordance with the ARP request information and to the BBR 8, the ARP reply information including the IP address information assigned to the control device 1 and the MAC address information of the control device 1.

The equipment electronic message acquirer 113 acquires an equipment electronic message that includes the MAC address information that is the equipment identification information of the controlled equipment 3 sent from the controlled equipment 3. This equipment electronic message is the equipment state information that includes network joining notification information that notifies that the controlled equipment 3 has newly connected to the local network NW2 or state parameter information expressing the state of the controlled equipment 3. Moreover, the equipment electronic message acquirer 113 forwards the acquired equipment electronic message to the encapsulator 114. The encapsulator 114 is a second encapsulator that encapsulates after adding the MAC address information of the control device 1 to the equipment electronic message acquired from the controlled equipment 3. Furthermore, the encapsulator 114 generates the state notification information by adding the header information for specifying the cloud server 2 as the sending destination. Here, the header information is second header information that includes the domain name information of the cloud server 2 acquired from the cloud URL storage 132 by the encapsulator 114. The encapsulator 114 forwards the generated state notification information to the notification information sender 115. The notification information sender 115 is a second notification information sender that sends, to the cloud server 2, the state notification information forwarded from the encapsulator 114.

Upon receiving from the cloud server 2 the control notification information in which the control device 1 is set as the sending destination, the notification information acquirer 116 forwards the received control notification information to the decapsulator 117. Here, the header information including the IP address information of the control device 1 is added to the control notification information that the notification information acquirer 116 receives. Additionally, the header information is first header information that includes the IP address information and the MAC address information of the control device 1. When the control notification information is forwarded to the decapsulator 117 from the notification information acquirer 116, the decapsulator 117 removes the header information from the control notification information and then decapsulates to extract the control information that includes the MAC address information of the controlled equipment 3 and the MAC address information that is the device identification information of the control device 1. The equipment electronic message sender 118 sends the extracted control information to the controlled equipment 3 on the basis of the MAC address information of the controlled equipment 3 included in the control information extracted by the decapsulator 117.

Returning to FIG. 1, the cloud server 2 is connected to the control device 1 via the BBR 8 and the broadband network NW1. As illustrated in FIG. 2, the cloud server 2 includes a CPU 201, a main storage 202, an auxiliary storage 203, a broadband communicator 206, and a bus 209 that connects the various components. The CPU 201 is, for example, a multi-core processor. The main storage 102 is volatile memory, and is used as a working area of the CPU 201. The auxiliary storage 203 includes non-volatile memory, functions as ROM and storage, and stores a program for achieving the various functions of the cloud server 2. The broadband communicator 206 communicates with the control device 1 via the BBR 8 and the broadband network NW1.

Figure 4:
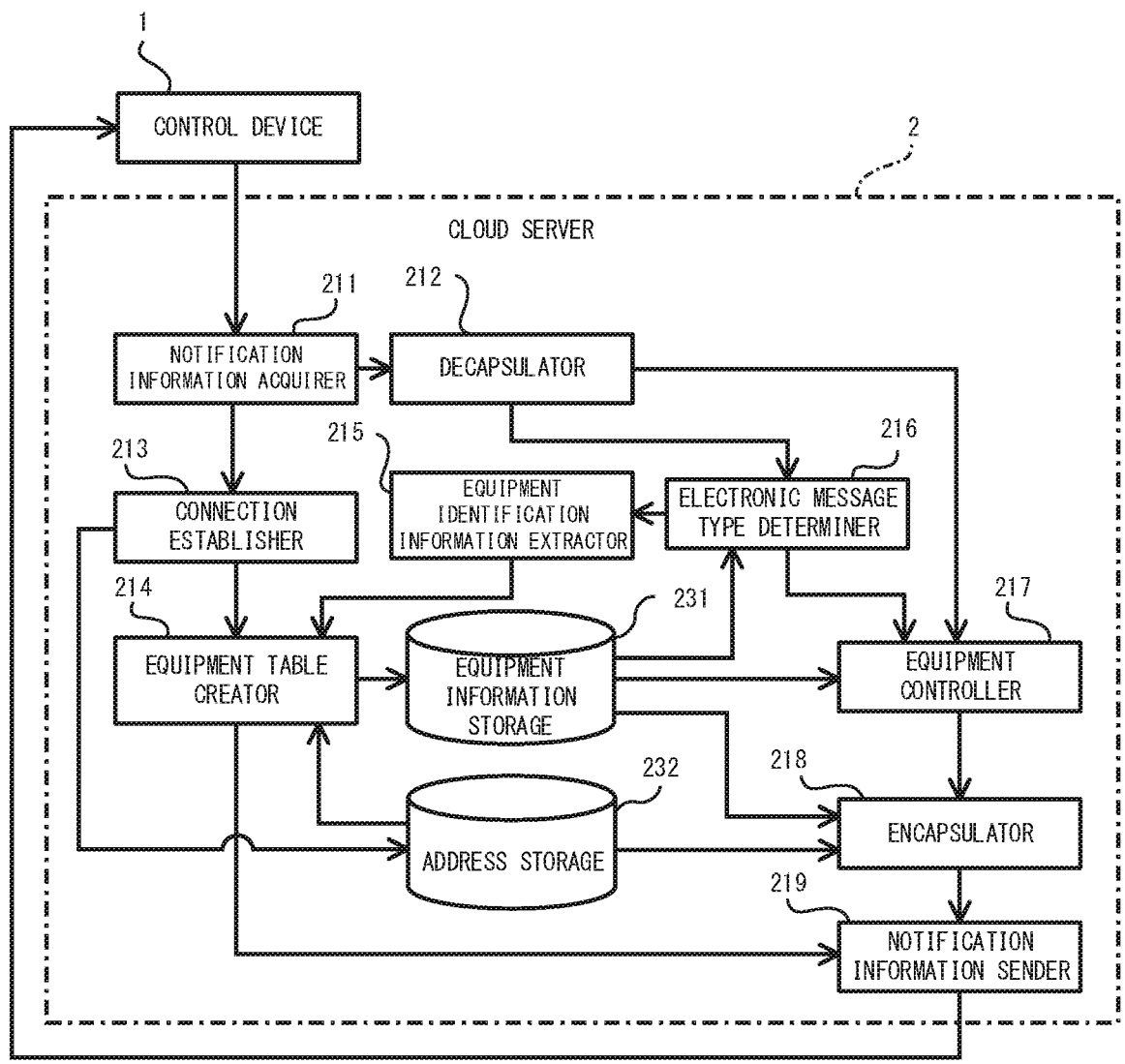
FIG. 4 is a block diagram illustrating the functional configuration of a cloud server according to Embodiment 1.

With the cloud server 2, the CPU 201 reads out the program stored in the auxiliary storage 203 to the main storage 202 and executes the program to function as a notification information acquirer 211, a decapsulator 212, a connection establisher 213, an equipment table creator 214, an equipment identification information extractor 215, an electronic message type determiner 216, an equipment controller 217, an encapsulator 218, and a notification information sender 219, as illustrated in FIG. 4. Additionally, as illustrated in FIG. 4, the auxiliary storage 203 illustrated in FIG. 2 includes an equipment information storage 231 and an address storage 232. The equipment information storage 231 stores equipment table information in which the MAC address information that identifies the controlled equipment 3 on the datalink layer within the local network NW2 is associated with the MAC address information that identifies the control device 1 on the datalink layer within the local network NW2. As illustrated in FIG. 5, for example, the equipment information storage 231 stores the MAC address information of a plurality of controlled equipments 3 that belong to the local network NW2 in association with the MAC address information of one control device 1 within the local network NW2. Additionally, for each MAC address information of the control device 1, the equipment information storage 231 stores a combination of the IP address information assigned to each of the plurality of controlled equipments 3, equipment type information expressing the type of the controlled equipment 3, and identification number information assigned to the controlled equipment 3 by the manufacturer, in association with the MAC address information of the controlled equipment 3.

Returning to FIG. 4, the address storage 232 stores the address information of the control device 1. The notification information acquirer 211 acquires, from the control device 1, the state notification information to which the header information including the IP address information of the cloud server 2 is added. Additionally, the notification information acquirer 211 determines whether the equipment table creation request information is acquired. Moreover, when determining that the equipment table creation request information is acquired, the notification information acquirer 211 forwards the acquired equipment table creation request information to the connection establisher 213. When the equipment table creation request information is forwarded, the connection establisher 213 extracts the IP address information of the control device 1 included in the header information of the equipment table creation request information, and stores the extracted IP address information in the address storage 232. Additionally, upon acquiring the state notification information, the notification information acquirer 211 forwards the acquired state notification information to the decapsulator 212. The decapsulator 212 is a second decapsulator that, when the state notification information is forwarded from the notification information acquirer 211, decapsulates that state notification information and then removes the header information to extract the equipment electronic message including the MAC address information of the controlled equipment 3. The decapsulator 212 notifies the electronic message type determiner 216 of the extracted equipment electronic message.

When determining that the notification information acquirer 211 has acquired the state notification information, the electronic message type determiner 216 determines whether port number information of the sending destination and the port number information of the sender included in the header information of the equipment electronic message notified from the decapsulator 212 match predetermined port number information. Moreover, when determining that the port number information of the sending destination and the port number information of the sender included in the header information of the equipment electronic message notified from the decapsulator 212 match the predetermined port number information, the electronic message type determiner 216 determines whether the equipment electronic message is a network joining notification information on the basis of hereinafter described service identification information and property type information included in the equipment electronic message. The network joining notification information is information for notifying that a controlled equipment 3 has newly connected to the local network NW2, and includes the MAC address information of each control device 1 and controlled equipment 3, the IP address information of the controlled equipment 3, the equipment type information, and the identification number information. Moreover, when determining that the equipment electronic message is a network joining notification information, the electronic message type determiner 216 notifies the equipment identification information extractor 215 of that network joining notification information. Furthermore, when determining that the equipment electronic message is the equipment state information, the electronic message type determiner 216 acquires, from the equipment information storage 231, the equipment type information and the identification number information corresponding to the MAC address information and the IP address information included in the equipment state information, and notifies the equipment controller 217 of such together with the equipment state information.

Upon notification of the equipment table creation request information from the electronic message type determiner 216, the equipment identification information extractor 215 extracts the MAC address information of the control device 1 included in the equipment table creation request information, and notifies the equipment table creator 214 of the MAC address information. At this time, in a case in which the MAC address information of the control device 1 extracted by the equipment identification information extractor 215 does not exist in the MAC address information stored in the equipment information storage 231, the equipment table creator 214 starts the creation of equipment table information corresponding to the control device 1. Specifically, the equipment table creator 214 secures, in the equipment information storage 231, a region for storing equipment table information corresponding to the control device 1 to which the MAC address expressed in the MAC address information notified by the equipment identification information extractor 215 is assigned. Moreover, the equipment table creator 214 acquires the IP address information of the control device 1 from the address storage 232, generates a preparation completion notification information notifying that preparation for creation of the equipment table information is completed, and forwards the generated preparation completion notification information to the notification information sender 219.

Meanwhile, upon notification of the network joining notification information from the electronic message type determiner 216, the equipment identification information extractor 215 extracts, from the network joining notification information, the MAC address information of each control device 1 and controlled equipment 3, the IP address information of the controlled equipment 3, the equipment type information, and the identification number information included in the network joining notification information, and notifies the equipment table creator 214 of these pieces of information. At this time, in a case in which the MAC address information of the controlled equipment 3 notified by the equipment identification information extractor 215 does not exist in the equipment table information corresponding to the MAC address information of the control device 1 notified by the equipment identification information extractor 215, the equipment table creator 214 updates the equipment table information by adding that MAC address information, and the IP address information, the equipment type information, and the identification number information of the controlled equipment 3 corresponding to that MAC address information.

The equipment controller 217 generates control information including control parameter information for controlling the controlled equipment 3, the MAC address information of the controlled equipment 3 as a control target, and the MAC address information of the control device 1 corresponding to the MAC address information of the controlled equipment 3 as the control target that is stored in the equipment information storage 231. Here, the equipment controller 217 determines, on the basis of the equipment state information notified by the decapsulator 212 or whether operation change command information is received from the terminal device 7, whether a change of the operating settings of the controlled equipment 3 corresponding to that equipment state information is necessary. Moreover, when determining that a change of the operating settings of the controlled equipment 3 is necessary, the equipment controller 217 generates the control information described above, and notifies the encapsulator 218 of the generated control information.

The encapsulator 218 is a first encapsulator that generates the control notification information by encapsulating the control information notified by the equipment controller 217 and adding header information for specifying the control device 1 as the sending destination. Here, the header information is first header information that includes the IP address information of the control device 1 acquired from the address storage 232 by the encapsulator 218 and the MAC address information of the control device 1 acquired from the equipment information storage 231. A communication protocol with higher reliability than UDP, such as TCP, is used as the communication protocol of the transport layer for the control notification information. The notification information sender 219 is a first notification information sender that sends the control notification information, generated by the encapsulator 218, to the control device 1 on the basis of the header information thereof. Additionally, when the preparation completion notification information is forwarded from the equipment table creator 214, the notification information sender 219 sends that preparation completion notification information to the control device 1.

Figure 6:
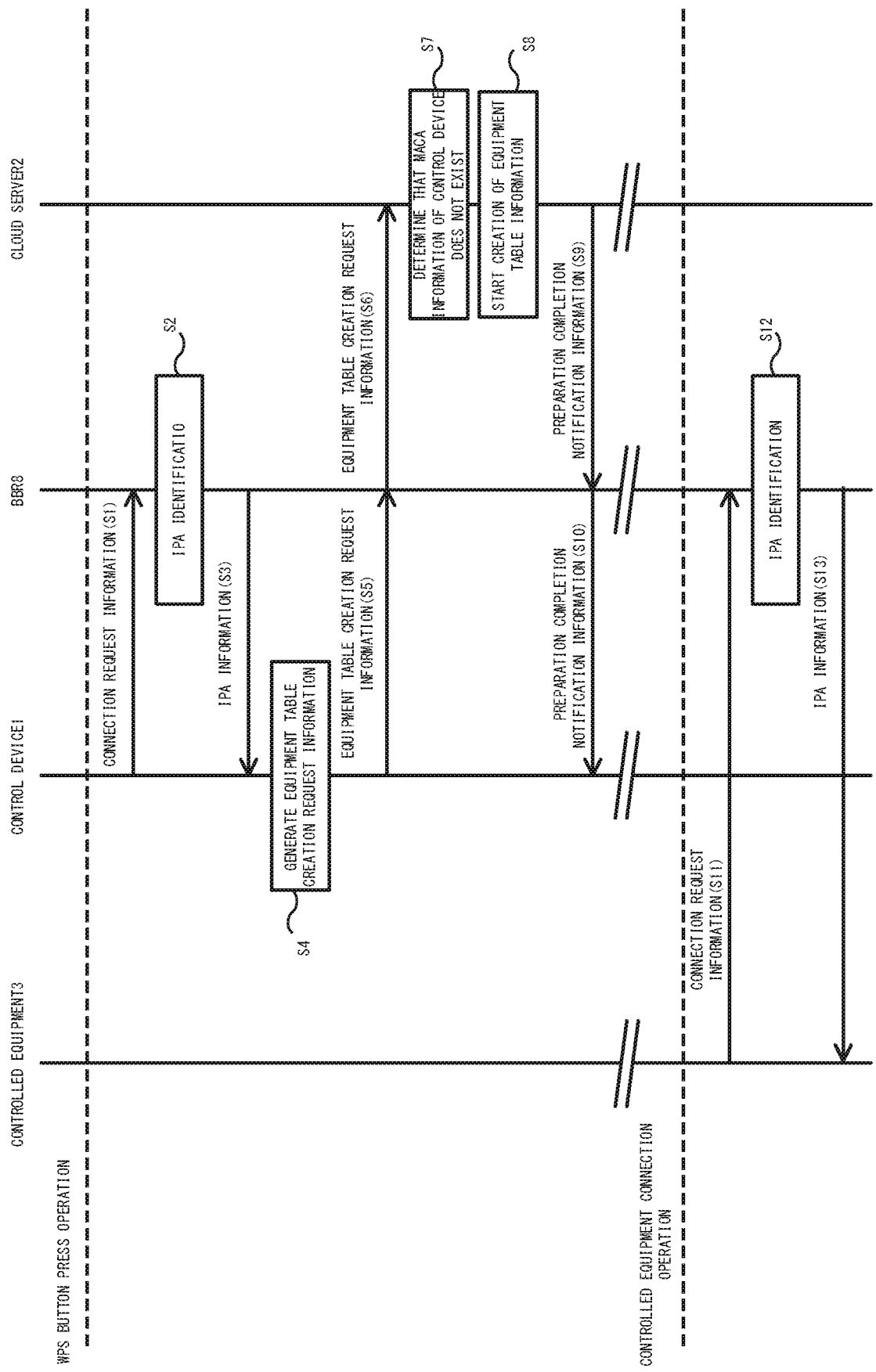
FIG. 6 is a sequence drawing illustrating operations of the control system according to Embodiment 1.

Next, the operations of the control system according to the present embodiment are described while referencing to FIGS. 6 to 13. Firstly, it is assumed that the user arranges the control device 1 at a location where connecting to the local network is possible, and then performs an operation of pressing the WPS button 105 as illustrated in FIG. 6. As a result, connection request information for requesting a connection to the BBR 8 is sent from the control device 1 to the BBR 8 (step S1). Meanwhile, upon receiving the connection request information sent from the control device 1, the BBR 8 identifies, from among a predetermined plurality of IP addresses, the IP address assigned to the control device 1 that is the sender of the connection request information (step S2). Next, IP address information expressing the identified IP address is sent from the BBR 8 to the control device 1 (step S3). At this time, the control device 1 stores the IP address information acquired from the BBR 8 in the address storage 131. Note that, when, after the control device 1 stores the IP address information in the address storage 131, ARP request information for requesting, to the control device 1, the MAC address information is sent from the BBR 8 to the control device 1, ARP reply information including the MAC address information and the IP address information of the control device 1 is sent from the control device 1 to the BBR 8. Then, upon receiving the ARP reply information, the BBR 8 uses the MAC address information and the IP address information of the control device 1 included in the received ARP reply information to update the ARP table information stored in the ARPT storage 831.

Figure 7:
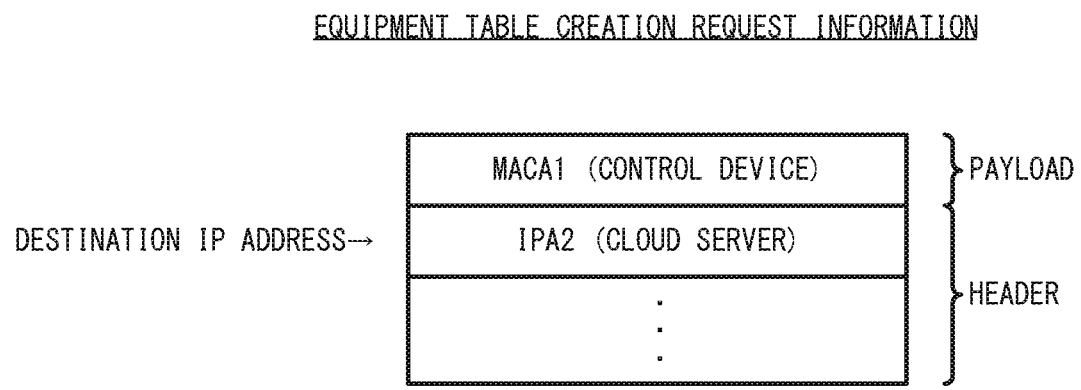
FIG. 7 is a drawing illustrating the structure of equipment table creation request information according to Embodiment 1.

Next, the control device 1 generates equipment table creation request information for requesting, to the cloud server 2, the creation of equipment table information (step S4). Thereafter, the generated equipment table creation request information is sent from the control device 1 to the BBR 8 (step S5) and then is sent from the BBR 8 to the cloud server 2 (step S6). During this step, upon receiving the equipment table creation request information, the BBR 8 extracts the domain name information from the received equipment table creation request information, generates DNS inquiry information including the extracted domain name information, and sends the DNS inquiry information to the DNS server 9. Then, upon receiving the IP address information of the cloud server 2 from the DNS server 9, the BBR 8 replaces the domain name information included in the equipment table creation request information with the received IP address information and sends the resulting information to the cloud server 2. Here, as illustrated in FIG. 7, the payload of the equipment table creation request information acquired by the cloud server 2 includes only MAC address information MACA1 of the control device 1, and the header information of the equipment table creation request information includes IP address information IPA2 of the cloud server 2.

Returning to FIG. 6, meanwhile, upon receiving the equipment table creation request information sent from the BBR 8, the cloud server 2 extracts the MAC address information of the control device 1 from the equipment table creation request information. Thereafter, it is assumed that the cloud server 2 determines whether the MAC address information of the control device 1 included in the equipment table creation request information does not exist in the MAC address information stored in the equipment information storage 231 (step S7). In this case, as described above, the cloud server 2 starts the creation of equipment table information corresponding to the control device 1 (step S8). Next, preparation completion notification information notifying that the preparation for creating the equipment table information is completed is sent from the cloud server 2 to the BBR 8 (step S9) and then is sent from the BBR 8 to the control device 1 (step S10).

Next, it is assumed that the user performs a controlled equipment connection operation for newly connecting a controlled equipment 3 to the local network NW2. Here, in a case in which, for example, the controlled equipment 3 is provided with a WPS button, the controlled equipment connection operation corresponds to pressing the WPS button. In such a case, the connection request information is sent from the controlled equipment 3 to the BBR 8 (step S11). Meanwhile, upon receiving the connection request information sent from the controlled equipment 3, the BBR 8 identifies, from among a predetermined plurality of IP addresses, the IP address assigned to the controlled equipment 3 that is the sender of the connection request information (step S12). Next, IP address information expressing the identified IP address is sent from the BBR 8 to the controlled equipment 3 (step S13). At this time, the controlled equipment 3 stores the IP address information acquired from the BBR 8 in the address storage of the controlled equipment 3. Note that, when, after the controlled equipment 3 stores the IP address information in the address storage, ARP request information for requesting, to the controlled equipment 3, the MAC address information is sent from the BBR 8 to the controlled equipment 3, ARP reply information including the MAC address information and the IP address information of the controlled equipment 3 is sent from the controlled equipment 3 to the BBR 8. Then, upon receiving the ARP reply information, the BBR 8 uses the MAC address information and the IP address information of the controlled equipment 3 included in the received ARP reply information to update the ARP table information stored in the ARPT storage 831.

Figure 8:
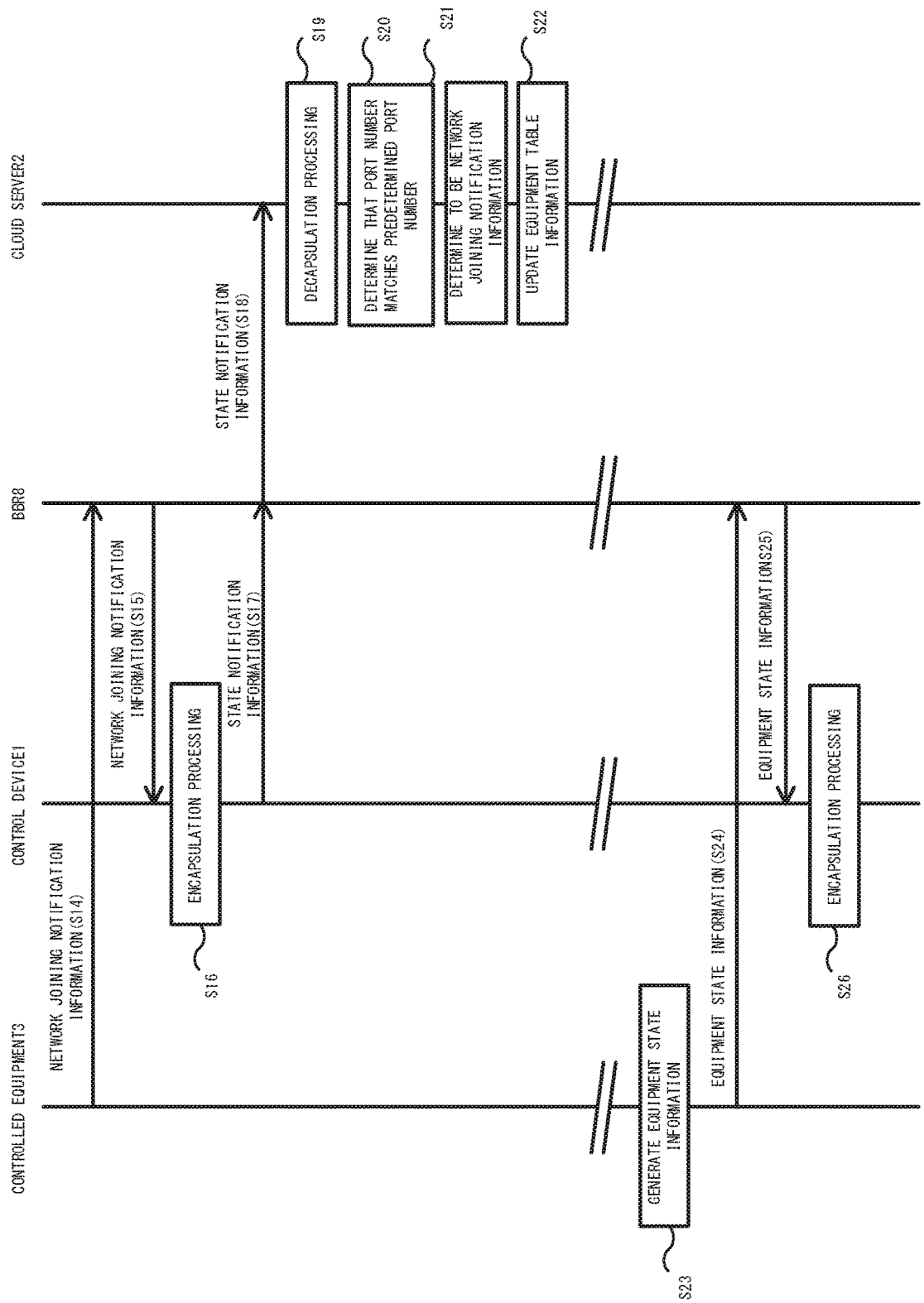
FIG. 8 is a sequence drawing illustrating operations of the control system according to Embodiment 1.
Figure 9:
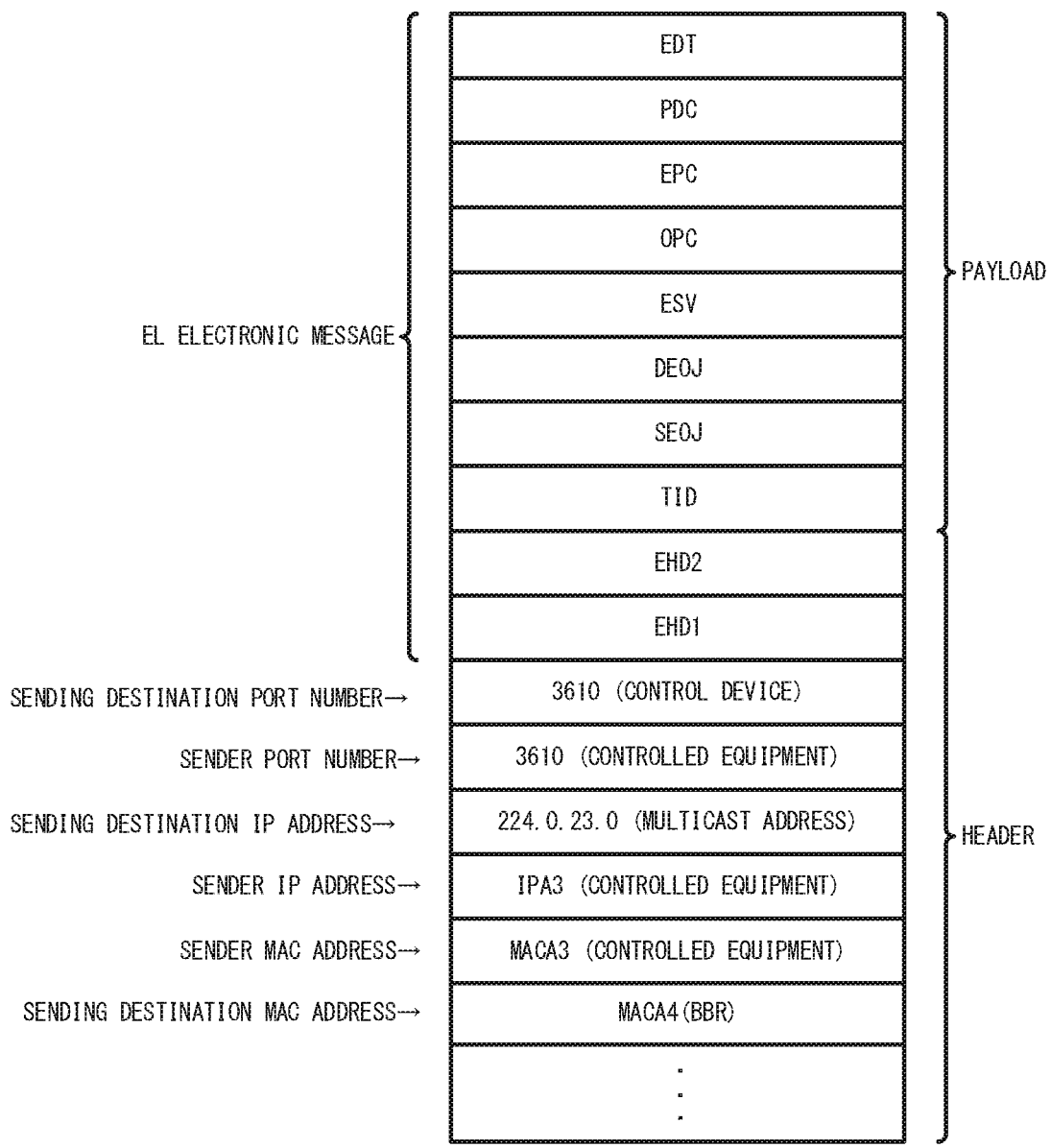
FIG. 9 is a drawing illustrating the structure of network joining notification information according to Embodiment 1.

Next, as illustrated in FIG. 8, network joining notification information for notifying that a controlled equipment 3 has newly connected to the local network NW2 is sent to the BBR 8 from the controlled equipment 3 (step S14) and then is sent from the BBR 8 to the control device 1 (step S15). The network joining notification information includes, for example, the MAC address information of the controlled equipment 3 that is the sender, the IP address information of the controlled equipment 3 that is the sender, the MAC address information of the BBR 8 that is the sending destination, the IP address information of the sending destination, and an electronic message that conforms to the EchonetLite standard (EL electronic message), as illustrated in FIG. 9. The IP address information of the sending destination is set to a multicast address that is used when multicasting the network joining notification information to the control device 1 and other controlled equipments 3. Additionally, UDP is used as the transport layer protocol of the network joining notification information, and the header information includes the port number information of the control device 1 that is the sending destination and the port number information of the controlled equipment 3 that is the sender. Furthermore, the EL electronic message includes header information EHD1, EHD2, transaction identification information TID, equipment type information SEOJ, sender object information DEOJ, service identification information ESV, processing property count information OPC, property type information EPC, property byte count information PDC, and property information EDT. Moreover, in the network joining notification information, the service identification information ESV is set to "INF", and the property type information EPC is set to "0xD5", which expresses an instance list notification.

Figure 10:
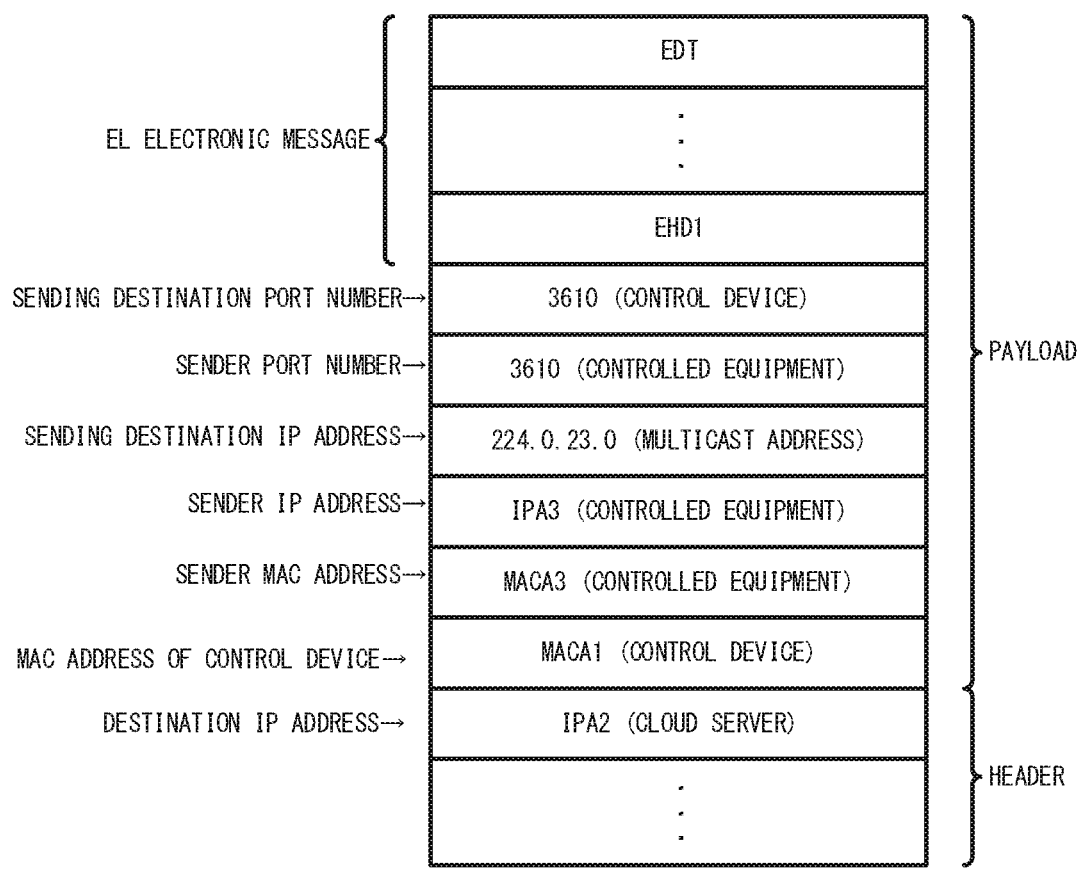
FIG. 10 is a drawing illustrating the structure of state notification information according to Embodiment 1.

Meanwhile, upon acquiring the network joining notification information, the control device 1 executes encapsulation processing for adding the MAC address information of the control device 1 to the network joining notification information and encapsulating the network joining notification information (step S16). Furthermore, the control device 1 adds header information for specifying the cloud server 2 as the sending destination. As a result, as illustrated in FIG. 10, for example, state notification information obtained by adding header information, including the IP address information IPA2 of the cloud server 2 as the destination IP address, to the network joining notification information is generated. Returning to FIG. 8, next, the generated state notification information is sent from the control device 1 to the BBR 8 (step S17) and then is sent from the BBR 8 to the cloud server 2 (step S18). During this step, upon receiving the state notification information, the BBR 8 extracts the domain name information from the received network joining notification information, generates DNS inquiry information including the extracted domain name information, and sends the DNS inquiry information to the DNS server 9. Then, upon receiving the IP address information of the cloud server 2 from the DNS server 9, the BBR 8 replaces the domain name information included in the state notification information with the received IP address information and sends the resulting information to the cloud server 2.

Meanwhile, upon receiving the state notification information sent from the BBR 8, the cloud server 2 executes decapsulation processing for removing the header information from the state notification information and decapsulating (step S19). As a result, the cloud server 2 extracts the network joining notification information from the state notification information. Next, it is assumed that the cloud server 2 determines that the port number information of the control device 1 that is the sending destination and the port number information of the controlled equipment 3 that is the sender included in the network joining notification information match the predetermined port number information (step S20). Then, it is assumed that the cloud server 2 determines that the service identification information ESV included in the EL electronic message of the network joining notification information is set to "INF", and the property type information EPC is set to "0xD5", which expresses an instance list notification. That is, it is assumed that the cloud server 2 determines that the electronic message included in the state notification information acquired from the BBR 8 is the network joining notification information (step S21). In this case, the cloud server 2 extracts the MAC address information, the IP address information, the equipment type information SEOJ, and the identification number information included in the property information EDT of the controlled equipment 3 that is the sender included in the network joining notification information. Then, the cloud server 2 uses the extracted MAC address information, IP address information, equipment type information SEOJ, and identification number information of the controlled equipment 3 to update the equipment table information stored in the equipment information storage 231 (step S22).

Next, when, after the controlled equipment 3 is connected to the local network NW2, the controlled equipment 3 generates equipment state information expressing the state of the controlled equipment 3 (step S23), the generated equipment state information is sent to the BBR 8 from the controlled equipment 3 (step S24) and then is sent from the BBR 8 to the control device 1 (step S25). Meanwhile, upon acquiring the equipment state information, the control device 1 executes the encapsulation processing for encapsulating the equipment state information (step S26), and adds the header information for specifying the cloud server 2 as the sending destination. As a result, state notification information obtained by adding header information, including the IP address information of the cloud server 2 as the destination IP address, to the equipment state information is generated.

Figure 11:
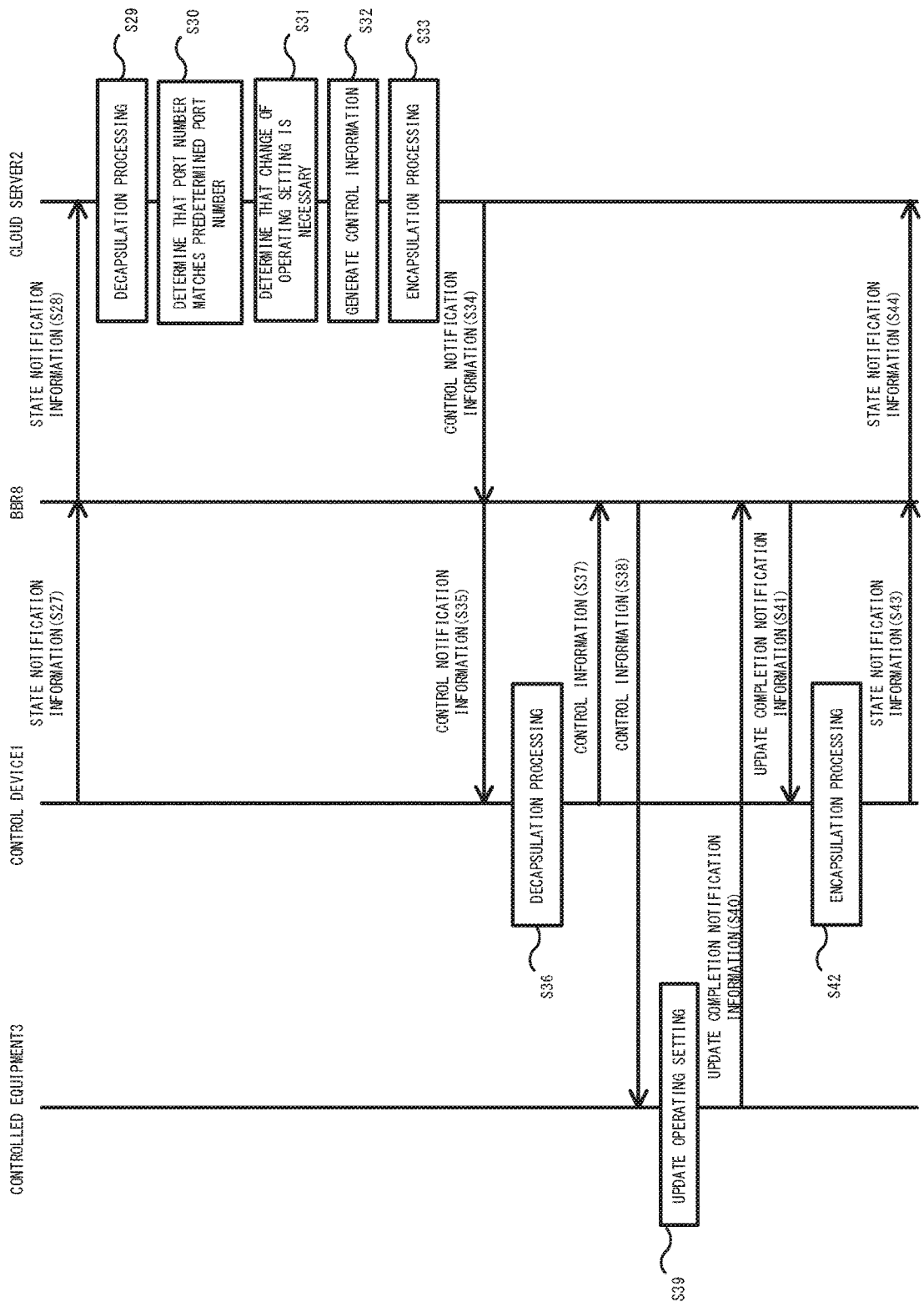
FIG. 11 is a sequence drawing illustrating operations of the control system according to Embodiment 1.
Figure 12:
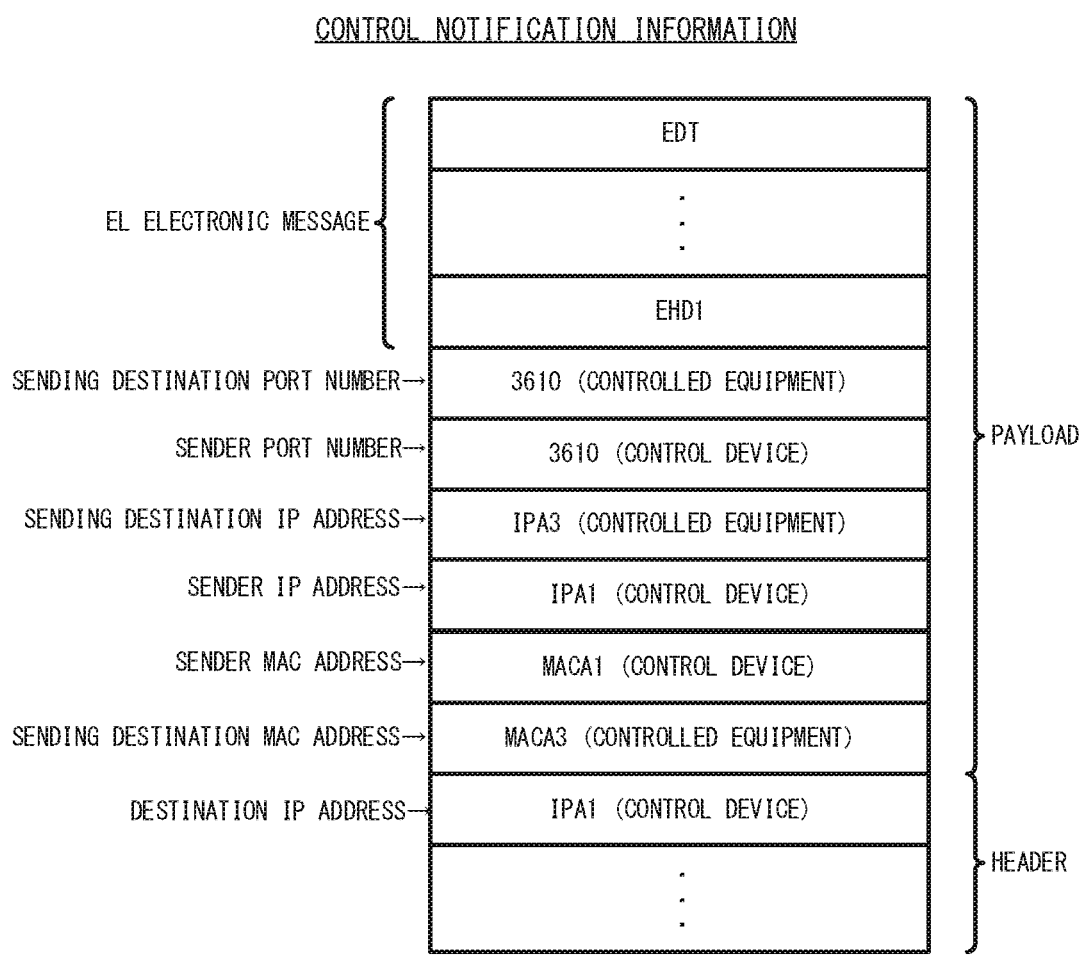
FIG. 12 is a drawing illustrating the structure of control notification information according to Embodiment 1.

Thereafter, as illustrated in FIG. 11, the generated state notification information is sent from the control device 1 to the BBR 8 (step S27) and then is sent from the BBR 8 to the cloud server 2 (step S28). Meanwhile, upon receiving the state notification information sent from the BBR 8, the cloud server 2 removes the header information from the state notification information to execute the decapsulation processing (step S29). As a result, the cloud server 2 extracts the equipment state information from the state notification information. Next, it is assumed that the cloud server 2 determines that the port number information of the control device 1 that is the sending destination and the port number information of the controlled equipment 3 that is the sender included in the equipment state information match the predetermined port number information (step S30). Moreover, it is assumed that the cloud server 2 determines, on the basis of the state of the controlled equipment 3 expressed in the equipment state information, that a setting change of the controlled equipment 3 is necessary (step S31). In this case, the cloud server 2 generates control information for changing the setting of the controlled equipment 3 for which for which a determination is made that the setting change is be necessary (step S32). Next, the cloud server 2 executes the encapsulation processing for encapsulating the generated control information (step S33) and also adds header information for specifying the control device 1 as the sending destination. As a result, as illustrated in FIG. 12, for example, control notification information obtained by adding header information, including the IP address information IPA1 of the control device 1 as the destination IP address, to the control information is generated.

Figure 13:
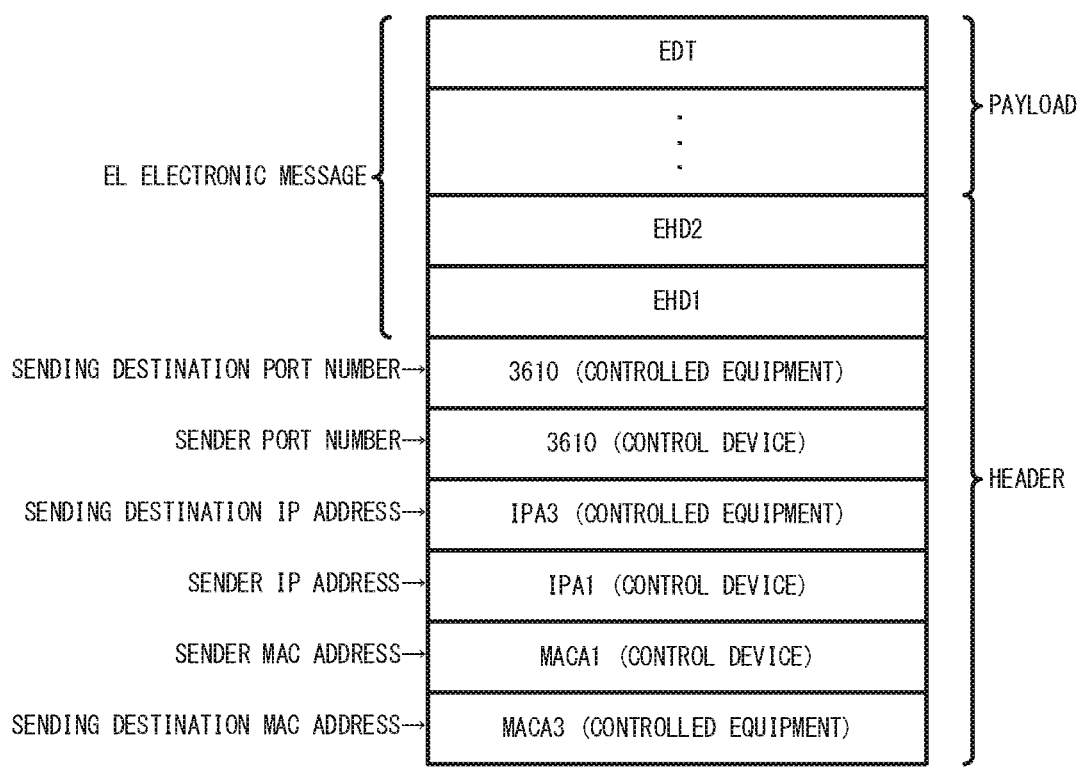
FIG. 13 is a drawing illustrating the structure of control information according to Embodiment 1.

Thereafter, the generated state notification information is sent from the cloud server 2 to the BBR 8 (step S34) and then is sent from the BBR 8 to the control device 1 (step S35). Meanwhile, upon receiving the control notification information from the BBR 8, the control device 1 executes the decapsulation processing for removing the header information from the state notification information and decapsulating (step S36). As a result, the control device 1 extracts the control information from the control notification information. The control information includes, for example, the MAC address information MACA1 of the control device 1 that is the sender, the IP address information IPA1 of the control device 1 that is the sender, MAC address information MACA3 of the controlled equipment 3 that is the sending destination, IP address information IPA3 of the controlled equipment 3 that is the sending destination, and an EL electronic message that expressing control content for the controlled equipment 3, as illustrated in FIG. 13.

Returning to FIG. 11, next, the control information extracted from the control notification information is sent from the control device 1 to the BBR 8 (step S37) and then is sent to the controlled equipment 3 corresponding to the MAC address information of the controlled equipment 3 included in the control information (step S38). Next, upon acquiring the control information, the controlled equipment 3 updates the operating setting on the basis of the acquired control information (step S39). Thereafter, update completion notification information notifying that the update of the operating setting in the controlled equipment 3 is completed is sent from the controlled equipment 3 to the BBR 8 (step S40) and then is sent from the BBR 8 to the control device 1 (step S41).

Meanwhile, upon acquiring the update completion notification information, the control device 1 executes the encapsulation processing for encapsulating the update completion notification information (step S42), and adds the header information for specifying the cloud server 2 as the sending destination. As a result, state notification information obtained by adding header information, including the IP address information of the cloud server 2 as the destination IP address, to the update completion notification information is generated. Next, the generated state notification information is sent from the control device 1 to the BBR 8 (step S43) and then is sent from the BBR 8 to the cloud server 2 (step S44).

Figure 14:
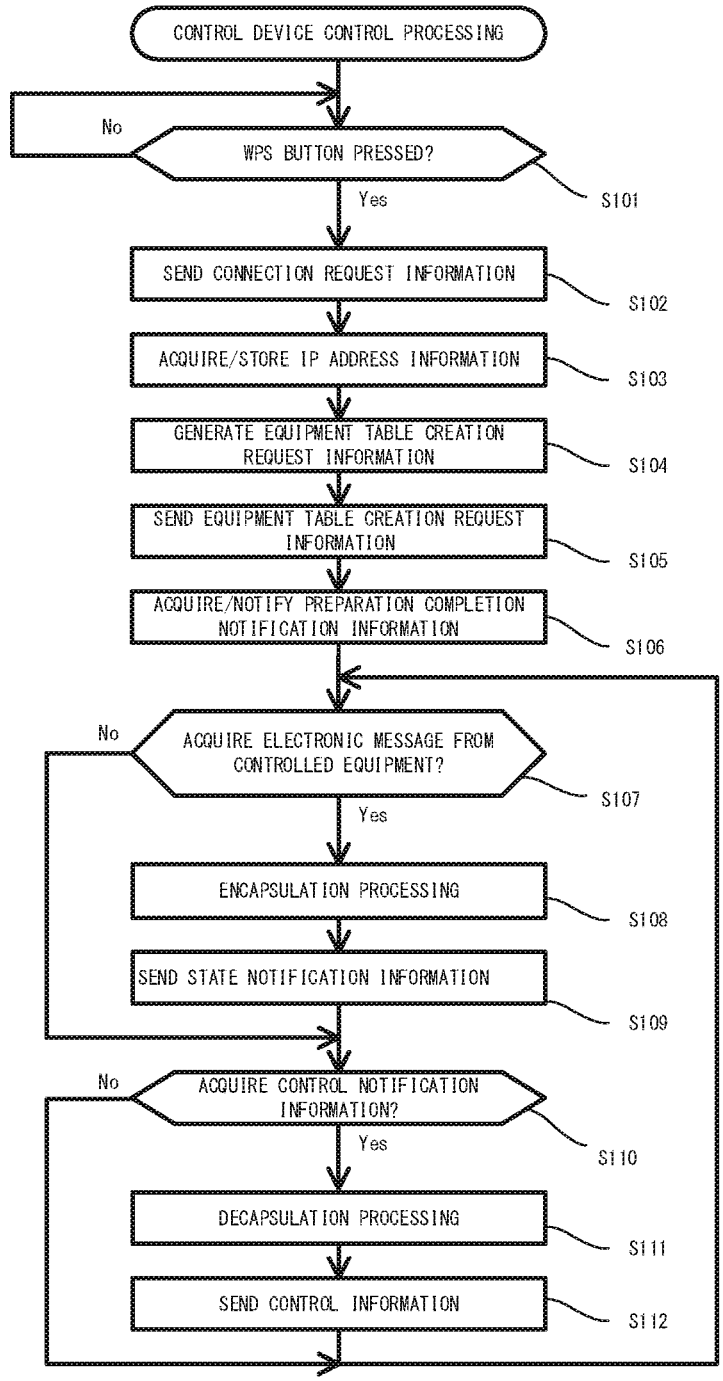
FIG. 14 is a flowchart illustrating an example of the flow of control device control processing executed by the control device according to Embodiment 1.

Next, control device control processing executed by the control device 1 according to the present embodiment is described while referencing FIG. 14. This control device control processing starts when, for example, (i) the power to the control device 1 is turned ON and (ii) the control device 1 is arranged at a location at which connecting to the local network NW2 is possible. Firstly, the receiver 119 determines whether an operation of the user pressing the WPS button 105 has occurred (step S101). Provided that the operation of pressing the WPS button 105 has not occurred (step S101; No), the receiver 119 repeatedly executes the processing of step S101.

Conversely, when determining that the operation of pressing the WPS button 105 has occurred (step S101; Yes), the receiver 119 notifies the address acquirer 111 of operation information expressing that said operation is received. Then, the address acquirer 111 sends connection request information to the BBR 8 (step S102) to acquire the IP address information from the BBR 8, and stores the acquired IP address information in the address storage 131 (step S103). Next, when starting communication with the cloud server 2, the equipment table creation requester 112 generates equipment table creation request information for requesting, to the cloud server 2, creation of equipment table information (step S104). Here, the equipment table creation requester 112 acquires the URL information of the cloud server 2 from the cloud URL storage 132, extracts the domain name information included in the acquired URL information, and generates equipment table creation request information to which header information including the extracted domain name information is added. Next, the equipment table creation requester 112 sends the generated equipment table creation request information to the cloud server 2 on the basis of the header information thereof (step S105).

Thereafter, upon acquiring from the cloud server 2 via the BBR 8 the preparation completion notification information notifying that preparation for creating the equipment table information is completed, the equipment table creation requester 112 notifies the encapsulator 114 and the decapsulator 117 of the acquired preparation completion notification information (step S106).

Next, the equipment electronic message acquirer 113 determines whether an equipment electronic message that includes the MAC address information of the controlled equipment 3 sent from the controlled equipment 3 is acquired (step S107). This equipment electronic message corresponds to the network joining notification information, the equipment state information, or the update completion notification information sent from the controlled equipment 3. When the equipment electronic message acquirer 113 determines that an electronic message sent from the controlled equipment 3 is not acquired (step S107; No), the processing of step S110 described later is executed. Conversely, when determining that an electronic message sent from the controlled equipment 3 is acquired (step S107; Yes), the equipment electronic message acquirer 113 forwards the acquired electronic message to the encapsulator 114. Then, the encapsulator 114 executes the encapsulation processing for encapsulating the electronic message acquired from the controlled equipment 3 (step S108). Here, the encapsulator 114 adds, to the encapsulated electronic message, header information for specifying the cloud server 2 as the sending destination. Specifically, the encapsulator 114 acquires the URL information of the cloud server 2 from the cloud URL storage 132, extracts the domain name information included in the acquired URL information, and generates state notification information by adding header information including the extracted domain name information to the encapsulated header information. Next, the notification information sender 115 sends the state notification information generated by the encapsulator 114 to the cloud server 2 on the basis of the header information thereof (step S109).

Thereafter, the notification information acquirer 116 determines whether control notification information in which the control device 1 is set as the sending destination is acquired from the cloud server 2 (step S110). When the notification information acquirer 116 determines that control notification information sent from the cloud server 2 is not acquired (step S110; No), the processing of step S107 is executed again. Conversely, when determining that control notification information sent from the cloud server 2 is acquired (step S110; Yes), the notification information acquirer 116 forwards the acquired control notification information to the decapsulator 117. Then, when the control notification information is forwarded from the notification information acquirer 116, the decapsulator 117 executes the decapsulation processing for removing the header information from the control notification information and decapsulating (step S111). Here, the decapsulator 117 executes the decapsulation processing to extract the control information including the MAC address information of the controlled equipment 3 and the MAC address information of the control device 1. Next, the equipment electronic message sender 118 sends the control information including the MAC address information of the control device 1 to the controlled equipment 3 on the basis of the MAC address information of the controlled equipment 3 included in the control information extracted by the decapsulator 117 (step S112). Then, the processing of step S107 is executed again.

Figure 15:
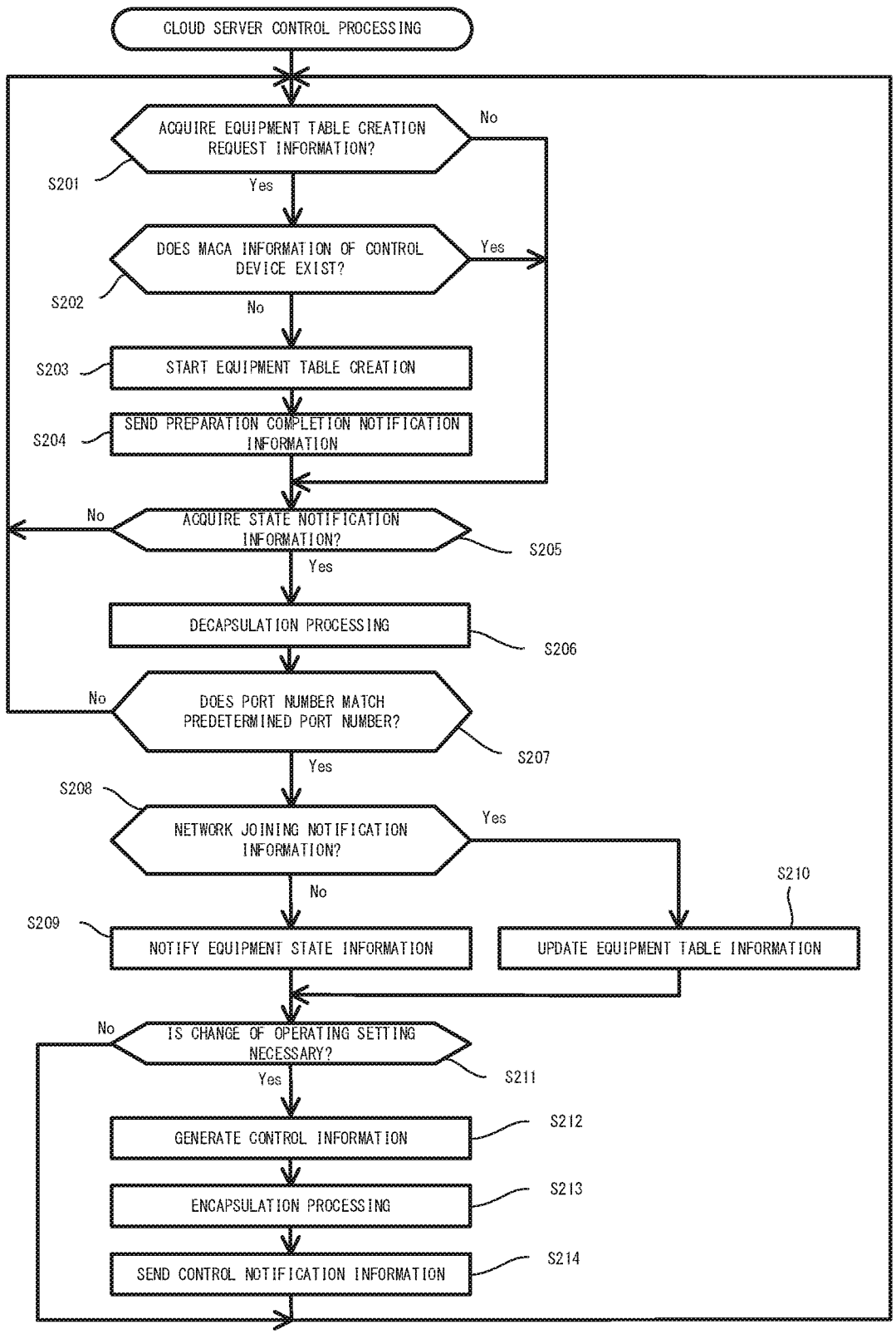
FIG. 15 is a flowchart illustrating an example of the flow of cloud server control processing executed by the cloud server according to Embodiment 1.

Next, cloud server control processing executed by the cloud server 2 according to the present embodiment is described while referencing FIG. 15. This cloud server control processing starts when, for example, an application for functioning as the control device 1 is started up in the cloud server 2. Firstly, the notification information acquirer 211 determines whether the equipment table creation request information addressed to the cloud server 2 is acquired from the control device 1 (step S201). When the notification information acquirer 211 determines that the equipment table creation request information is not acquired (step S201; No), the processing of step S205 described later is executed.

Conversely, when determining that the equipment table creation request information is acquired (step S201; Yes), the notification information acquirer 211 forwards the acquired equipment table creation request information to the connection establisher 213. Then, when the equipment table creation request information is forwarded, the connection establisher 213 extracts the IP address information of the control device 1 included in the header information of the equipment table creation request information, and stores the extracted IP address information in the address storage 232. Additionally, the connection establisher 213 extracts the MAC address information of the control device 1 included in the equipment table creation request information, and notifies the equipment table creator 214 of the MAC address information.

At this time, the equipment table creator 214 determines whether the MAC address information of the control device 1 exists in the MAC address information stored in the equipment information storage 231 (step S202). Here, when the equipment table creator 214 determines that the MAC address information of the control device 1 exists in the MAC address information stored in the equipment information storage 231 (step S202; Yes), the processing of step S207 described later is executed. Conversely, when determining that the MAC address information of the control device 1 does not exist in the MAC address information stored in the equipment information storage 231 (step S202; No), the equipment table creator 214 starts the creation of equipment table information corresponding to the control device 1 (step S203). Moreover, the equipment table creator 214 acquires the IP address information of the control device 1 from the address storage 232, generates a preparation completion notification information notifying that preparation for creation of the equipment table information is completed, and forwards the generated preparation completion notification information to the notification information sender 219. Then, the notification information sender 219 sends, to the control device 1, the preparation completion notification information forwarded from the equipment table creator 214 (step S204).

Next, the notification information acquirer 211 determines whether the state notification information addressed to the cloud server 2 is acquired from the control device 1 (step S205). When the notification information acquirer 211 determines that the state notification information addressed to the cloud server 2 is not acquired (step S205; No), the processing of S201 is executed again. Conversely, when determining that the state notification information addressed to the cloud server 2 is acquired (step S205; Yes), the notification information acquirer 211 forwards the acquired state notification information to the decapsulator 212. Then, the decapsulator 212 executes the decapsulation processing for removing the header information of the state notification information forwarded from the notification information acquirer 211 and decapsulating (step S206). Moreover, the decapsulator 212 notifies the electronic message type determiner 216 of the equipment electronic message extracted from the state notification information due to the execution of the decapsulation processing.

Meanwhile, the electronic message type determiner 216 determines whether the port number information of the sending destination and the port number information of the sender included in the header information of the equipment electronic message notified from the decapsulator 212 match the predetermined port number information (step S207). Here, when the electronic message type determiner 216 determines that the port number information of the sending destination and the port number information of the sender included in the header information of the equipment electronic message notified from the decapsulator 212 do not match the predetermined port number information (step S207; No), the processing of step S201 is executed again. Conversely, when determining that the port number information of the sending destination and the port number information of the sender of the equipment electronic message notified from the decapsulator 212 match the predetermined port number information (step S207; Yes), the electronic message type determiner 216 determines whether the equipment electronic message is a network joining notification information on the basis of hereinafter described service identification information and property type information included in the electronic message (step S208). Here, when determining that the equipment electronic message is equipment state information (step S208; No), the electronic message type determiner 216 notifies the equipment controller 217 of that equipment state information (step S209). At this time, the electronic message type determiner 216 acquires, from the equipment information storage 231, the equipment type information and the identification number information corresponding to the MAC address information and the IP address information included in the equipment state information, and notifies the equipment controller 217 of such together with the equipment state information. Then, the processing of step S211 described later is executed.

Conversely, when determining that the electronic message is a network joining notification information (step S208; Yes), the electronic message type determiner 216 notifies the equipment identification information extractor 215 of that network joining notification information. Additionally, the equipment identification information extractor 215 extracts, from the network joining notification information, the MAC address information of each control device 1 and controlled equipment 3, the IP address information of the controlled equipment 3, the equipment type information, and the identification number information included in the network joining notification information, and notifies the equipment table creator 214 of these pieces of information. Then, the equipment table creator 214 updates the equipment table information stored in the equipment information storage 231 on the basis of the MAC address information of each of the control device 1 and the controlled equipment 3, the IP address information of the controlled equipment 3, the equipment type information, and the identification number information notified by the equipment identification information extractor 215 (step S210). Here, in a case in which the MAC address information of the controlled equipment 3 notified by the equipment identification information extractor 215 does not exist in the equipment table information corresponding to the MAC address information of the control device 1 notified by the equipment identification information extractor 215, the equipment table creator 214 updates the equipment table information by adding that MAC address information, and the IP address information, the equipment type information, and the identification number information of the controlled equipment 3 corresponding to that MAC address information.

Thereafter, the equipment controller 217 determines, on the basis of the equipment state information notified from the decapsulator 212 or whether an operating setting change command information is received from the terminal device 7, whether a change of the operating settings of the controlled equipment 3 corresponding to that equipment state information is necessary (step S211). Here, when determining that improvement of the environment or the state of the controlled equipment 3, expressed in the state parameter information included in the equipment state information notified from the decapsulator 212, is necessary, the equipment controller 217 determines that changing of the operating settings of the controlled equipment 3 is necessary. Additionally, upon receiving an operating setting change command information from the terminal device 7, the equipment controller 217 determines that changing of the operating settings of the controlled equipment 3 is necessary. When the equipment controller 217 determines that a change of the operating settings of the controlled equipment 3 is unnecessary (step S211; No), the processing of step S201 is executed again. Conversely, it is assumed that the equipment controller 217 determines that a change of the operating settings of the controlled equipment 3 is necessary (step S211; Yes). In this case, the equipment controller 217 generates control information including control parameter information for controlling the controlled equipment 3, the MAC address information of the controlled equipment 3 as the control target, and the MAC address information of the control device 1 corresponding to the MAC address information of the controlled equipment 3 as the control target that is stored in the equipment information storage 231 (step S212). Moreover, the equipment controller 217 notifies the encapsulator 218 of the generated control information.

Next, the encapsulator 218 executes encapsulation processing for encapsulating the control information notified from the equipment controller 217 (step S213). The encapsulator 218 generates control notification information by adding header information, for specifying the control device 1 as the sending destination, to an electronic message obtained by encapsulating the control information. Then, the encapsulator 218 forwards the generated control notification information to the notification information sender 219. Next, the notification information sender 219 sends the control notification information generated by the encapsulator 218 to the control device 1 on the basis of the header information thereof (step S214). Then, the processing of step S201 is executed again.

As described above, according to the control system of the present embodiment, the cloud server 2 includes the equipment information storage 231 that stores the MAC address information that identifies the controlled equipment 3 on the datalink layer within the local network NW2 in association with the MAC address information that identifies the control device 1 on the datalink layer within the local network NW2. Moreover, the cloud server 2 sends, to the control device 1, the control parameter information generated by encapsulating the control information including the control parameter information, the MAC address information of the controlled equipment 3, and the MAC address information of the control device 1 stored in the equipment information storage 231. Additionally, upon receiving the control notification information, the control device 1 decapsulates the received control notification information to extract the control information, and sends the extracted control information to the controlled equipment 3 on the basis of the MAC address information of the controlled equipment 3 included in the control information. As a result, in cases in which the IP addresses assigned to the controlled equipments 3 change in the local network NW2, the control information can be appropriately sent to the controlled equipment 3 identified by the MAC address information included in the control information, without acquiring the IP address information.

Note that, in recent years, many control devices for controlling controlled equipments 3 are being used that have specifications that conform to the Echonet Lite standard established by the Echonet Consortium. This type of control device is connected to the local network NW2 constructed in a house, the communication protocol of the Internet layer is set to IPv4, IPv6, or the like, and this control device sends control information for which the communication protocol of the transport layer is set to UDP to the controlled equipment 3. A plurality of manufacturers manufacture controlled equipments 3 that have specifications conforming to the Echonet Lite standard and, as such, a control device manufactured by one of the plurality of manufacturers can control a controlled equipment 3 manufactured by another manufacturer. Additionally, controlled equipments 3 are being provided with multiple functions and, due to this, there is a demand for increased processing functions of the control device. As such, there is a demand for achieving a portion of the functions of the control device by the cloud server to reduce the processing load of the control device. However, adopting a configuration in which control information, for which the communication protocol of the transport layer that conforms to the Echonet Lite standard is set to UDP, is sent across the broadband network NW1 from the cloud server to the controlled equipment 3 without modification, the reliability of the control information acquired by the controlled device 3 may be low, which may lead to malfunctions of the controlled equipment 3.

To solve this problem, in the control system according to the present embodiment, the cloud server 2 sends the control notification information generated by encapsulating the control information to the control device 1 using a communication protocol that has higher reliability than UDP as the communication protocol of the transport layer. As a result, the reliability of the control information included in the control notification information in the communication between the cloud server 2 and the control device 1 is secured and, as such, the occurrence of malfunctions of the controlled device 3 caused by the reliability of the control information can be suppressed.

Additionally, in the control system according to the present embodiment, the equipment table information is managed in the cloud server 2. As a result, the need for the control device 1 to perform processing for identifying, on the basis of the equipment table information, the controlled equipment 3 as the control target by the control information acquired from the cloud server 2 is eliminated and, as such, the processing load of the control device 1 is reduced a corresponding amount.

According to the control device 1 according to the present embodiment, the equipment electronic message acquirer 113 acquires, from the controlled equipment 3, the equipment state information including the MAC address information and state parameter information expressing the state of the controlled equipment 3, and the encapsulator 114 generates the state notification information by adding the MAC address information of the control device 1 to the equipment state information and encapsulating and then adding the header information for specifying the cloud server 2 as the sending destination. Then, the notification information sender 115 sends the state notification information to the cloud server 2 on the basis of the header information of the state notification information. Meanwhile, at the cloud server 2, the notification information acquirer 211 acquires the state notification information from the control device 1, and the decapsulator 212 removes the header information from the state notification information and executes the decapsulation processing to extract the equipment state information. Then, the equipment controller 217 generates the control information on the basis of the state parameter information included in the equipment state information. Generating in the cloud server 2 control information for the controlled equipment 3 on the basis of the state parameter information that expresses the state of the controlled equipment 3 enables reducing the processing load of the control device 1 while appropriately controlling the controlled equipment 3 in accordance with the operating state thereof.

Furthermore, according to the control device 1 according to the present embodiment, when starting communication with the cloud server 2, the equipment table creation requester 112 generates the equipment table creation request information for requesting, to the cloud server 2, the creation of the equipment table information. Moreover, when the electronic message type determiner 216 of the cloud server 2 determines that the notification information acquirer 211 has acquired the equipment table creation request information, the equipment table creator 214 starts the creation of the equipment table information. This configuration provides a benefit of enabling reduction in the capacity of the equipment information storage 231, since storing only the equipment table information corresponding to the control device 1 that is communicable with the cloud server 2 as the equipment information storage stored in the equipment information storage 231 is sufficient.

The controlled equipment 3 according to the present embodiment sends the network joining notification information to the control device 1 when starting communication with the control device 1 across the local network NW2. Moreover, when the equipment electronic message acquirer 113 acquires the network joining notification information from the controlled equipment 3, the encapsulator 114 of the control device 1 generates the state notification information by encapsulating the network joining notification information and sends the state notification information to the cloud server 2. Additionally, in the cloud server 2, when the network joining notification information is included in the state notification information, the equipment identification information extractor 215 extracts the MAC address information of the controlled equipment 3 included in the network joining notification information, and the equipment table creator 214 updates the equipment table information by associating the MAC address information extracted by the equipment identification information extractor 215 with the MAC address information of the control device 1. As a result, the equipment table information is updated every time a new controlled equipment 3 connects to the local network NW2 and, as such, the control information generated by the cloud server 2 is appropriately sent to the controlled equipment 3 newly connected to the local network NW2. Accordingly, the occurrence of malfunctions of controlled equipments 3 newly connected to the local network NW2 is suppressed.

Embodiment 2

A control system according to the present embodiment differs from that of Embodiment 1 in that the control system includes a terminal device that communicates with a control device across a terminal local network different from the local network to which an equipment belongs. The terminal device includes the aforementioned equipment information storage that stores equipment table information; an equipment controller that generates control information; a second encapsulator that generates control notification information by encapsulating the control information and adding first header information for specifying the control device as a sending destination; and a notification information sender that sends the control notification information to the control device on the basis of the first header information. Additionally, the control device includes a mode switcher that performs switching to a server connection mode in which the control notification information sent from the server is acquirable, and switching to a terminal device connection mode in which the control notification information sent from the terminal device is acquirable.

Figure 16:
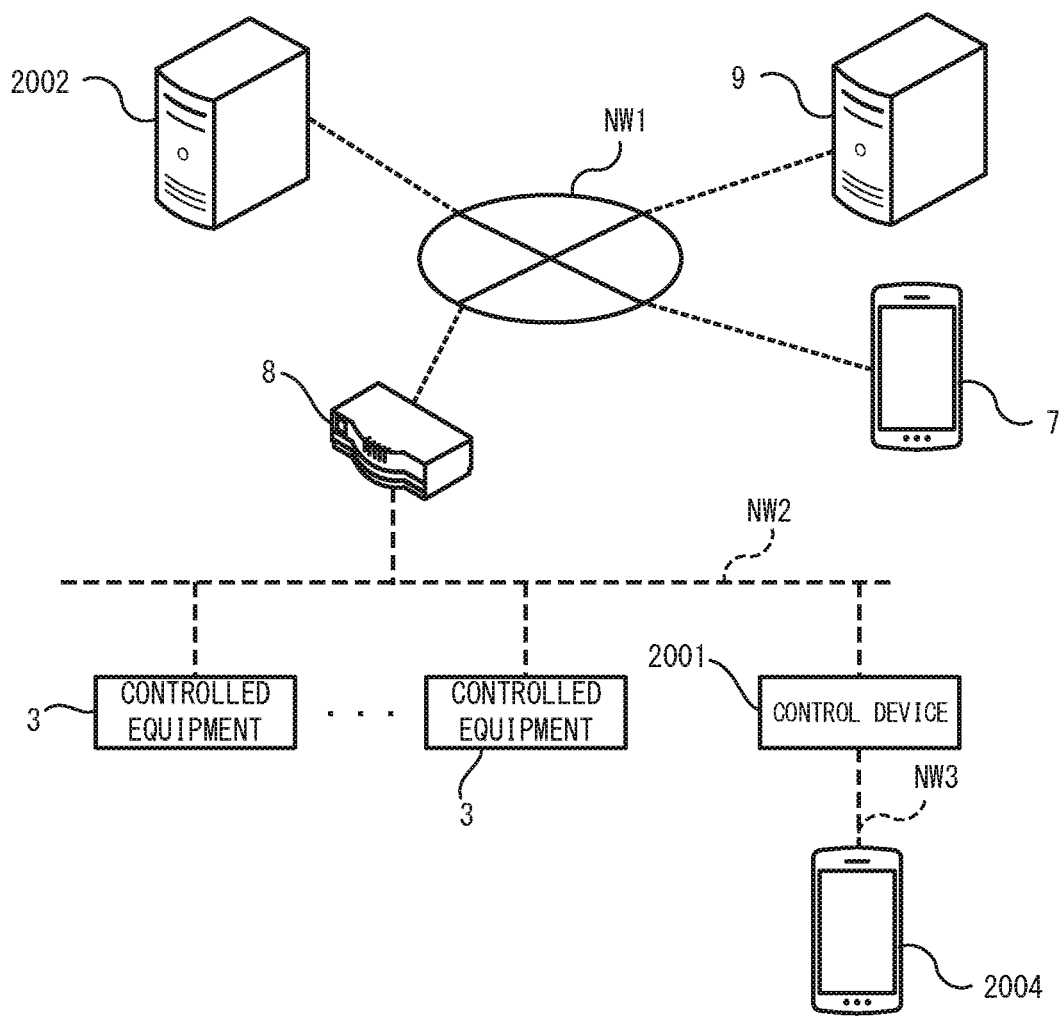
FIG. 16 is a schematic configuration drawing of a control system according to Embodiment 2 of the present disclosure.

As illustrated in FIG. 16, the control system according to the present embodiment includes a controlled equipment 3, a control device 2001 that controls the controlled equipment 3, a cloud server 2002, and a terminal device 2004. Note that, in FIG. 16, the constituents that are the same as in Embodiment 1 are denoted with the same reference numerals as used in FIG. 1. The terminal device 2004 is communicable with the control device 2001 across a terminal local network NW3 different than the local network NW2 to which the controlled equipment 3 is connected. The control device 2001 carries out sending/receiving with the controlled equipment 3 of only information including one service set identifier (SSID) set in advance, and carries out sending/receiving with the terminal device 2004 of only information including a SSID different than the SSID included in the information sent/received with the controlled equipment 3. As in Embodiment 1, the cloud server 2002 can communicate via the broadband network NW1 and the BBR 8.

Figure 17:
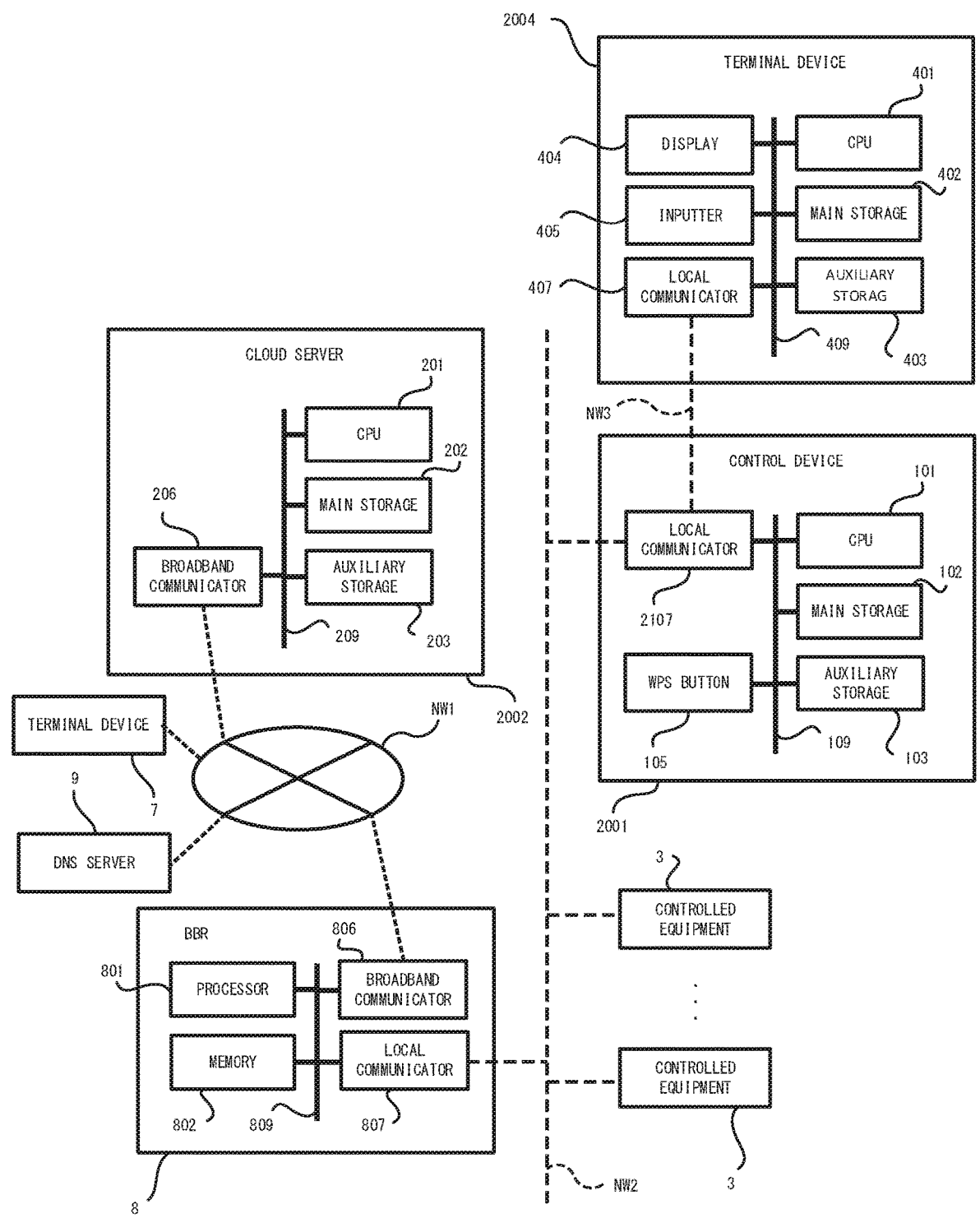
FIG. 17 is a block diagram illustrating the hardware configuration of the control system according to Embodiment 2.

The control device 2001 controls the controlled equipment 3 on the basis of control information acquired from the cloud server 2002 or the terminal device 2004. As illustrated in FIG. 17, the control device 2001 includes a CPU 101, a main storage 102, an auxiliary storage 103, a WPS button 105, a local communicator 2107, and a bus 109. Note that, in FIG. 17, the constituents that are the same as in Embodiment 1 are denoted with the same reference numerals as used in FIG. 2. The local communicator 2107 communicates with the BBR 8 across the local network NW2 when the connection mode of the control device 2001 is the server connection mode (hereinafter referred to as "STA mode"). Meanwhile, the local communicator 2107 communicates with the terminal device 2004 across the terminal local network NW3 when the connection mode of the control device 2001 is the terminal device connection mode (hereinafter referred to as "AP mode").

Figure 18:
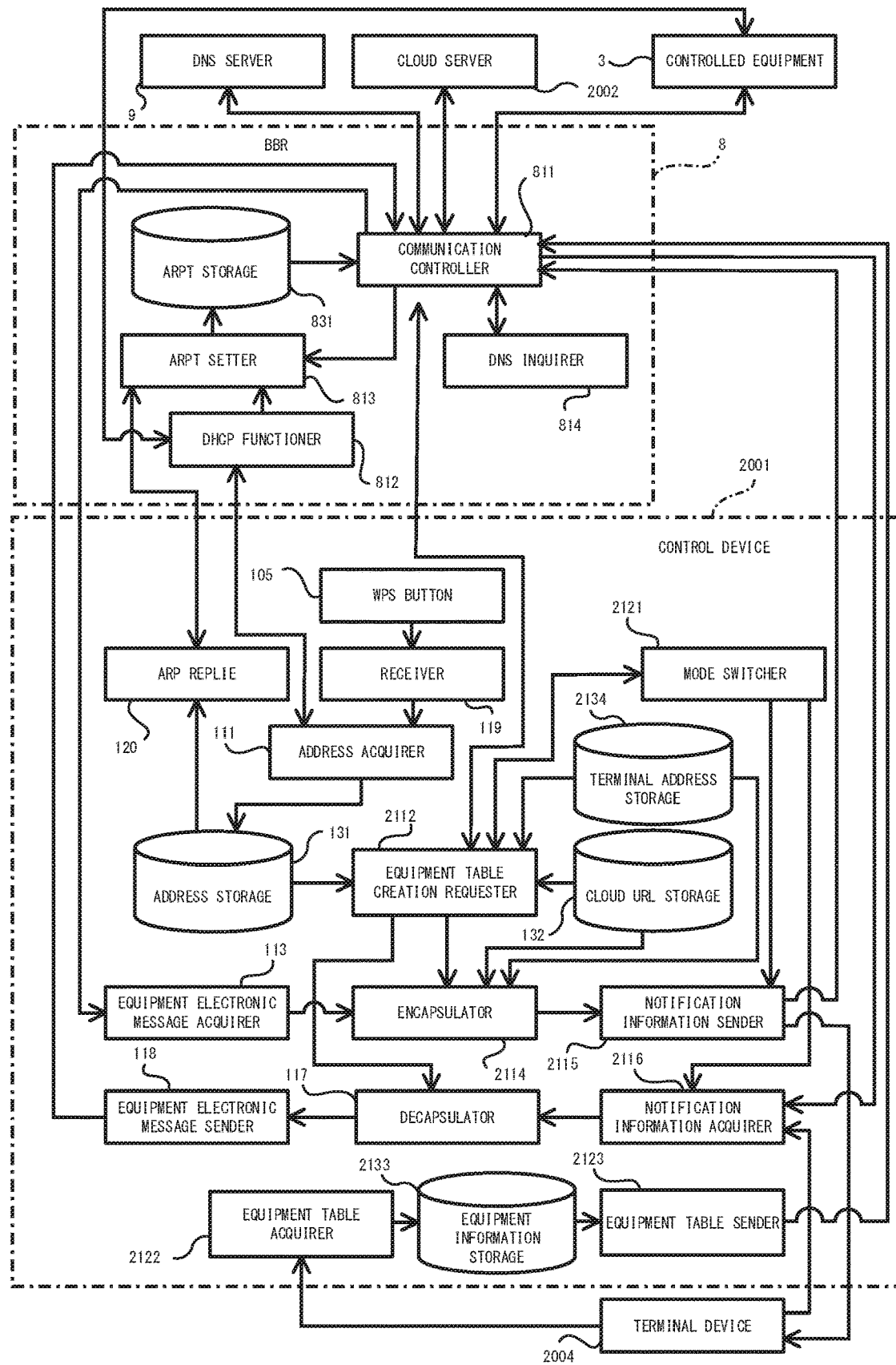
FIG. 18 is a block diagram illustrating the functional configuration of a control device and a broadband router according to Embodiment 2.

In the control device 2001, the CPU 101 reads out the program stored in the auxiliary storage 103 to the main storage 102 and executes the program to function as an address acquirer 111, an equipment table creation requester 2112, an equipment electronic message acquirer 113, an encapsulator 2114, a notification information sender 2115, a notification information acquirer 2116, a decapsulator 117, an equipment electronic message sender 118, a receiver 119, an ARP replier 120, a mode switcher 2121, an equipment table acquirer 2122, and an equipment table sender 2123, as illustrated in FIG. 18. Note that, in FIG. 18, the constituents that are the same as in Embodiment 1 are denoted with the same reference numerals as used in FIG. 3. Additionally, as illustrated in FIG. 18, the auxiliary storage 103 illustrated in FIG. 17 includes an address storage 131, a cloud URL storage 132, an equipment information storage 2133, and a terminal address storage 2134. The equipment information storage 2133 stores equipment table information sent from the terminal device 2004. The terminal address storage 2134 stores address information of the terminal device 2004.

When starting communication with the cloud server 2002, the equipment table creation requester 2112 generates equipment table creation request information for requesting, to the cloud server 2002, creation of equipment table information, and sends the equipment table creation request information to the cloud server 2002. Here, after the equipment table creation requester 2112 sends the equipment table creation request information, when preparation completion notification information is not acquired from the cloud server 2002 in a predetermined wait time, the equipment table creation requester 2112 notifies the mode switcher 2121 of unable to connect to server notification information expressing that connecting to the cloud server 2002 is impossible. Moreover, when the equipment table creation requester 2112 is notified, from the mode switcher 2121, of AP mode switch notification information described later, the equipment table creation requester 2112 generates equipment table creation request information for requesting, to the terminal device 2004, creation of equipment table information, and sends the equipment table creation request information to the terminal device 2004. Additionally, when the equipment table creation requester 2112 acquires preparation completion notification information sent from the terminal device 2004, the equipment table creation requester 2112 notifies the encapsulator 2114 and the decapsulator 117 of the acquired preparation completion notification information.

The encapsulator 2114 encapsulates after adding the MAC address information of the control device 2001 to an equipment electronic message acquired from the controlled equipment 3. Additionally, the encapsulator 2114 generates state notification information by, in accordance with the connection mode of the control device 2001, adding header information for specifying the cloud server 2002 as the sending destination or adding header information for specifying the terminal device 2004 as the sending destination. Here, the header information for specifying the terminal device 2004 as the sending destination includes the address information of the terminal device 2004 acquired from the terminal address storage 2134 by the encapsulator 2114.

The mode switcher 2121 performs switching of the connection mode of the control device 2001 to the server connection mode (hereinafter referred to as "STA mode") and switching of the connection mode of the control device 2001 to the terminal device connection mode (hereinafter referred to as "AP mode"). Here, the STA mode is a connection mode in which the preparation completion notification information, control notification information, and the like sent from the cloud server 2002 are acquirable by the control device 2001, and the AP mode is a connection mode in which the preparation completion notification information, control notification information, and the like sent from the terminal device 2004 are acquirable by the control device 2001. In the case of switching the connection mode of the control device 2001 from the STA mode to the AP mode, the mode switcher 2121 notifies the equipment table creation requester 2112, the notification information sender 2115, and the notification information acquirer 2116 of AP mode switch notification information. Meanwhile, in the case of switching the connection mode of the control device 2001 from the AP mode to the STA mode, the mode switcher 2121 notifies the equipment table creation requester 2112, the notification information sender 2115, and the notification information acquirer 2116 of STA mode switch notification information.

The notification information sender 2115 is a third notification information sender that, when the connection mode is set to the STA mode, sends, to the cloud server 2002, the state notification information forwarded from the encapsulator 2114. Conversely, when the connection mode is set to the AP mode, the notification information sender 2115 sends, to the terminal device 2004, the state notification information forwarded from the encapsulator 2114.

In a case in which the connection mode is set to the STA mode, upon receiving from the cloud server 2002 the control notification information in which the control device 2001 is set as the sending destination, the notification information acquirer 2116 forwards the received control notification information to the decapsulator 117. Conversely, in a case in which the connection mode is set to the AP mode, upon receiving from the terminal device 2004 the control notification information in which the control device 2001 is set as the sending destination, the notification information acquirer 2116 forwards the received control notification information to the decapsulator 117.

In a case in which the connection mode is set to the AP mode, upon acquiring the equipment table information sent from the terminal device 2004, the equipment table acquirer 2122 stores the acquired equipment table information in the equipment information storage 2133. In a case in which the connection mode is set to the STA mode, the equipment table sender 2123 sends the equipment table information stored in the equipment information storage 2133 to the cloud server 2002 via the BBR 8.

Returning to FIG. 17, the terminal device 2004 is, for example, a smartphone, and includes a CPU 401, a main storage 402, an auxiliary storage 403, a display 404, an inputter 405, a local communicator 407, and a bus 409 that connects the various components. The main storage 402 includes volatile memory, and is used as a working area of the CPU 401. The auxiliary storage 403 is non-volatile memory, and stores a program for the CPU 401 to execute various processes. The display 404 is a display device such as a liquid crystal display or an organic electro luminescence (EL) display. The inputter 405 is, for example, a transparent touch pad disposed stacked on the display 404. The local communicator 407 is connected to the terminal local network NW3, sends information forwarded from the CPU 401 to the control device 2001 across the terminal local network NW3, and forwards information received across the terminal local network NW3 from the control device 2001 to the CPU 401.

Figure 19:
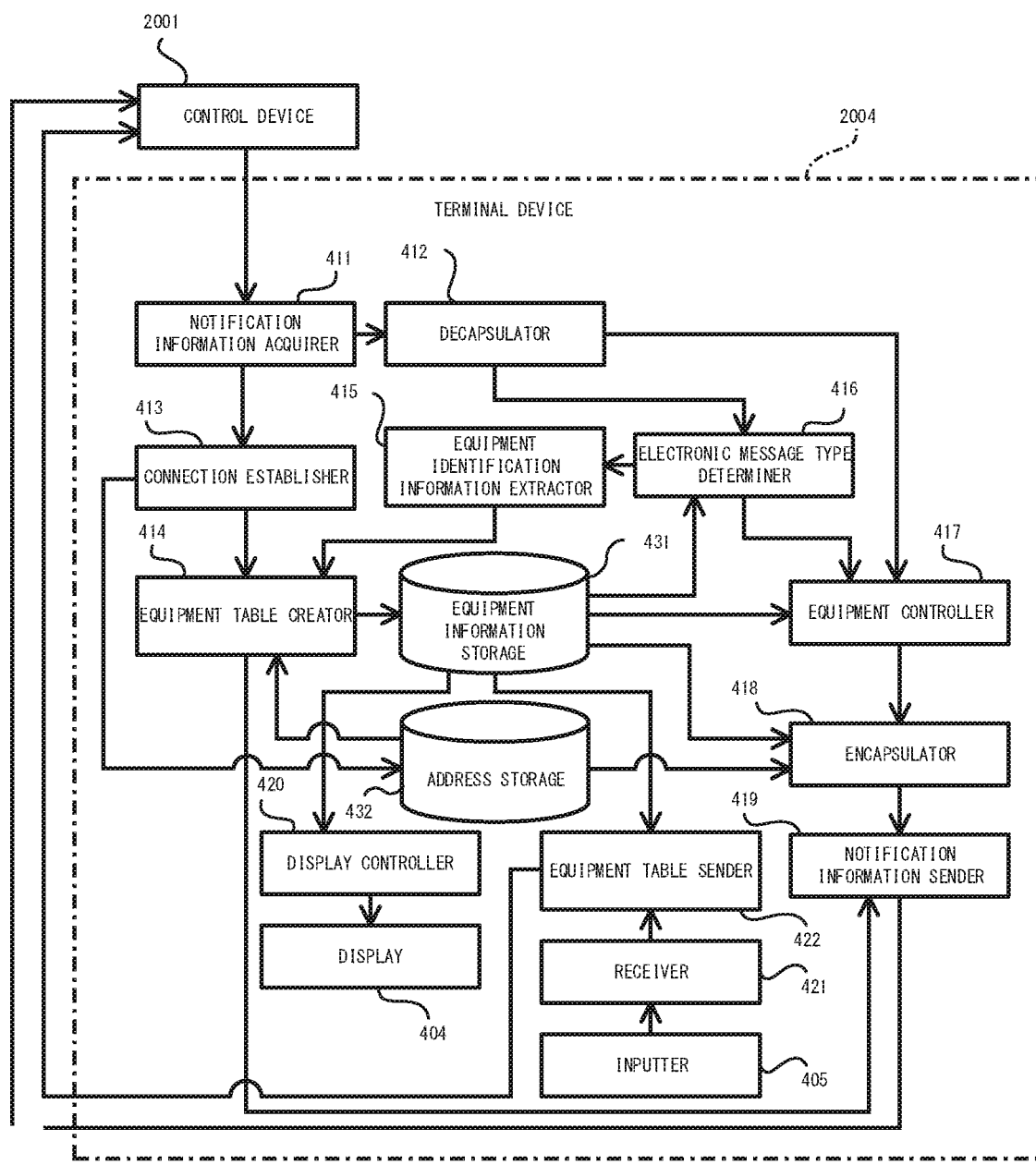
FIG. 19 block diagram illustrating the functional configuration of a terminal device according to Embodiment 2.

With the terminal device 2004, the CPU 401 reads out the program stored in the auxiliary storage 403 to the main storage 402 and executes the program to function as a notification information acquirer 411, a decapsulator 412, a connection establisher 413, an equipment table creator 414, an equipment identification information extractor 415, an electronic message type determiner 416, an equipment controller 417 that is a second equipment controller, an encapsulator 418, a notification information sender 419, a display controller 420, a receiver 421, and an equipment table sender 422, as illustrated in FIG. 19. Additionally, as illustrated in FIG. 19, the auxiliary storage 403 illustrated in FIG. 17 includes an equipment information storage 431 and an address storage 432. The equipment information storage 431 is a second equipment information storage that stores the equipment table information described above. Here, the equipment table information stored in the equipment information storage 431 is, for example, information that reflects the settings at the time of manufacture of the controlled equipment 3. However, this equipment table information is not limited to information that reflects the settings at the time of manufacture of the controlled equipment 3. The address storage 432 stores the address information of the control device 2001.

The notification information acquirer 411 acquires, from the control device 2001, the state notification information to which the header information including the IP address information of the terminal device 2004 is added. Additionally, the notification information acquirer 411 determines whether the equipment table creation request information is acquired. Moreover, when determining that the equipment table creation request information is acquired, the notification information acquirer 411 forwards the acquired equipment table creation request information to the connection establisher 413. Furthermore, upon acquiring the state notification information from the control device 2001, the notification information acquirer 411 forwards the acquired state notification information to the decapsulator 412 that is a third decapsulator. The decapsulator 412, the connection establisher 413, the equipment table creator 414, the equipment identification information extractor 415, the electronic message type determiner 416, and the equipment controller 417 respectively have the same functions as the decapsulator 212, the connection establisher 213, the equipment table creator 214, the equipment identification information extractor 215, the electronic message type determiner 216, and the equipment controller 217 of the cloud server 2 described in Embodiment 1.

The equipment controller 417 generates control information including control parameter information for controlling the controlled equipment 3, the MAC address information of the controlled equipment 3 as the control target, and the MAC address information of the control device 2001 corresponding to the MAC address information of the controlled equipment 3 as the control target that is stored in the equipment information storage 431. Here, the equipment controller 417 determines, on the basis of the equipment state information notified by the decapsulator 412 or whether operation change command information is received from the terminal device 7, whether a change of the operating settings of the controlled equipment 3 corresponding to that equipment state information is necessary. Moreover, when determining that a change of the operating settings of the controlled equipment 3 is necessary, the equipment controller 417 generates the control information described above, and notifies the encapsulator 418 of the generated control information.

The encapsulator 418 is a third encapsulator that generates the control notification information by encapsulating the control information notified by the equipment controller 417 and adding header information for specifying the control device 2001 as the sending destination. The notification information sender 419 sends the control notification information generated by the encapsulator 418 to the control device 2001 on the basis of the header information, that is third header information, for specifying the control device 2001 as the sending destination. Additionally, when the preparation completion notification information is forwarded from the equipment table creator 414, the notification information sender 419 sends that preparation completion notification information to the control device 2001.

The display controller 420 causes the display 404 to display the equipment table information stored in the equipment information storage 431. When, for example, the user performs an operation on the inputter 405 for sending the equipment table information to the cloud server 2002 while referencing the equipment table information displayed on the display 404, the receiver 421 receives that operation and notifies the equipment table sender 422 of operation information expressing the operation content thereof. Upon notification of the operation information expressing the operation for sending the equipment table information from the receiver 421 to the cloud server 2002, the equipment table sender 422 sends the equipment table information stored in the equipment information storage 431 to the control device 2001.

Figure 20:
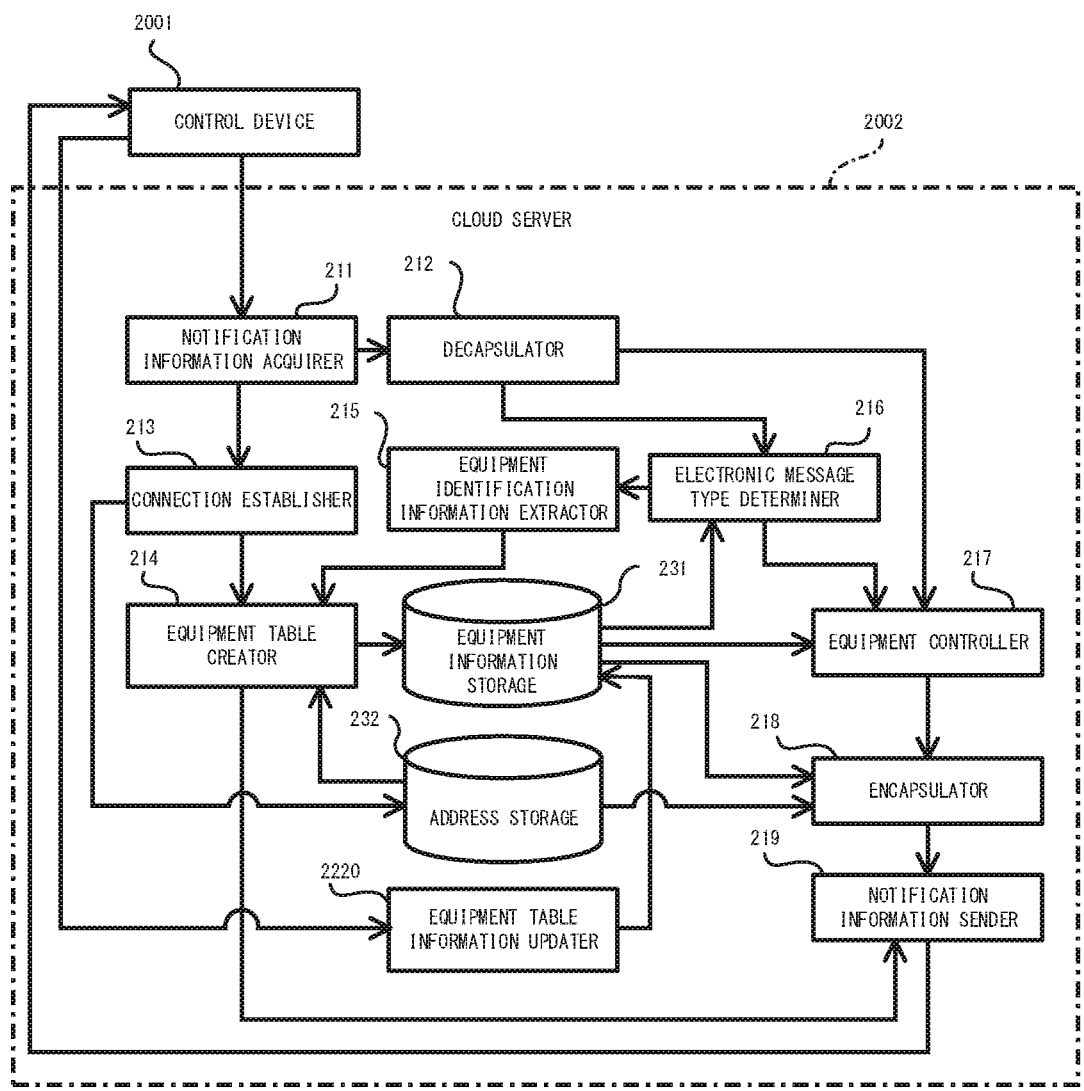
FIG. 20 is a block diagram illustrating the functional configuration of a cloud server according to Embodiment 2.

Returning to FIG. 17, the cloud server 2002 includes a CPU 201, a main storage 202, an auxiliary storage 203, a broadband communicator 206, and a bus 209 that connects the various components. With the cloud server 2002, the CPU 201 reads out the program stored in the auxiliary storage 203 to the main storage 202 and executes the program to function as a notification information acquirer 211, a decapsulator 212, a connection establisher 213, an equipment table creator 214, an equipment identification information extractor 215, an electronic message type determiner 216, an equipment controller 217 that is a first equipment controller, an encapsulator 218, a notification information sender 219, and an equipment table information updater 2220, as illustrated in FIG. 20. Additionally, as illustrated in FIG. 20, the auxiliary storage 203 illustrated in FIG. 17 includes an equipment information storage 231 and an address storage 232. The equipment information storage 231 is a first equipment information storage that stores the equipment table information. Upon acquiring the equipment table information from the control device 2001, the equipment table information updater 2220 uses the acquired equipment table information to update the equipment table information stored in the equipment information storage 231.

Figure 21:
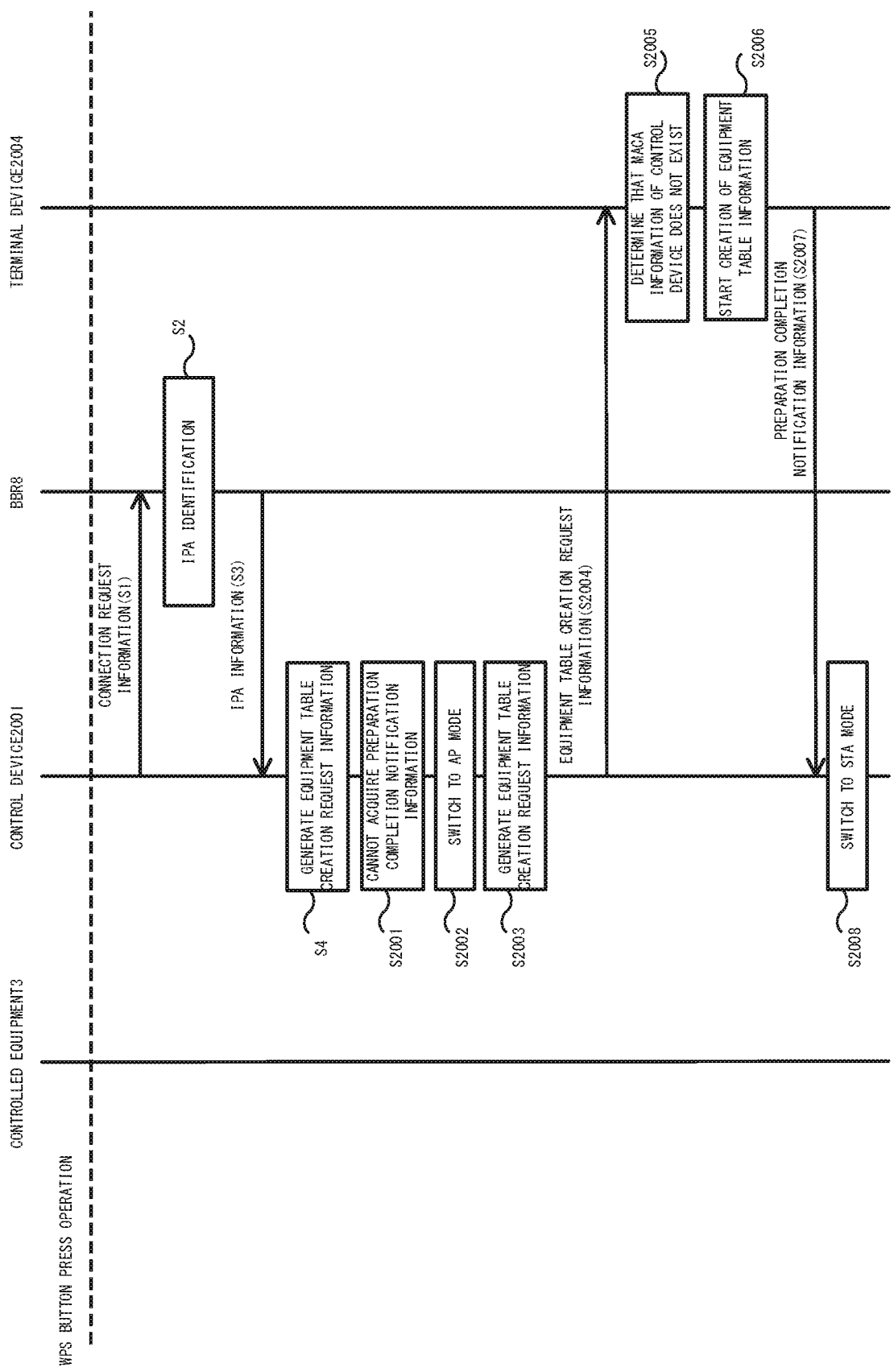
FIG. 21 is a sequence drawing illustrating operations of the control system according to Embodiment 2.
Figure 22:
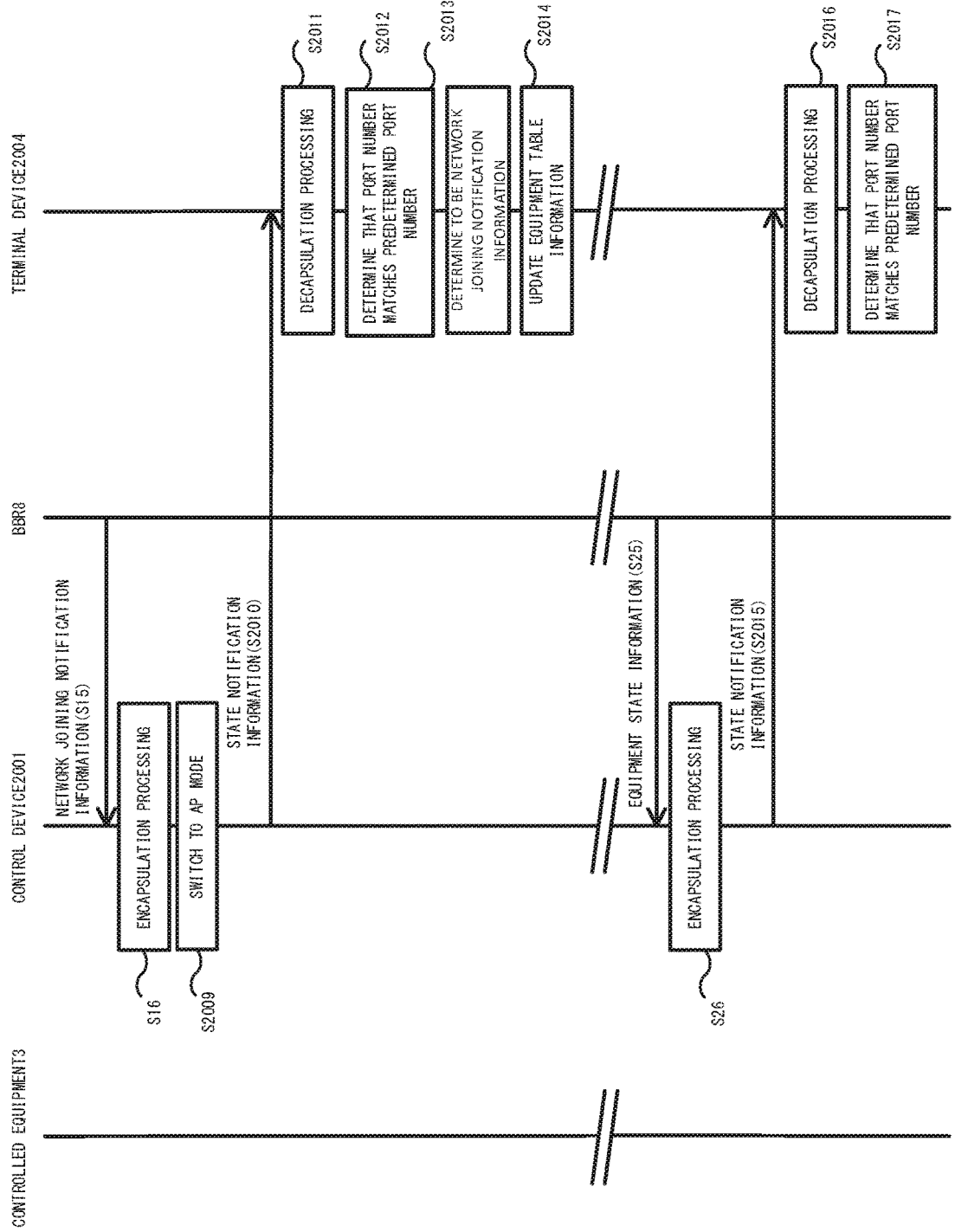
FIG. 22 is a sequence drawing illustrating operations of the control system according to Embodiment 2.
Figure 23:
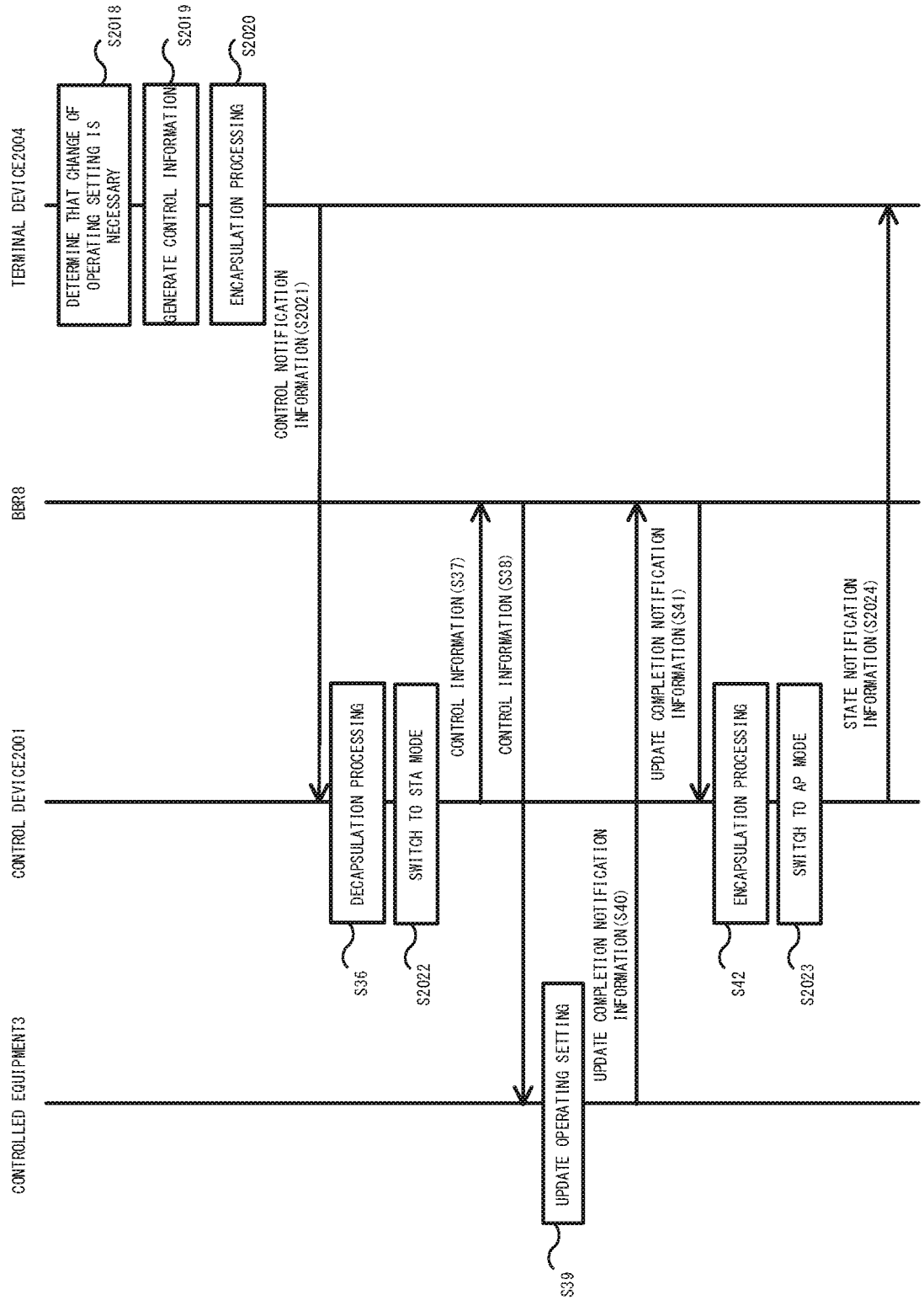
FIG. 23 is a sequence drawing illustrating operations of the control system according to Embodiment 2.

Next, the operations of the control system according to the present embodiment are described while referencing to FIGS. 21 to 23. Note that, in FIGS. 21 to 23, the processes that are the same as in Embodiment 1 are denoted with the same reference numerals as used in FIGS. 6, 8, and 11. Additionally, it is assumed that the control device 2001 is initially set to the STA mode described above. Firstly, as illustrated in FIG. 21, the series of processing from step S1 to S3 is executed and, thereafter, the control device 2001 generates equipment table creation request information for requesting, to the cloud server 2002, the creation of equipment table information (step S4). Here, it is assumed that, after the generated equipment table creation request information is sent addressed to the cloud server 2002, the control device 2001 determines that acquisition of the preparation completion notification information from the cloud server 2002 within the predetermined wait time is impossible (step S2001). In this case, the control device 2001 switches to the AP mode described above (step S2002). Next, the control device 2001 generates equipment table creation request information addressed to the terminal device 2004 (step S2003). Then, the generated equipment table creation request information is sent across the terminal local network NW3 from the control device 2001 to the terminal device 2004 (step S2004).

Meanwhile, upon receiving the equipment table creation request information sent from the control device 2001, the terminal device 2004 extracts the MAC address information of the control device 2001 from the equipment table creation request information. Thereafter, it is assumed that the terminal device 2004 determines that the MAC address information of the control device 2001 included in the equipment table creation request information does not exist in the MAC address information stored in the equipment information storage 431 (step S2005). In this case, the terminal device 2004 starts the creation of equipment table information corresponding to the control device 2001 (step S2006). Next, preparation completion notification information notifying that the preparation for creating the equipment table information is completed is sent from the terminal device 2004 to the control device 2001 (step S2007). Meanwhile, upon acquiring the preparation completion notification information, the control device 2001 switches the connection mode to the STA mode (step S2008).

It is assumed that the user performs a controlled equipment connection operation for newly connecting a controlled equipment 3 to the local network NW2 and, as a result, the series of processing of steps S11 to S14 described in Embodiment 1 is executed. In this case, as illustrated in FIG. 22, network joining notification information notifying that the controlled equipment 3 has newly connected to the local network NW2 is sent from the BBR 8 to the control device 2001 (step S15). Meanwhile, upon acquiring the network joining notification information, the control device 2001 executes encapsulation processing for adding the MAC address information of the control device 2001 to the network joining notification information and encapsulating the network joining notification information (step S16). Next, the control device 2001 switches the connection mode to the AP mode (step S2009). Thereafter, the generated state notification information is sent from the control device 2001 to the terminal device 2004 (step S2010).

Meanwhile, upon receiving the state notification information sent from the control device 2001, the terminal device 2004 executes the decapsulation processing for removing the header information from the state notification information and decapsulating (step S2011). Next, it is assumed that the terminal device 2004 determines that the port number information of the control device 2001 that is the sending destination and the port number information of the controlled equipment 3 that is the sender included in the network joining notification information match the predetermined port number information (step S2012). Moreover, it is assumed that the terminal device 2004 determines that the electronic message included in the state notification information acquired from the control device 2001 is the network joining notification information (step S2013). In this case, the terminal device 2004 extracts the MAC address information, the IP address information, the equipment type information SEOJ, and the identification number information included in the property information EDT of the controlled equipment 3 that is the sender included in the network joining notification information. Then, the terminal device 2004 uses the extracted MAC address information, IP address information, equipment type information SEOJ, and identification number information of the controlled equipment 3 to update the equipment table information stored in the equipment information storage 431 (step S2014).

Additionally, it is assumed that, after the controlled equipment 3 is connected to the local network NW2, the processing of steps S23 and S24 described in Embodiment 1 is executed. In this case, the equipment state information is sent from the BBR 8 to the control device 2001 (step S25). Meanwhile, upon acquiring the equipment state information, the control device 2001 executes the encapsulation processing for encapsulating the equipment state information (step S26). At this time, the control device 2001 adds header information for specifying the terminal device 2004 as the sending destination. As a result, state notification information obtained by adding header information, including the IP address information of the terminal device 2004 as the destination IP address, to the equipment state information is generated.

Thereafter, the generated state notification information is sent from the control device 2001 to the terminal device 2004 (step S2015). Meanwhile, upon receiving the state notification information sent from the control device 2001, the terminal device 2004 removes the header information from the state notification information and executes the decapsulation processing (step S2016). As a result, the terminal device 2004 extracts the equipment state information from the state notification information. Next, it is assumed that the terminal device 2004 determines that the port number information of the control device 2001 that is the sending destination and the port number information of the controlled equipment 3 that is the sender included in the equipment state information match the predetermined port number information (step S2017). Moreover, as illustrated in FIG. 23, it is assumed that the terminal device 2004 determines, on the basis of the state of the controlled equipment 3 expressed in the equipment state information, that a setting change of the controlled equipment 3 is necessary (step S2018). In this case, the terminal device 2004 generates control information for changing the setting of the controlled equipment 3 for which a determination is made that the setting change is necessary (step S2019). Next, the terminal device 2004 executes encapsulation processing for encapsulating the generated control information (step S2020). At this time, the terminal device 2004 adds header information for specifying the control device 2001 as the sending destination.

Thereafter, the generated state notification information is sent from the terminal device 2004 to the control device 2001 (step S2021). Meanwhile, upon receiving the control notification information sent from the terminal device 2004, the control device 2001 executes the decapsulation processing for removing the header information from the state notification information and decapsulating (step S36). Next, the control device 2001 switches the connection mode to the STA mode (step S2022). Then, the control information extracted from the control notification information as a result of the decapsulation processing is sent from the control device 2001 to the BBR 8 (step S37). Thereafter, the series of processing from step S38 to step S41 described in Embodiment 1 is executed. Next, upon acquiring the update completion notification information, the control device 2001 executes the encapsulation processing for encapsulating the update completion notification information (step S42). At this time, the control device 2001 adds, to the update completion notification information, header information for specifying the terminal device 2004 as the sending destination, thereby generating the state notification information. Next, the control device 2001 switches the connection mode to the AP mode (step S2023). Thereafter, the generated state notification information is sent from the control device 2001 to the terminal device 2004 (step S2024).

Figure 24:
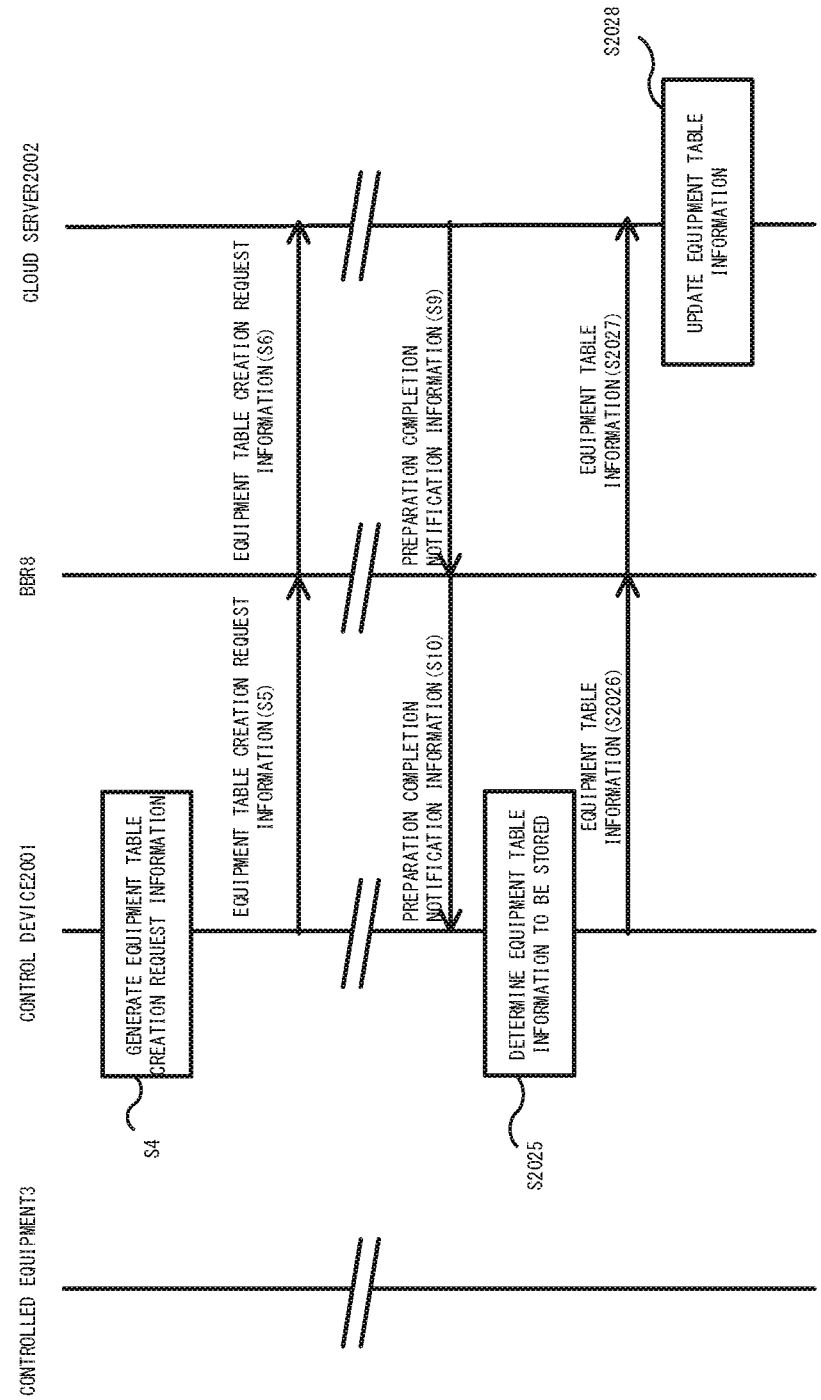
FIG. 24 is a sequence drawing illustrating operations of the control system according to Embodiment 2.

Additionally, as illustrated in FIG. 24, the control device 2001 generates equipment table creation request information for requesting, to the cloud server 2002, the creation of the equipment table information (step S4), the generated equipment table creation request information is sent from the control device 2001 to the BBR 8 (step S5) and then is sent from the BBR 8 to the cloud server 2002 (step S6). In this case, the series of processing from step S6 to step S9 described in Embodiment 1 is executed, and, thereafter, the preparation completion notification information is sent from the BBR 8 to the control device 2001 (step S10). Here, it is assumed that the control device 2001 determines that the equipment table information is stored in the equipment information storage 2133 (step S2025). In this case, it is assumed that the equipment table information stored in the in equipment information storage 2133 is sent from the control device 2001 to the BBR 8 (step S2026) and then is sent from the BBR 8 to the cloud server 2002 (step S2027). Meanwhile, upon acquiring the equipment table information sent from the control device 2001, the cloud server 2002 uses the acquired equipment table information to update the equipment table information stored in the equipment information storage 231 (step S2028).

Figure 25:
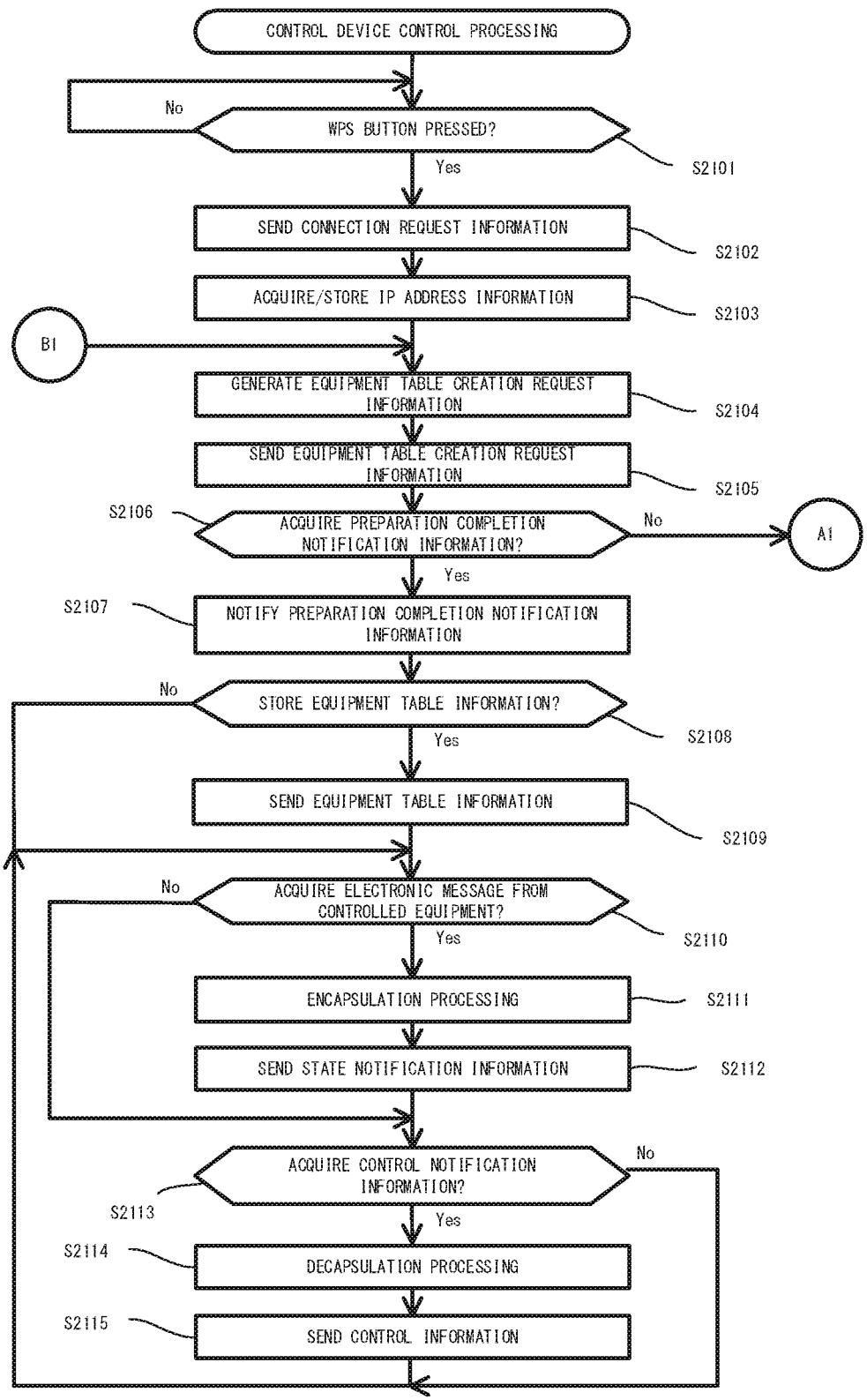
FIG. 25 is a flowchart illustrating an example of the flow of control device control processing executed by the control device according to Embodiment 2.
Figure 26:
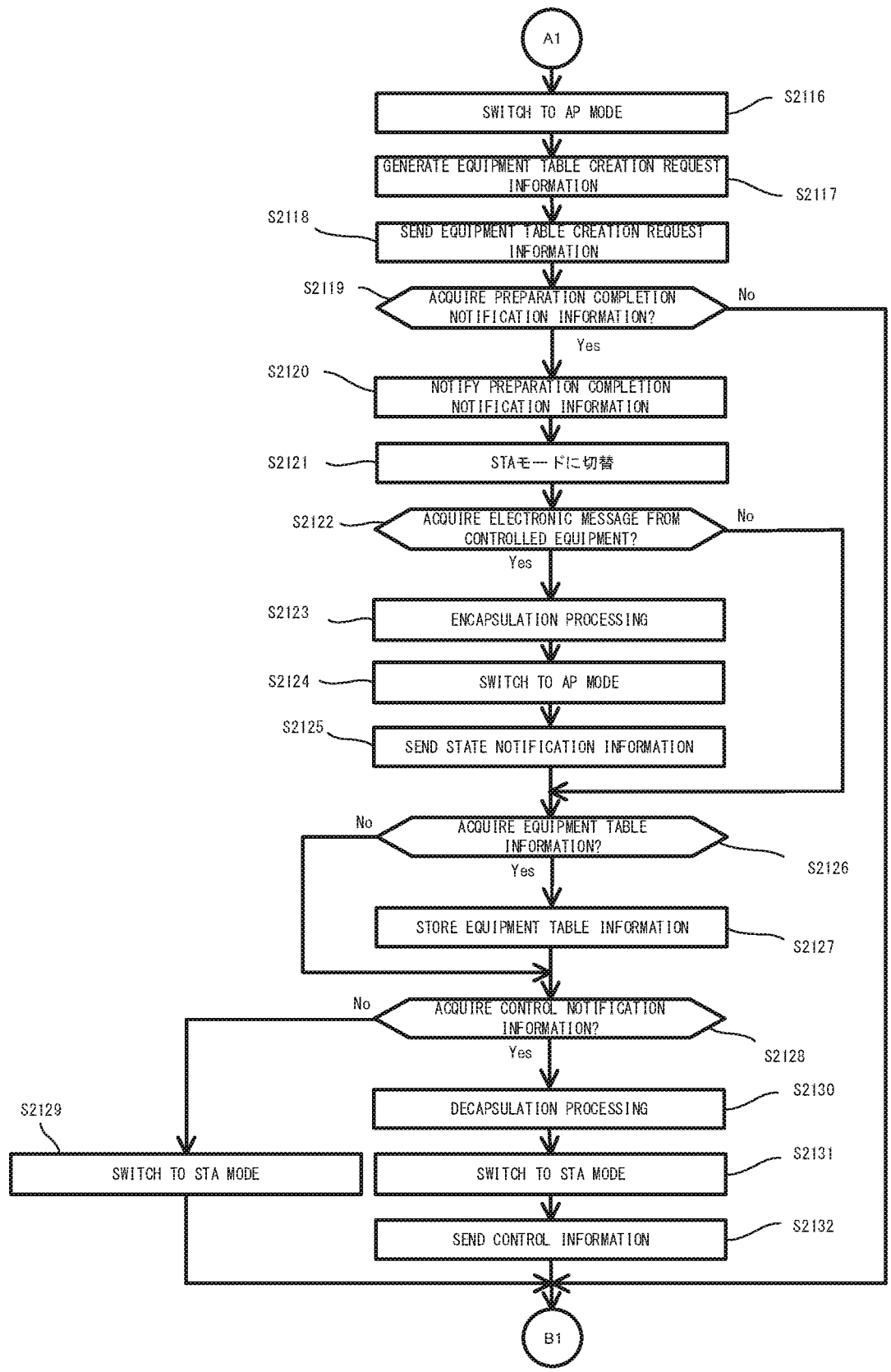
FIG. 26 is a flowchart illustrating an example of the flow of the control device control processing executed by the control device according to Embodiment 2.

Next, control device control processing executed by the control device 2001 according to the present embodiment is described while referencing FIGS. 25 and 26. As in Embodiment 1, this control device control processing starts when the power to the control device 2001 is turned ON, and the control device 2001 is arranged at a location at which connecting to the local network NW2 is possible. Additionally, it is assumed that connection mode of the control device 2001 is initially set to the STA mode described above. Firstly, as illustrated in FIG. 25, the series of processing from step S2101 to step S2104 is executed. Note that, the processings from step S2101 to step S2104 are respectively the same as the processings from step S101 to step S104 described in Embodiment 1. Next, the equipment table creation requester 2112 sends the generated equipment table creation request information to the cloud server 2002 on the basis of the header information thereof (step S2105). Next, after sending the equipment table creation request information to the cloud server 2002, the equipment table creation requester 2112 determines whether the preparation completion notification information described above is acquired within the predetermined wait time (step S2106). Here, when determining that the preparation completion notification information is acquired from the cloud server 2002 via the BBR 8 (step S2106; Yes), the equipment table creation requester 2112 notifies the encapsulator 2114 and the decapsulator 117 of the acquired preparation completion notification information (step S2107).

Thereafter, the equipment table sender 2123 determines whether the equipment information storage 2133 is storing the equipment table information (step S2108). Here, when the equipment table sender 2123 determines that the equipment information storage 2133 is not storing the equipment table information (step S2108; No), the processing of hereinafter described step S2110 is executed without modification. Conversely, when determining that the equipment information storage 2133 is storing the equipment table information (step S2108; Yes), the equipment table sender 2123 sends that equipment table information to the cloud server 2002 (step S2109). Next, the series of processing from step S2110 to step S2115 is executed. Here, the processings from step S2110 to step S2115 are respectively the same as the processings from step S107 to step S112 connected in Embodiment 1.

Additionally, it is assumed that, in step S2106, the equipment table creation requester 2112 determines that the preparation completion notification information could not be acquired from the cloud server 2002 via the BBR 8 within the wait time described above (step S2106; No). In this case, as illustrated in FIG. 26, the mode switcher 2121 switches the connection mode of the control device 2001 to the AP mode described above (step S2116). Next, the equipment table creation requester 2112 generates equipment table creation request information for requesting, to the terminal device 2004, the creation of the equipment table information (step S2117). Here, the equipment table creation requester 2112 acquires the address information of the terminal device 2004 from the terminal address storage 2134, and generates equipment table creation request information to which header information including the acquired address information is added. Next, the equipment table creation requester 2112 sends the generated equipment table creation request information to the terminal device 2004 on the basis of the header information thereof (step S2118). Then, after sending the equipment table creation request information to the terminal device 2004, the equipment table creation requester 2112 determines whether the preparation completion notification information described above is acquired within the wait time described above (step S2119). Here, when the equipment table creation requester 2112 determines that the preparation completion notification information could not be acquired from the terminal device 2004 within the wait time described above (step S2119; No), the processing of step S2104 described above is executed again.

Conversely, when determining that the preparation completion notification information is acquired from the terminal device 2004 (step S2119; Yes), the equipment table creation requester 2112 notifies the encapsulator 2114 and the decapsulator 117 of the acquired preparation completion notification information (step S2120). Thereafter, the mode switcher 2121 switches the connection mode of the control device 2001 to the STA mode described above (step S2121). Next, the equipment electronic message acquirer 113 determines whether an equipment electronic message that includes the MAC address information of the controlled equipment 3 sent from the controlled equipment 3 is acquired (step S2122). When the equipment electronic message acquirer 113 determines that an electronic message sent from the controlled equipment 3 is not acquired (step S2122; No), the processing of step S2126 described later is executed. Conversely, when determining that an electronic message sent from the controlled equipment 3 is acquired (step S2122; Yes), the equipment electronic message acquirer 113 forwards the acquired electronic message to the encapsulator 2114. Then, the encapsulator 2114 executes the encapsulation processing for encapsulating the electronic message acquired from the controlled equipment 3 (step S2123). Here, the encapsulator 2114 adds, to the encapsulated electronic message, header information for specifying the terminal device 2004 as the sending destination. Specifically, the encapsulator 2114 acquires the address information of the terminal device 2004 terminal address storage 2134, and generates state notification information by adding header information including the acquired address information to the encapsulated electronic message. Then, the mode switcher 2121 switches the connection mode of the control device 2001 to the AP mode (step S2124). Thereafter, the notification information sender 2115 sends the state notification information generated by the encapsulator 2114 to the terminal device 2004 on the basis of the header information thereof (step S2125).

Next, the equipment table acquirer 2122 determines whether equipment table information sent from the terminal device 2004 is acquired (step S2126). Here, when the equipment table acquirer 2122 determines that the equipment table information is not acquired (step S2126; No), the processing of step S2128 described later is executed. Conversely, when determining that the equipment table information is acquired (step S2126; Yes), the equipment table acquirer 2122 stores the acquired equipment table information in the equipment information storage 2133 (step S2127).

Thereafter, the notification information acquirer 2116 determines whether control notification information in which the control device 2001 is set as the sending destination is acquired from the terminal device 2004 (step S2128). When the notification information acquirer 2116 determines that control notification information sent from the terminal device 2004 is not acquired (step S2128; No), the mode switcher 2121 switches the connection mode of the control device 2001 to the STA mode (step S2129). Then, the processing of step S2104 is executed again.

Conversely, when determining that control notification information sent from the terminal device 2004 is acquired (step S2128; Yes), the notification information acquirer 2116 forwards the acquired control notification information to the decapsulator 117. Then, when the control notification information is forwarded from the notification information acquirer 2116, the decapsulator 117 executes the decapsulation processing for removing the header information from the control notification information and decapsulating (step S2130). Next, the mode switcher 2121 switches the connection mode of the control device 2001 to the STA mode (step S2131). Then, the equipment electronic message sender 118 sends the control information including the MAC address information of the control device 2001 to the controlled equipment 3 on the basis of the MAC address information of the controlled equipment 3 included in the control information extracted by the decapsulator 117 (step S2132). Then, the processing of step S2104 is executed again.

Figure 27:
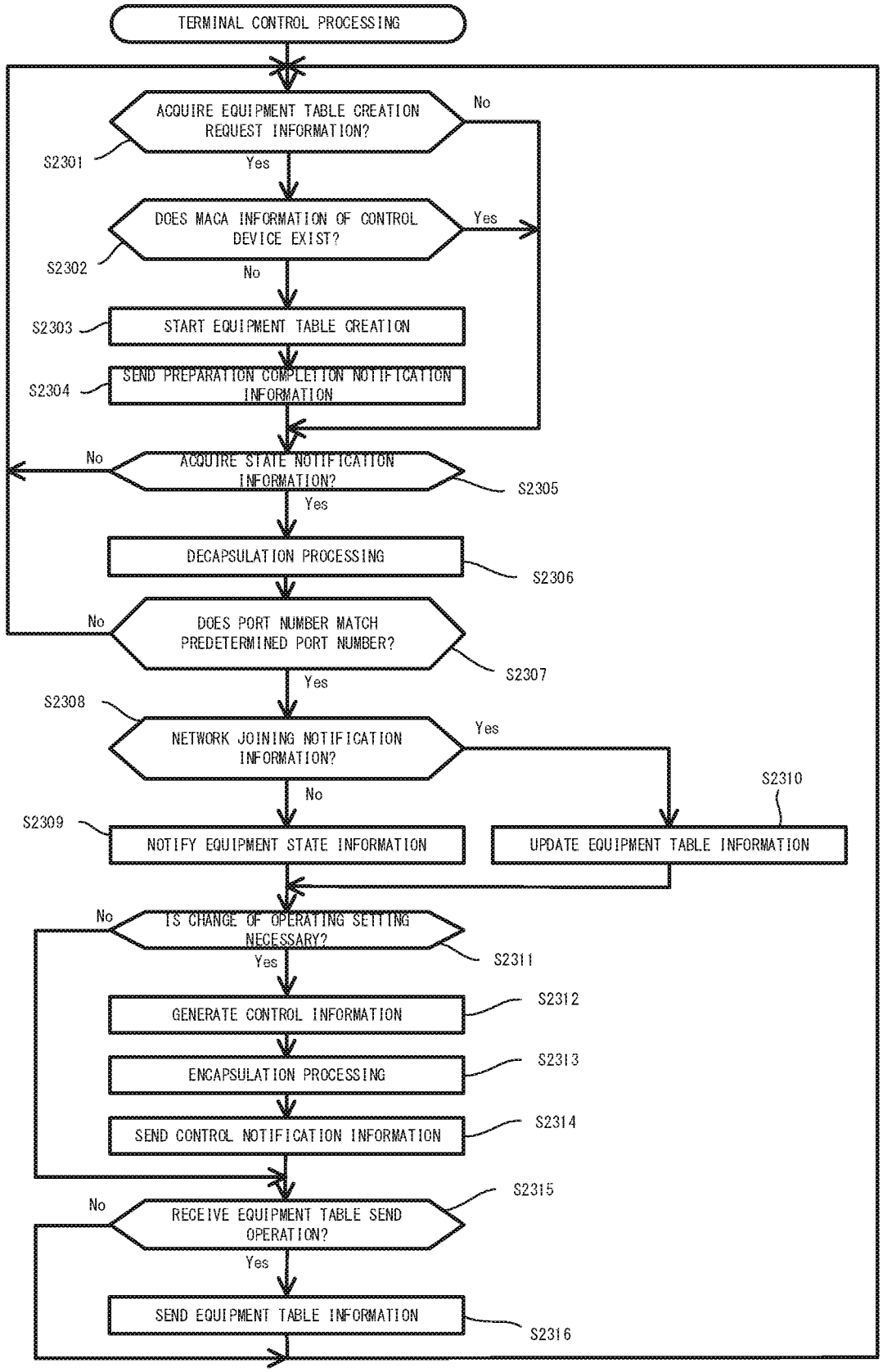
FIG. 27 is a flowchart illustrating an example of the flow of terminal control processing executed by the control device according to Embodiment 2.

Next, terminal control processing executed by the terminal device 2004 according to the present embodiment is described while referencing FIG. 27. This terminal control processing starts when, for example, an application for functioning as the control device 2001 is started up in the terminal device 2004. Firstly, the notification information acquirer 411 determines whether the equipment table creation request information addressed to the terminal device 2004 is acquired from the control device 2001 (step S2301). When the notification information acquirer 411 determines that the equipment table creation request information is not acquired (step S2301; No), the processing of step S2305 described later is executed.

Conversely, when the notification information acquirer 411 determines that the equipment table creation request information is acquired (step S2301; Yes), the equipment table creator 414 determines whether the MAC address information of the control device 2001 exists in the MAC address information stored in the equipment information storage 431 (step S2302). Here, when the equipment table creator 414 determines that the MAC address information of the control device 2001 exists in the MAC address information stored in the equipment information storage 431 (step S2302; Yes), the processing of step S2305 described later is executed. Conversely, when determining that the MAC address information of the control device 2001 does not exist in the MAC address information stored in the equipment information storage 431 (step S2302; No), the equipment table creator 414 starts the creation of equipment table information corresponding to the control device 2001 (step S2303). Then, the equipment table creator 414 generates the preparation completion notification information described above and forwards the generated preparation completion notification information to the notification information sender 419. Then, the notification information sender 419 sends, to the control device 2001, the preparation completion notification information forwarded from the equipment table creator 414 (step S2304).

Next, the notification information acquirer 411 determines whether, state notification information addressed to the terminal device 2004 is acquired from the control device 2001 (step S2305). When the notification information acquirer 411 determines that the state notification information addressed to the terminal device 2004 is not acquired (step S2305; No), the processing of S2301 is executed again. Conversely, when the notification information acquirer 411 determines that the state notification information addressed to the terminal device 2004 is acquired (step S2305; Yes), the notification information acquirer 411 forwards the acquired state notification information to the decapsulator 412. Then, the decapsulator 412 executes the decapsulation processing for the state notification information forwarded from the notification information acquirer 411 (step S2306). Here, the decapsulator 412 notifies the electronic message type determiner 416 of the equipment electronic message extracted in the decapsulation processing.

Meanwhile, the electronic message type determiner 416 determines whether the port number information of the sending destination and the port number information of the sender included in the header information of the equipment electronic message notified from the decapsulator 412 match the predetermined port number information (step S2307). Here, when the electronic message type determiner 416 determines that the port number information of the sending destination and the port number information of the sender included in the header information of the equipment electronic message notified from the decapsulator 412 do not match the predetermined port number information (step S2307; No), the processing of step S2301 is executed again. Conversely, when the electronic message type determiner 416 determines that the port number information of the sending destination and the port number information of the sender of the equipment electronic message notified from the decapsulator 412 match the predetermined port number information (step S2307; Yes), the series of processing from step S2308 to S2310 is executed. Note that the processings from step S2308 to step S2310 are respectively the same as the processings from step S208 to step S210 described in Embodiment 1.

Thereafter, the equipment controller 417 determines, on the basis of the equipment state information notified from the decapsulator 412 or whether an operating setting change command information is received from the terminal device 7, whether a change of the operating settings of the controlled equipment 3 corresponding to that equipment state information is necessary (step S2311). Here, when the equipment controller 417 determines that a change of the operating settings of the controlled equipment 3 is unnecessary (step S2311; No), the processing of step S2315 described later is executed. Conversely, it is assumed that the equipment controller 417 determines that a change of the operating settings of the controlled equipment 3 is necessary (step S2311; Yes). In this case, the processing of steps S2312 and S2313 is executed. Note that the processings of steps S2312 and S2313 are respectively the same as the processings of steps S212 and S213. Next, the notification information sender 419 sends the control notification information generated by the encapsulator 418 to the control device 2001 on the basis of the header information thereof (step S2314). Thereafter, the receiver 421 determines whether the above-described equipment table send operation performed by the user on the inputter 405 is received (step S2315). Here, when the operation receiver 421 determines that the equipment table send operation is not received (step S2315; No), the processing of step S2301 is executed again. Conversely, when the receiver 421 determines that the equipment table send operation is received (step S2315; Yes), the equipment table sender 422 sends the equipment table information stored in the equipment information storage 431 to the control device 2001 (step S2316). Then, the processing of step S2301 is executed again.

Figure 28:
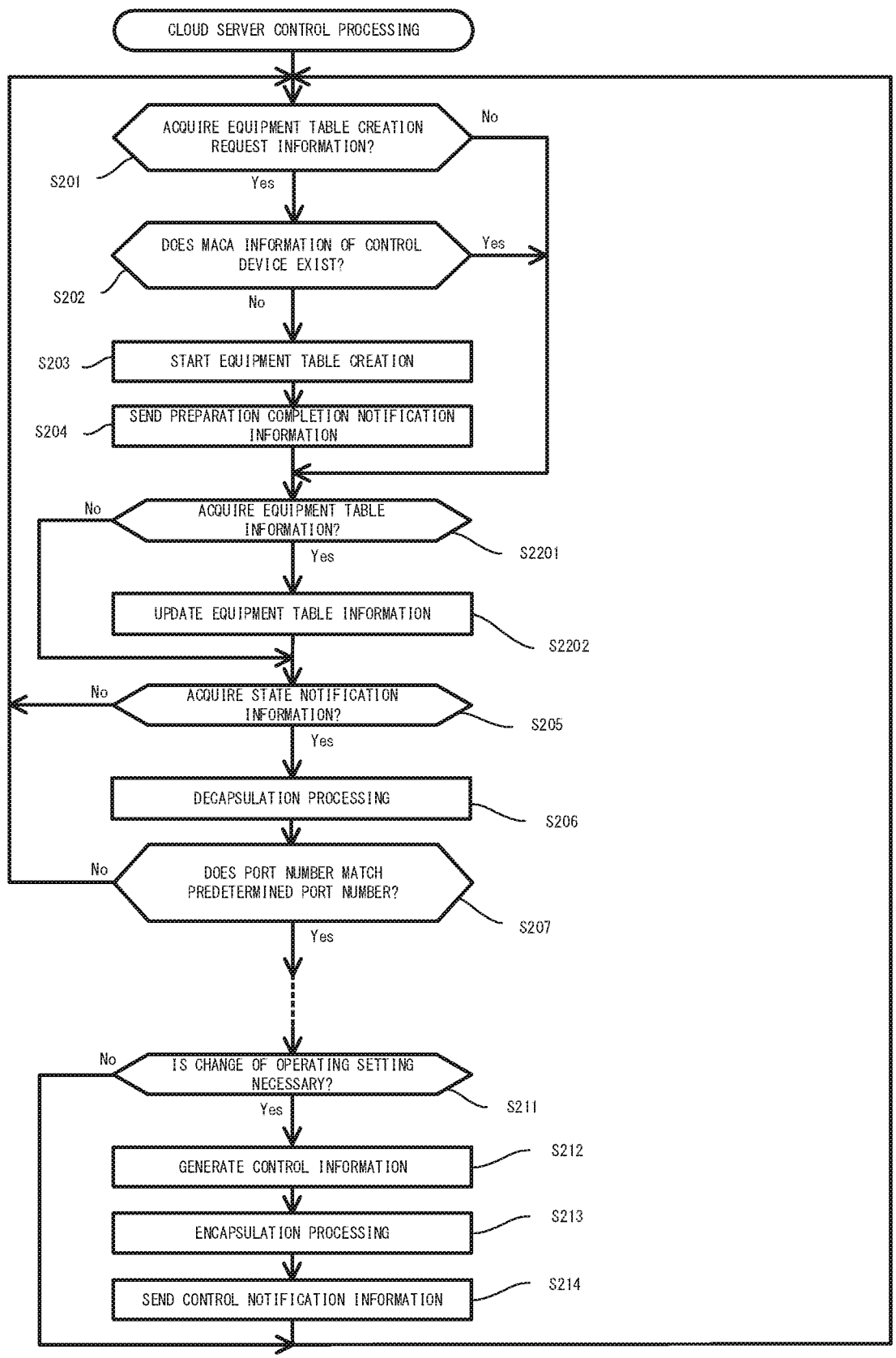
FIG. 28 is a flowchart illustrating an example of the flow of cloud server control processing executed by the cloud server according to Embodiment 2.

Next, cloud server control processing executed by the cloud server 2002 according to the present embodiment is described while referencing FIG. 28. Note that, in FIG. 28, the processes that are the same as in Embodiment 1 are denoted with the same reference numerals as used in FIG. 15. Firstly, the series of processing from step S201 to step S204 is executed. Next, the equipment table information updater 2220 determines whether equipment table information sent from the control device 2001 is acquired (step S2201). Here, when the equipment table updater 2220 determines that the equipment table information is not acquired (step S2201; No), the processing of steps S205 and after are executed without modification. Conversely, when determining that the equipment table information is acquired (step S2201; Yes), the equipment table updater 2220 uses the acquired equipment table information to update the equipment table information stored in the equipment information storage 231 (step S2202). Then, the processing of steps S205 and after is executed.

As described above, according to the control system of the present embodiment, the terminal device 2004 includes the equipment information storage 431 that stores the MAC address information that identifies the controlled equipment 3 on the datalink layer within the local network NW2 in association with the MAC address information that identifies the control device 2001 on the datalink layer within the local network NW2. Moreover, the terminal device 2004 sends, to the control device 2001, the control parameter information generated by encapsulating the control information including the control parameter information, the MAC address information of the controlled equipment 3, and the MAC address information of the control device 2001 stored in the equipment information storage 431. Additionally, the connection mode of the control device 2001 is switchable to any of the STA mode described above and the AP mode described above. Moreover, in a case in which the connection mode of the control device 2001 is set to the AP mode, upon receiving the control notification information from the terminal device 2004, the control device 2001 decapsulates the received control notification information to extract the control information, and sends the extracted control information to the controlled equipment 3 on the basis of the MAC address information of the controlled equipment 3 included in the control information. As a result, the equipment table information can be managed in the terminal device 2004 and, therefore, there is a benefit in that the control information can be appropriately sent from the terminal device 2004 to the controlled equipment 3, even when the control device 2001 cannot communicate with the cloud server 2002.

However, there are cases in which the BBR 8 cannot communicate with the cloud server 2002 across the broadband network NW1, such as a case in which the user of the controlled equipment 3 has not yet entered a provider contract. In such a case, when the user cannot control the controlled device 3 so long as the BBR 8 does not communicably connect to the cloud server 2002 across the broadband network NW1, the user cannot rapidly receive service and convenience may be impaired. In contrast, with the control system according to the present embodiment, even when the BBR 8 cannot communicated with the cloud server 2002 across the broadband network NW1, the generation of the equipment table information and the exchange of electronic messages with the controlled equipment 3 are possible in the terminal device 2004 and, as such, there is a benefit in that control of the controlled equipment 3 is possible. Additionally, in the terminal device 2004, equipment table information related to the various settings at the time of installation of the controlled equipment 3 and the like can be constructed and, furthermore, the terminal device 2004 can send the generated equipment table information to the cloud server 2002. Accordingly, the need to regenerate the equipment table information, generated at the time of installation of the controlled equipment 3, after the BBR 8 becomes able to communicate with the cloud server 2002 across the broadband network NW1 is eliminated. Due to this, the controlled equipment 3 can be smoothly controlled after the BBR 8 becomes able to communicate with the cloud server 2002 across the broadband network NW1.

Additionally, in the AP mode, the control device 2001 according to the present embodiment communicates with the terminal device 2004 across the terminal local network NW3 that is different from the local network NW2 to which the controlled equipment 3 belongs. Due to this, communication between the control device 2001 and the terminal device 2004 is performed across the terminal local network NW3 and, as such, traffic on the local network NW2 can be reduced a corresponding amount. Accordingly, reductions in the communication speed between the control device 2001 and the controlled equipment 3 can be suppressed.

Embodiment 3

A control system according to the present embodiment includes a terminal device connected to a local network to which an equipment belongs and, on that point, differs from Embodiment 1. Similarly to the terminal device according to Embodiment 2, this terminal device includes the aforementioned equipment information storage that stores equipment table information; an equipment controller that generates control information; a second encapsulator that generates control notification information by encapsulating the control information and adding first header information for specifying the control device as a sending destination; and a notification information sender that sends the control notification information to the control device on the basis of the first header information. Additionally, the control device includes a mode switcher that performs switching to a server connection mode in which the control notification information sent from the server is acquirable and switching to a terminal device connection mode in which the control notification information sent from the terminal device is acquirable.

Figure 29:
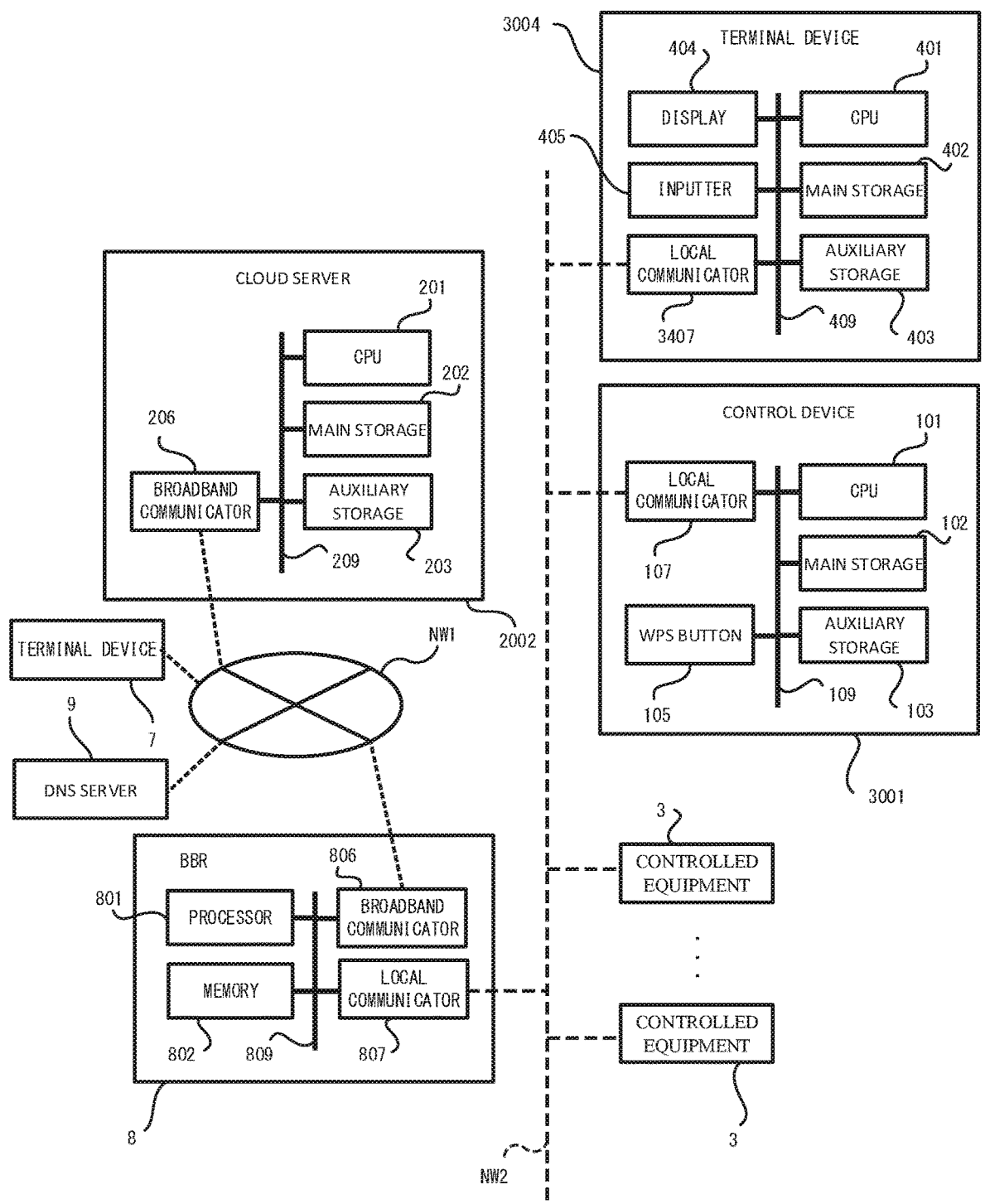
FIG. 29 is a block diagram illustrating the hardware configuration of a control system according to Embodiment 3.

As illustrated in FIG. 29, the control system according to the present embodiment includes a controlled equipment 3, a control device 3001 that controls the controlled equipment 3, a cloud server 2002, and a terminal device 3004. Note that, in FIG. 29, the constituents that are the same as in Embodiments 1 and 2 are denoted with the same reference numerals as used in FIGS. 1 and 17. The terminal device 3004 is communicable with the control device 3001 across a local network NW2 to which the controlled equipment 3 is connected. Similarly to the control device 2001 according to Embodiment 2, the control device 3001 controls the controlled equipment 3 on the basis of control information acquired from the cloud server 2002 or the terminal device 3004. The control device 3001 includes a CPU 101, a main storage 102, an auxiliary storage 103, a WPS button 105, a local communicator 107, and a bus 109. Note that, in FIG. 29, the constituents that are the same as in Embodiment 1 are denoted with the same reference numerals as used in FIG. 2.

Figure 30:
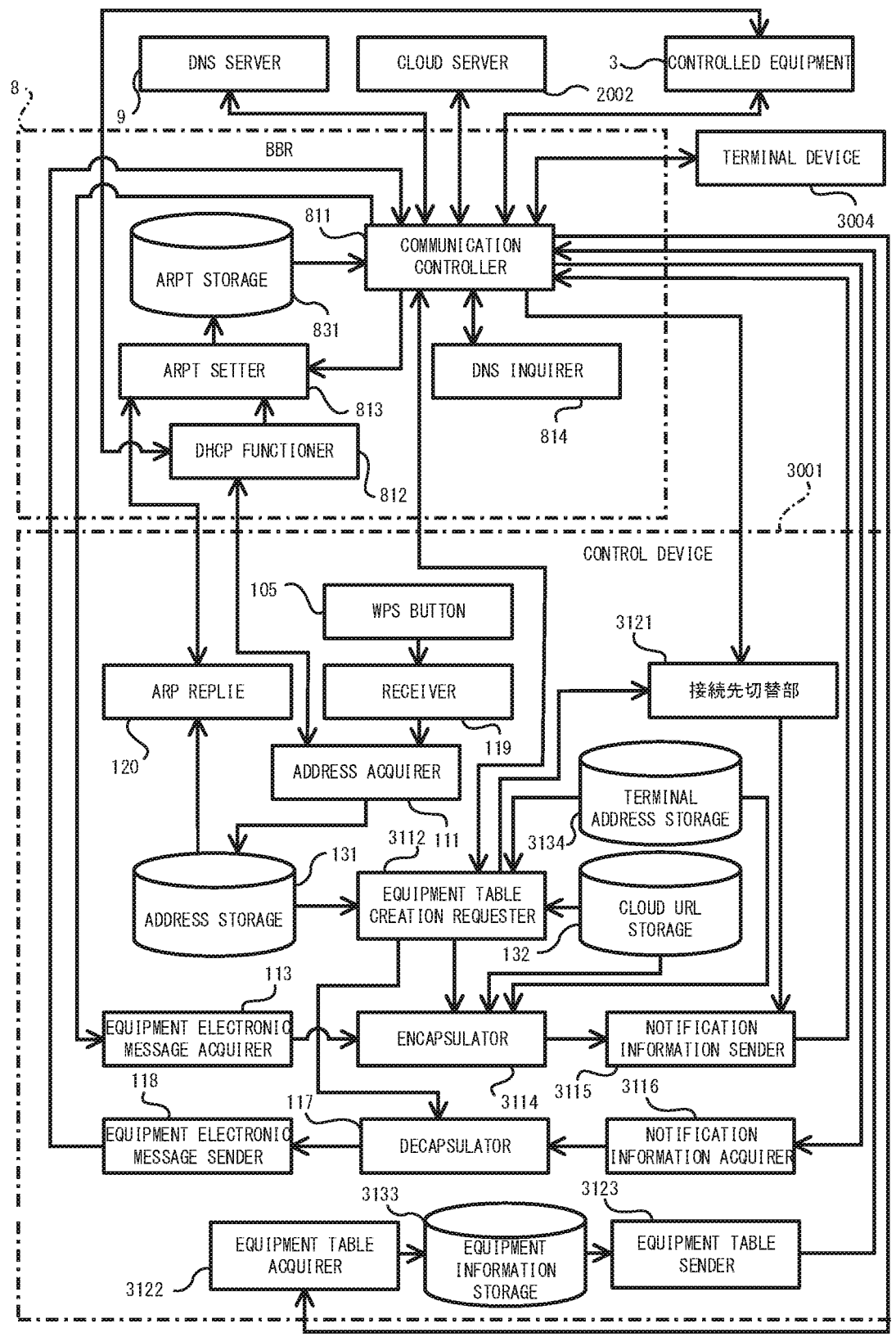
FIG. 30 is a block diagram illustrating the functional configuration of a control device and a broadband router according to Embodiment 3.

In the control device 3001, the CPU 101 reads out the program stored in the auxiliary storage 103 to the main storage 102 and executes the program to function as an address acquirer 111, an equipment table creation requester 3112, an equipment electronic message acquirer 113, an encapsulator 3114, a notification information sender 3115, a notification information acquirer 3116, a decapsulator 117, an equipment electronic message sender 118, a receiver 119, an ARP replier 120, a connection destination switcher 3121, an equipment table acquirer 3122, and an equipment table sender 3123, as illustrated in FIG. 30. Note that, in FIG. 30, the constituents that are the same as in Embodiment 1 are denoted with the same reference numerals as used in FIG. 3. Additionally, as illustrated in FIG. 30, the auxiliary storage 103 illustrated in FIG. 29 includes an address storage 131, a cloud URL storage 132, an equipment information storage 3133, and a terminal address storage 3134. The equipment information storage 3133 stores equipment table information sent from the terminal device 3004. The terminal address storage 3134 stores address information of the terminal device 3004. Here, the terminal address storage 3134 stores MAC address information of the terminal device 3004 that identifies the terminal device 3004 on the datalink layer within the local network NW2.

When starting communication with the cloud server 2002, the equipment table creation requester 3112 generates equipment table creation request information for requesting, to the cloud server 2002, creation of equipment table information, and sends the equipment table creation request information to the cloud server 2002. Here, after the equipment table creation requester 3112 sends the equipment table creation request information, when preparation completion notification information is not acquired from the cloud server 2002 in a predetermined wait time, the equipment table creation requester 3112 notifies the connection destination switcher 3121 of unable to connect to server notification information expressing that connecting to the cloud server 2002 is impossible. Moreover upon notification from the connection destination switcher 3121 of terminal device connection notification information described later, the equipment table creation requester 3112 generates equipment table creation request information for requesting, to the terminal device 3004, creation of equipment table information, and sends the equipment table creation request information to the terminal device 3004. Additionally, upon acquiring preparation completion notification information sent from the terminal device 3004, the equipment table creation requester 3112 notifies the encapsulator 3114 and the decapsulator 117 of the acquired preparation completion notification information.

The encapsulator 3114 encapsulates after adding the MAC address information of the control device 3001 to an equipment electronic message acquired from the controlled equipment 3. Additionally, the encapsulator 3114 generates state notification information by, in accordance with the connection destination of the control device 3001, adding header information for specifying the cloud server 2002 as the sending destination or adding header information for specifying the terminal device 3004 as the sending destination. Here, the header information for specifying the terminal device 3004 as the sending destination includes the MAC address information of the terminal device 3004 acquired from the terminal address storage 3134 by the encapsulator 3114.

The connection destination switcher 3121 performs switching to a server connection mode in which the connection destination of the control device 3001 is the cloud server 2002 and switching to a terminal device connection mode in which the connection destination of the control device 3001 is the terminal device 3004. Here, the server connection mode is a connection mode in which the preparation completion notification information, control notification information, and the like sent from the cloud server 2002 are acquirable by the control device 3001, and the terminal device connection mode is a connection mode in which the preparation completion notification information, control notification information, and the like sent from the terminal device 3004 are acquirable by the control device 3001. In the case of switching the connection destination of the control device 3001 from the cloud server 2002 to the terminal device 3004, the connection destination switcher 3121 notifies the equipment table creation requester 3112, the notification information sender 3115, and the notification information acquirer 3116 of server connection notification information. Meanwhile, in the case of switching the connection destination of the control device 3001 from the terminal device 3004 to the cloud server 2002, the connection destination switcher 3121 notifies the equipment table creation requester 3112, the notification information sender 3115, and the notification information acquirer 3116 of terminal device connection notification information.

When the connection destination of the control device 3001 is the cloud server 2002, the notification information sender 3115 sends, to the cloud server 2002, the state notification information forwarded from the encapsulator 3114. Conversely, when the connection destination of the control device 3001 is the terminal device 3004, the notification information sender 3115 sends, to the terminal device 3004, the state notification information forwarded from the encapsulator 3114.

In a case in which the connection destination of the control device 3001 is the cloud server 2002, upon receiving from the cloud server 2002 the control notification information in which the control device 3001 is set as the sending destination, the notification information acquirer 3116 forwards the received control notification information to the decapsulator 117. Conversely, in a case in which the connection destination of the control device 3001 is the terminal device 3004, upon receiving from the terminal device 3004 the control notification information in which the control device 3001 is set as the sending destination, the notification information acquirer 3116 forwards the received control notification information to the decapsulator 117.

In a case in which the connection destination of the control device 3001 is the terminal device 3004, upon acquiring the equipment table information sent from the terminal device 3004, the equipment table acquirer 3122 stores the acquired equipment table information in the equipment information storage 3133. In a case in which the connection destination of the control device 3001 is the cloud server 2002, the equipment table sender 3123 sends the equipment table information stored in the equipment information storage 3133 to the cloud server 2002 via the BBR 8.

Figure 31:
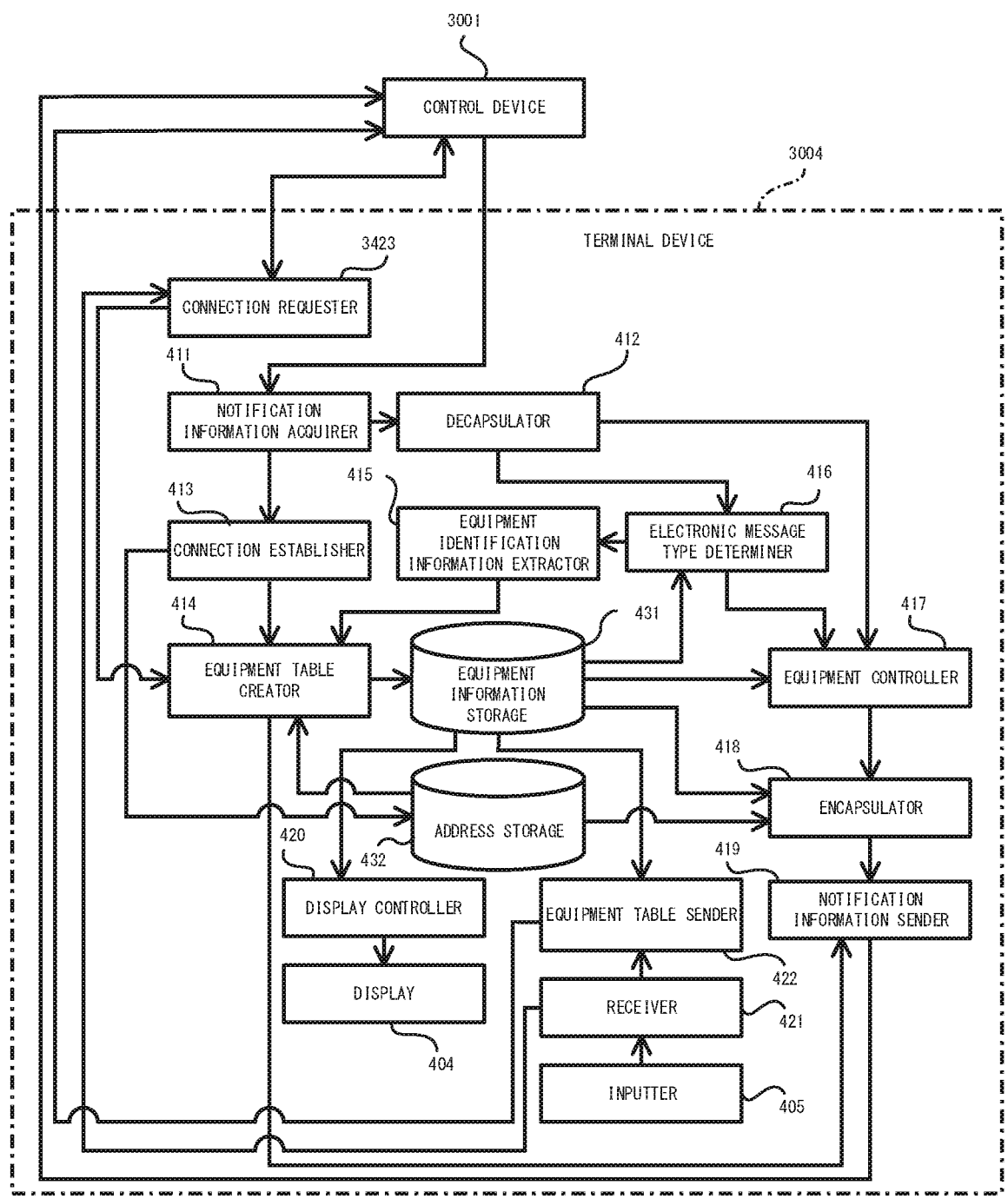
FIG. 31 block diagram illustrating the functional configuration of a terminal device according to Embodiment 3.

Returning to FIG. 29, similarly to the terminal device 2004 described in Embodiment 2, the terminal device 3004 is, for example, a smartphone, and includes a CPU 401, a main storage 402, an auxiliary storage 403, a display 404, an inputter 405, a local communicator 3407, and a bus 409 that connects the various components. Note that, in FIG. 29, the constituents that are the same as in Embodiment 2 are denoted with the same reference numerals as used in FIG. 17. The local communicator 3407 is connected to the local network NW2, sends information forwarded from the CPU 401 to the control device 3001 across the local network NW2, and forwards information received across the local network NW2 from the control device 3001 to the CPU 401. With the terminal device 3004, the CPU 401 reads out the program stored in the auxiliary storage 403 to the main storage 402 and executes the program to function as a notification information acquirer 411, a decapsulator 412, a connection establisher 413, an equipment table creator 414, an equipment identification information extractor 415, an electronic message type determiner 416, an equipment controller 417, an encapsulator 418, a notification information sender 419, a display controller 420, a receiver 421, an equipment table sender 422, and a connection requester 3423, as illustrated in FIG. 31. Note that, in FIG. 31, the constituents that are the same as in Embodiment 2 are denoted with the same reference numerals as used in FIG. 19. Additionally, as illustrated in FIG. 31, the auxiliary storage 403 illustrated in FIG. 29 includes an equipment information storage 431 and an address storage 432.

When the terminal device 3004 is connected to the local network NW2, the connection requester 3423 sends, to the control device 3001, connection request information for requesting connection to the control device 3001. Then, upon acquiring connection completion notification information sent from the control device 3001, the connection requester 3423 notifies the equipment table creator 414 of the acquired connection completion notification information.

Figure 32:
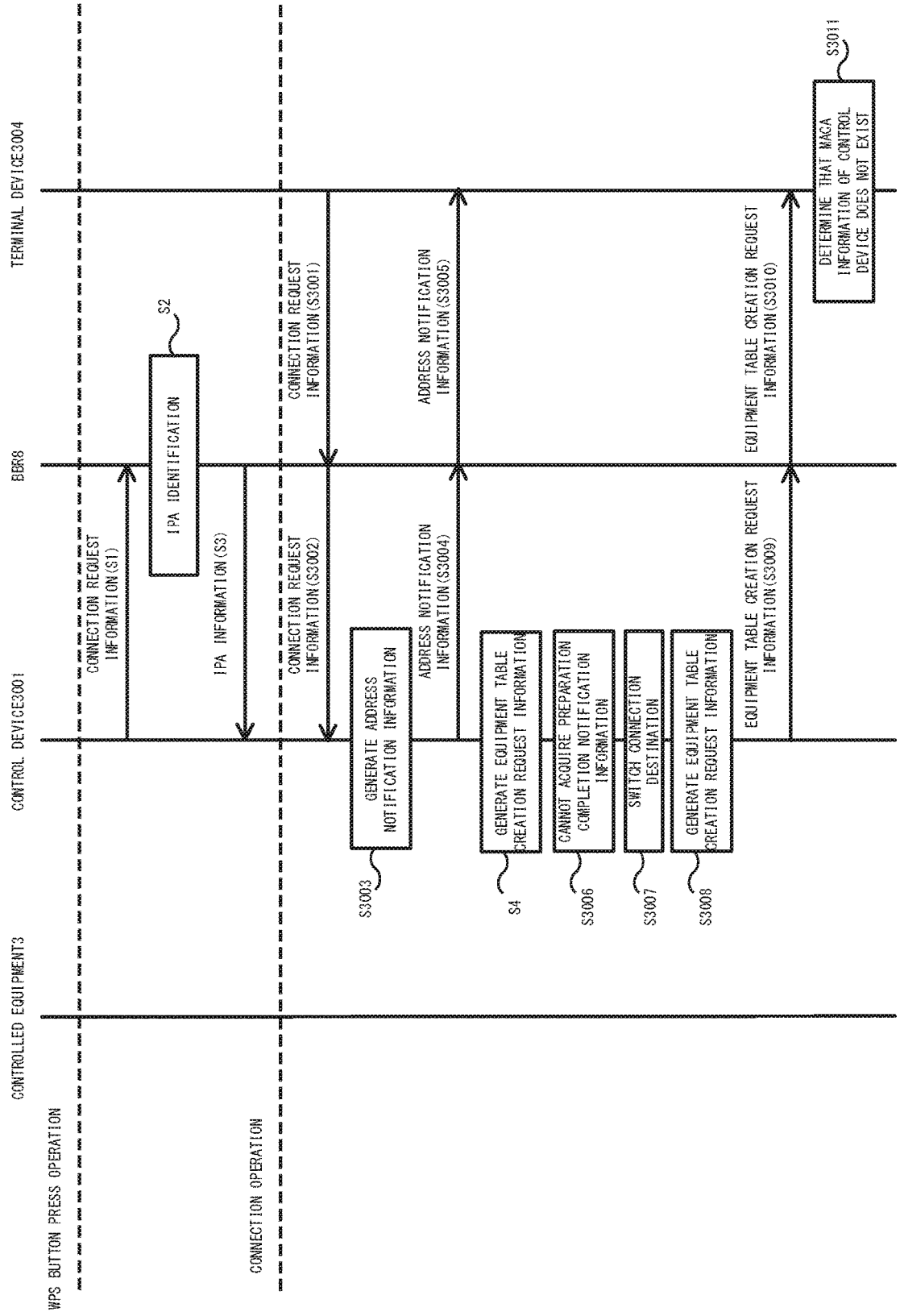
FIG. 32 is a sequence drawing illustrating operations of the control system according to Embodiment 3.

Next, the operations of the control system according to the present embodiment are described while referencing to FIGS. 32 to 35. Note that, in FIGS. 32 to 35, the processes that are the same as in Embodiment 1 are denoted with the same reference numerals as used in FIGS. 6, 8, and 11. Additionally, it is assumed that the connection destination of the control device 3001 is initially set to the cloud server 2002. Firstly, it is assumed that the series of processing from step S1 to step S3 is executed as illustrated in FIG. 32 and then the user performs a connection operation on the inputter 405 of the terminal device 3004 for connecting the terminal device 3004 to the local network NW2. In this case, the connection request information for requesting, to the control device 3001, a connection across the local network NW2 is sent from the terminal device 3004 to the BBR 8 (step S3001) and then is sent from the BBR 8 to the control device 3001 (step S3002). Meanwhile, upon acquiring the connection request information, the control device 3001 generates address notification information including the IP address and the MAC address assigned to the control device 3001 (step S3003). Next, the generated address notification information is sent from the control device 3001 to the BBR 8 (step S3004) and then is sent from the BBR 8 to the terminal device 3004 (step S3005). As a result, the terminal device 3004 acquires information expressing the IP address and the MAC address of the control device 3001.

Next, the control device 3001 generates equipment table creation request information for requesting, to the cloud server 2002, the creation of equipment table information (step S4). Here, it is assumed that, after the generated equipment table creation request information is sent addressed to the cloud server 2002, the control device 3001 determines that acquisition of the preparation completion notification information from the cloud server 2002 within the predetermined wait time is impossible (step S3006). In this case, the control device 3001 switches the connection destination from the cloud server 2002 to the terminal device 3004 (step S3007). Thereafter, the control device 3001 generates equipment table creation request information addressed to the terminal device 3004 (step S3008). Next, the generated equipment table creation request information is sent from the control device 3001 to the BBR 8 (step S3009) and then is sent from the BBR 8 to the terminal device 3004 (step S3010).

Figure 33:
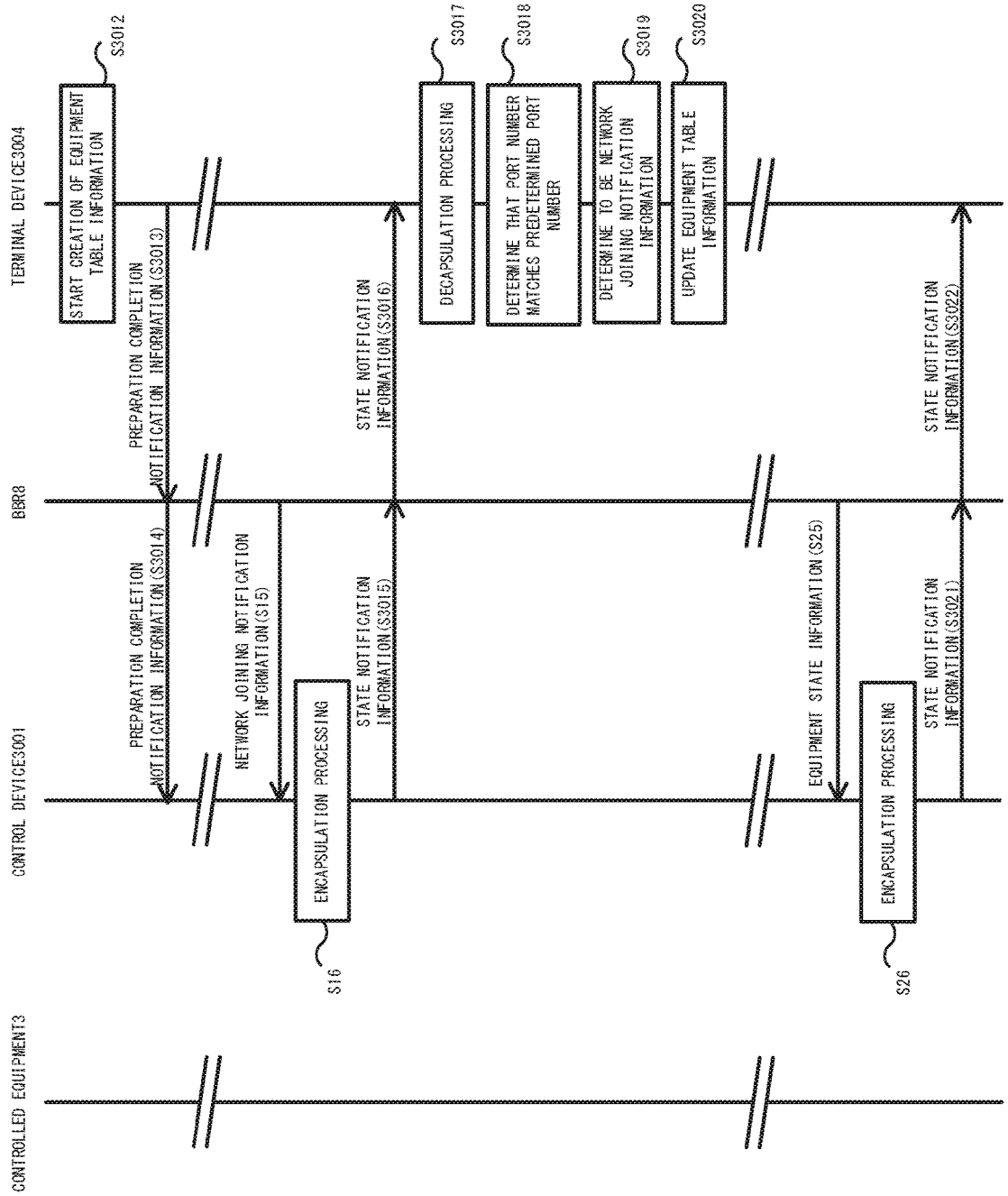
FIG. 33 is a sequence drawing illustrating operations of the control system according to Embodiment 3.

Meanwhile, upon receiving the equipment table creation request information sent from the control device 3001, the terminal device 3004 extracts the MAC address information of the control device 3001 from the equipment table creation request information. Thereafter, the terminal device 3004 determines whether the MAC address information of the control device 3001 included in the equipment table creation request information does not exist in the MAC address information stored in the equipment information storage 431 (step S3011). In this case, as illustrated in FIG. 33, the terminal device 3004 starts the creation of equipment table information corresponding to the control device 3001 (step S3012). Then, the, preparation completion notification information notifying that the preparation for creating the equipment table information is completed is sent from the terminal device 3004 to the BBR 8 (step S3013) and then is sent from the BBR 8 to the control device 3001 (step S3014).

It is assumed that the user performs a controlled equipment connection operation for newly connecting a controlled equipment 3 to the local network NW2 and, as a result, the series of processing of steps S11 to S14 described in Embodiment 1 is executed. In this case, network joining notification information for notifying that the controlled equipment 3 has newly connected to the local network NW2 is sent from the BBR 8 to the control device 3001 (step S15). Meanwhile, upon acquiring the network joining notification information, the control device 3001 executes encapsulation processing for adding the MAC address information of the control device 3001 to the network joining notification information and encapsulating the network joining notification information (step S16). Thereafter, the generated state notification information is sent from the control device 3001 to the BBR 8 (step S3015) and then is sent from the BBR 8 to the terminal device 3004 (step S3016).

Meanwhile, when the terminal device 3004 receives the state notification information sent from the control device 3001, the series of processing from step S3017 to step S3020 is executed. The processings from step S3017 to step S3020 are respectively the same as the processings from step S2011 to step S2014 described in Embodiment 2. As a result, the equipment table information stored in the equipment information storage 431 is updated.

Additionally, it is assumed that, after the controlled equipment 3 is connected to the local network NW2, the processing of steps S23 and S24 described in Embodiment 1 is executed. In this case, the equipment state information is sent from the BBR 8 to the control device 3001 (step S25). Meanwhile, upon acquiring the equipment state information, the control device 3001 executes the encapsulation processing for encapsulating the equipment state information (step S26). At this time, the control device 3001 adds header information for specifying the terminal device 3004 as the sending destination. As a result, state notification information obtained by adding header information, including the IP address information of the terminal device 3004 as the destination IP address, to the equipment state information is generated.

Figure 34:
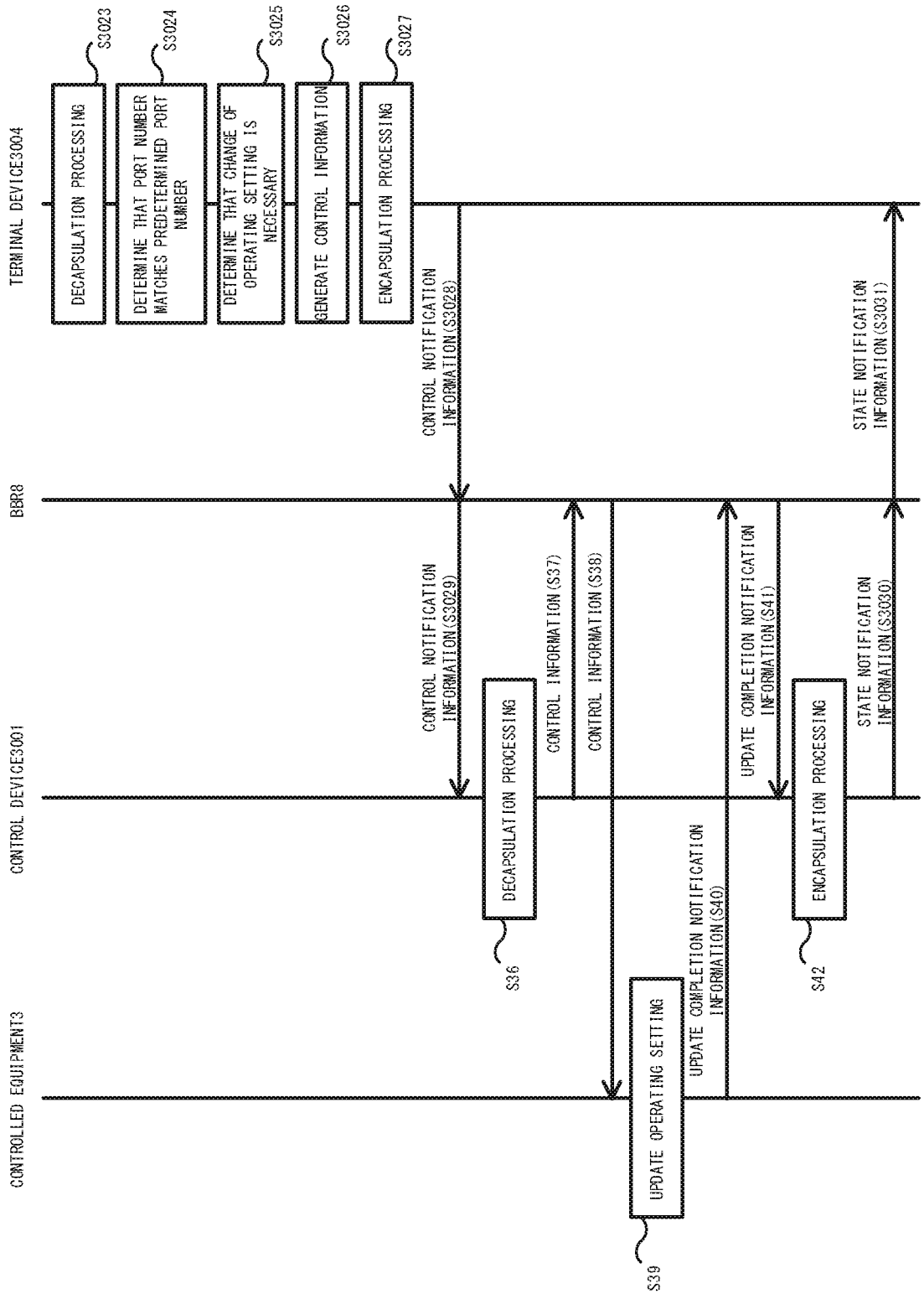
FIG. 34 is a sequence drawing illustrating operations of the control system according to Embodiment 3.

Thereafter, the generated state notification information is sent from the control device 3001 to the BBR 8 (step S3021) and then is sent from the BBR 8 to the terminal device 3004 (step S3022). Meanwhile, as illustrated in FIG. 34, upon receiving the state notification information sent from the control device 3001, the terminal device 3004 removes the header information from the state notification information and executes the decapsulation processing (step S3023). As a result, the terminal device 3004 extracts the equipment state information from the state notification information. Next, it is assumed that the terminal device 3004 determines that the port number information of the control device 3001 that is the sending destination and the port number information of the controlled equipment 3 that is the sender included in the equipment state information match the predetermined port number information (step S3024). Moreover, it is assumed that the terminal device 3004 determines, on the basis of the state of the controlled equipment 3 expressed in the equipment state information, that a setting change of the controlled equipment 3 is necessary (step S3025). In this case, the terminal device 3004 generates control information for changing the setting of the controlled equipment 3 for which a determination is made that the setting change is necessary (step S3026). Next, the terminal device 3004 executes encapsulation processing for encapsulating the generated control information (step S3027). At this time, the terminal device 3004 adds header information for specifying the control device 3001 as the sending destination.

Thereafter, the generated state notification information is sent from the terminal device 3004 to the BBR 8 (step S3028) and then is sent from the BBR 8 to the control device 3001 (step S3029). Meanwhile, upon receiving the control notification information sent from the terminal device 3004, the control device 3001 executes the decapsulation processing for removing the header information from the state notification information and decapsulating (step S36). Then, the control information extracted from the control notification information is sent from the control device 3001 to the BBR 8 (step S37). Next, the series of processing from step S38 to step S41 described in Embodiment 1 is executed. Then, upon acquiring the update completion notification information, the control device 3001 executes the encapsulation processing for encapsulating the update completion notification information (step S42). At this time, the control device 3001 adds, to the update completion notification information, header information for specifying the terminal device 3004 as the sending destination, thereby generating the state notification information. Thereafter, the generated state notification information is sent from the control device 3001 to the BBR 8 (step S3030) and then is sent from the BBR 8 to the terminal device 3004 (step S3031).

Figure 35:
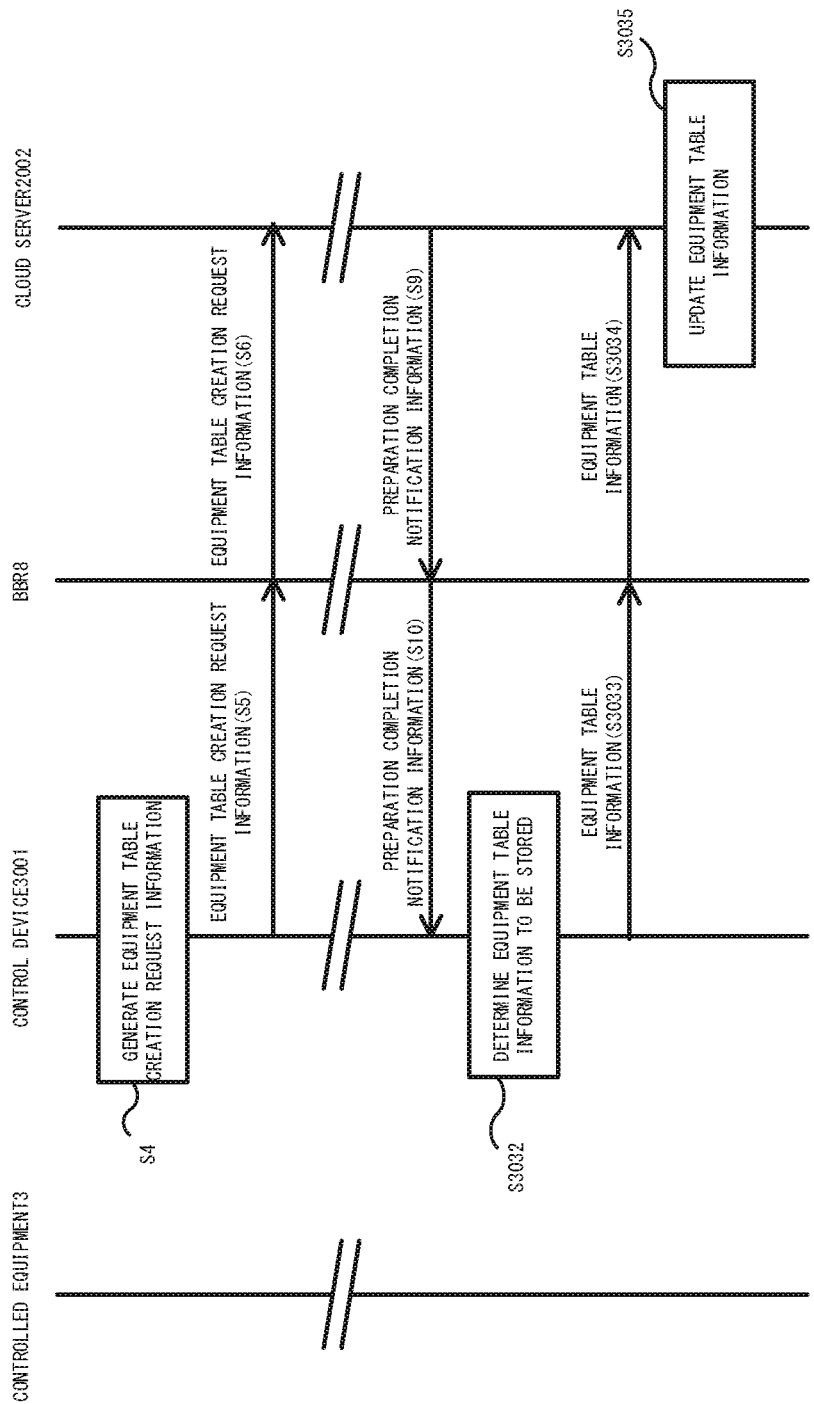
FIG. 35 is a sequence drawing illustrating operations of the control system according to Embodiment 3.

Additionally, as illustrated in FIG. 35, the control device 3001 generates equipment table creation request information for requesting, to the cloud server 2002, the creation of the equipment table information (step S4), the generated equipment table creation request information is sent from the control device 3001 to the BBR 8 (step S5) and then is sent from the BBR 8 to the cloud server 2002 (step S6). In this case, the series of processing from step S6 to step S9 described in Embodiment 1 is executed, and, thereafter, the preparation completion notification information is sent from the BBR 8 to the control device 3001 (step S10). Here, it is assumed that the control device 3001 determines that the equipment table information is stored in the equipment information storage 3133 (step S3032). In this case, it is assumed that the equipment table information stored in the in equipment information storage 3133 is sent from the control device 3001 to the BBR 8 (step S3033) and then is sent from the BBR 8 to the cloud server 2002 (step S3034). Meanwhile, upon acquiring the equipment table information sent from the control device 3001, the cloud server 2002 uses the acquired equipment table information to update the equipment table information stored in the equipment information storage 231 (step S3035).

Figure 36:
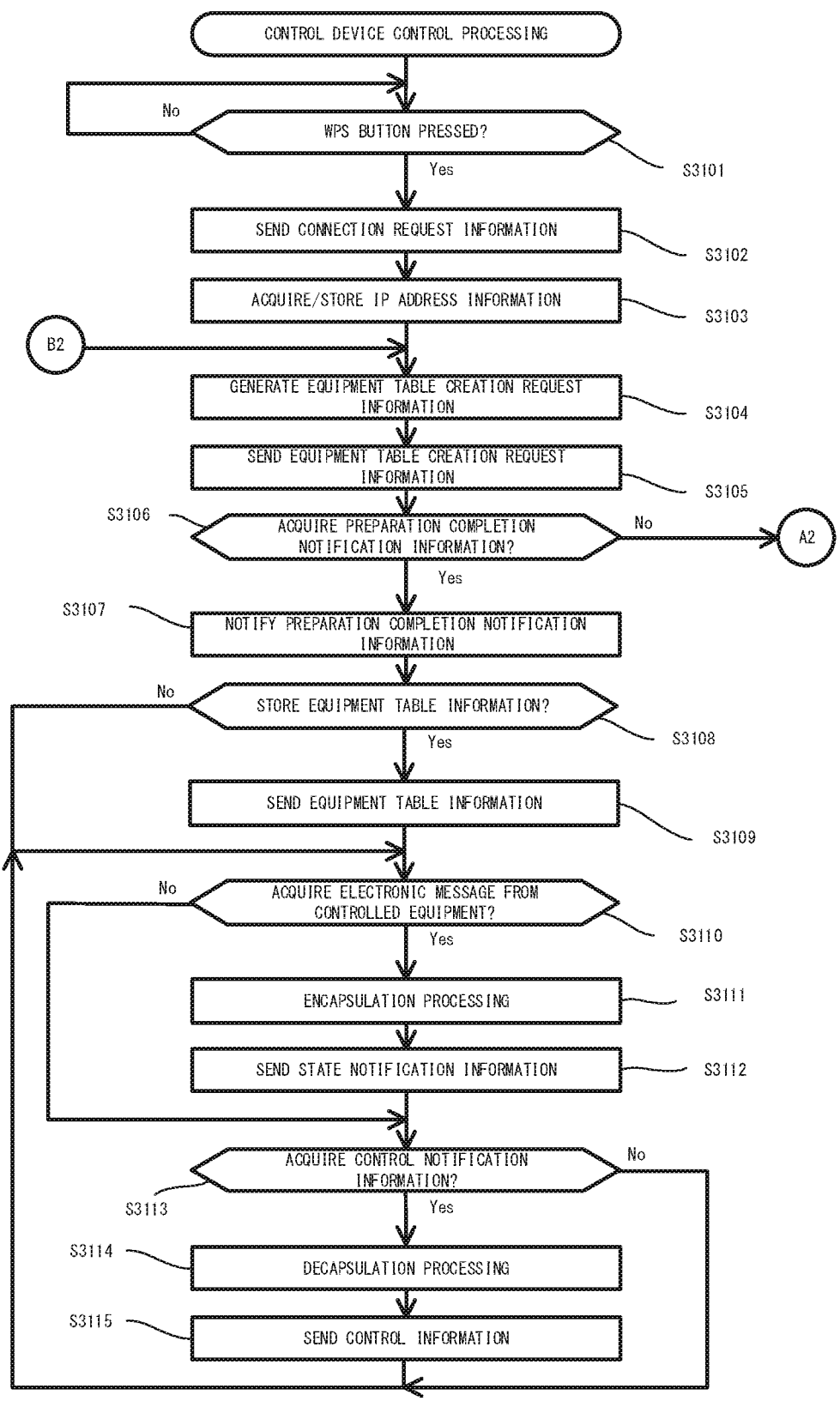
FIG. 36 is a flowchart illustrating an example of the flow of control device control processing executed by the control device according to Embodiment 3.
Figure 37:
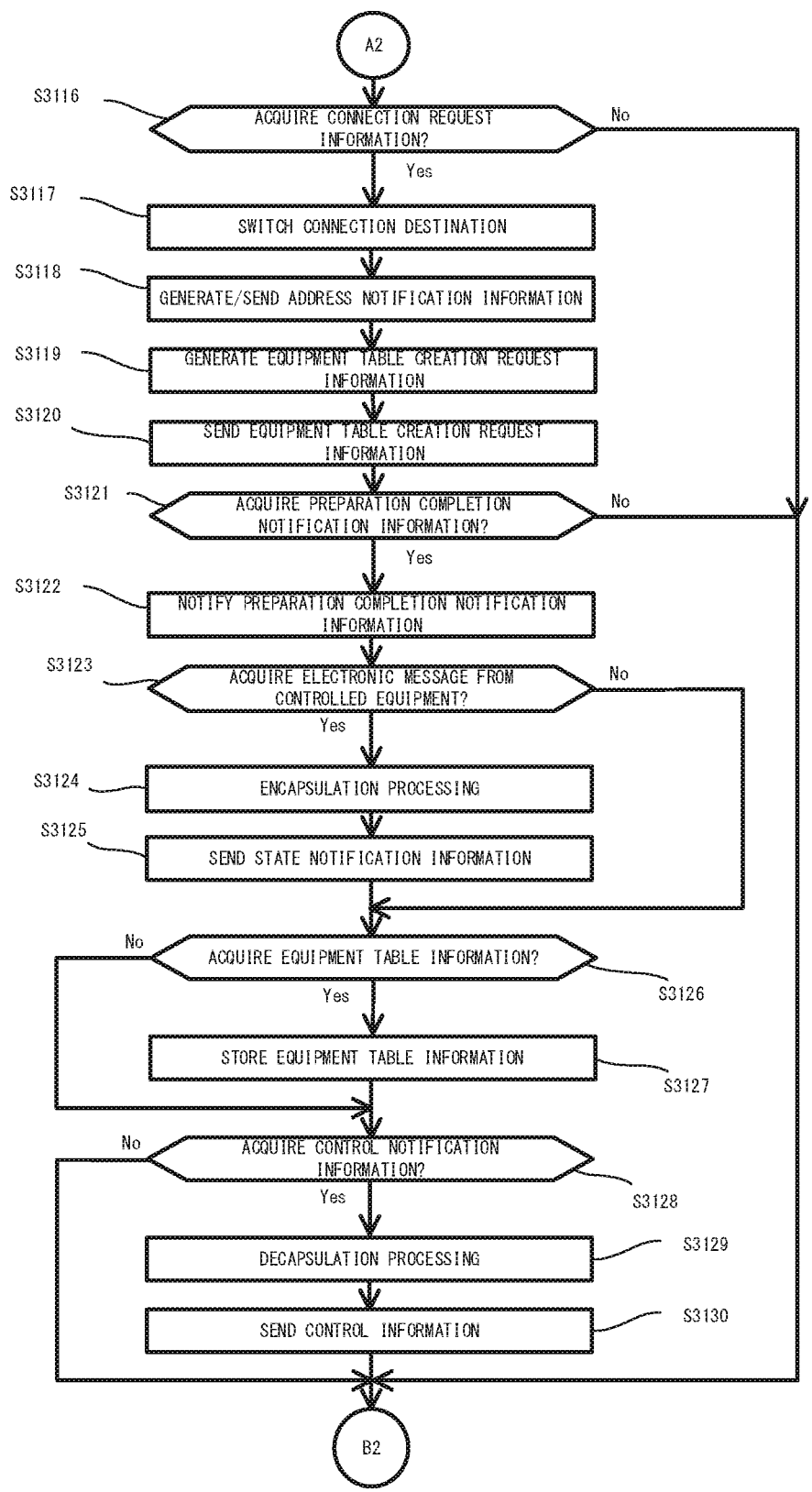
FIG. 37 is a flowchart illustrating an example of the flow of the control device control processing executed by the control device according to Embodiment 3.

Next, control device control processing executed by the control device 3001 according to the present embodiment is described while referencing FIGS. 36 and 37. As in Embodiment 1, this control device control processing starts when the power to the control device 3001 is turned ON, and the control device 3001 is arranged at a location at which connecting to the local network NW2 is possible. Additionally, it is assumed that the control device 3001 is initially connected to the cloud server 2002. Firstly, as illustrated in FIG. 36, the series of processing from step S3101 to step S3104 is executed. Note that, the processings from step S3101 to step S3104 are respectively the same as the processings from step S101 to step S104 described in Embodiment 1. Next, the equipment table creation requester 3112 sends the generated equipment table creation request information to the cloud server 2002 on the basis of the header information thereof (step S3105). Next, after the equipment table creation requester 3112 sends the equipment table creation request information to the cloud server 2002, the equipment table creation requester 3112 determines whether the preparation completion notification information described above is acquired within the predetermined wait time (step S3106). Here, when determining that the preparation completion notification information is acquired from the cloud server 2002 via the BBR 8 (step S3106; Yes), the equipment table creation requester 3112 notifies the encapsulator 3114 and the decapsulator 117 of the acquired preparation completion notification information (step S3107).

Thereafter, the equipment table sender 3123 determines whether the equipment information storage 3133 is storing the equipment table information (step S3108). Here, when the equipment table sender 3123 determines that the equipment information storage 3133 is not storing the equipment table information (step S3108; No), the processing of hereinafter described step S3110 is executed without modification. Conversely, when determining that the equipment information storage 3133 is storing the equipment table information (step S3108; Yes), the equipment table sender 3123 sends that equipment table information to the cloud server 2002 (step S3109). Next, the series of processing from step S3110 to step S3115 is executed. Note that the processings from step S3110 to step S3115 are respectively the same as the processings from step S107 to step S112 described in Embodiment 1.

Additionally, it is assumed that, in step S3106, the equipment table creation requester 3112 determines that the preparation completion notification information could not be acquired from the cloud server 2002 within the wait time described above (step S3106; No). In this case, as illustrated in FIG. 37, the connection destination switcher 3121 determines whether connection request information is acquired from the terminal device 3004 (step S3116). When the connection destination switcher 3121 determines that connection request information is not acquired from the terminal device 3004 (step S3116; No), the processing of step S3104 is executed again. Conversely, when determining that connection request information is acquired from the terminal device 3004 (step S3116; Yes), the connection destination switcher 3121 switches the connection destination of the control device 3001 to the terminal device 3004 (step S3117) and then generates and sends address notification information to the terminal device 3004 (step S3118).

Next, the equipment table creation requester 3112 generates equipment table creation request information for requesting, to the terminal device 3004, the creation of the equipment table information (step S3119). Here, the equipment table creation requester 3112 acquires the address information of the terminal device 3004 from the terminal address storage 3134, and generates equipment table creation request information to which header information including the acquired address information is added. Next, the equipment table creation requester 3112 sends the generated equipment table creation request information to the terminal device 3004 on the basis of the header information thereof (step S3120). Then, after the equipment table creation requester 3112 sends the equipment table creation request information to the terminal device 3004, the equipment table creation requester 3112 determines whether the preparation completion notification information described above is acquired within the wait time described above (step S3121). Here, when the equipment table creation requester 3112 determines that the preparation completion notification information could not be acquired from the terminal device 3004 within the wait time described above (step S3121; No), the processing of step S3104 described above is executed again.

Conversely, when determining that the preparation completion notification information is acquired from the terminal device 3004 (step S3121; Yes), the equipment table creation requester 3112 notifies the encapsulator 3114 and the decapsulator 117 of the acquired preparation completion notification information (step S3122). Next, the equipment electronic message acquirer 113 determines whether an equipment electronic message that includes the MAC address information of the controlled equipment 3 sent from the controlled equipment 3 is acquired (step S3123). When the equipment electronic message acquirer 113 determines that an electronic message sent from the controlled equipment 3 is not acquired (step S3123; No), the processing of step S3126 described later is executed. Conversely, when determining that an electronic message sent from the controlled equipment 3 is acquired (step S3123; Yes), the equipment electronic message acquirer 113 forwards the acquired electronic message to the encapsulator 3114. Then, the encapsulator 3114 executes the encapsulation processing for encapsulating the electronic message acquired from the controlled equipment 3 (step S3124). Here, the encapsulator 3114 generates state notification information by adding header information including the address information of the terminal device 3004 to the encapsulated electronic message. Then, the notification information sender 3115 sends the state notification information generated by the encapsulator 3114 to the terminal device 3004 on the basis of the header information thereof (step S3125).

Next, the equipment table acquirer 3122 determines whether equipment table information sent from the terminal device 3004 is acquired (step S3126). Here, when the equipment table acquirer 3122 determines that the equipment table information is not acquired (step S3126; No), the processing of step S3128 described later is executed. Conversely, when determining that the equipment table information is acquired (step S3126; Yes), the equipment table acquirer 3122 stores the acquired equipment table information in the equipment information storage 3133 (step S3127). Thereafter, the notification information acquirer 3116 determines whether control notification information in which the control device 3001 is set as the sending destination is acquired from the terminal device 3004 (step S3128). When the notification information acquirer 3116 determines that control notification information sent from the terminal device 3004 is not acquired (step S3128; No), the processing of step S3104 is executed again.

Conversely, when the notification information acquirer 3116 determines that control notification information sent from the terminal device 3004 is acquired (step S3128; Yes), the decapsulator 117 removes the header information from the control notification information forwarded from the notification information acquirer 3116 to execute the decapsulation processing (step S3129). Thereafter, the equipment electronic message sender 118 sends, to the controlled equipment 3, control information including the MAC address information of the control device 3001, on the basis of the MAC address information of the controlled equipment 3 included in the control information extracted by the decapsulator 117 (step S3130). Then, the processing of step S3104 is executed again.

Figure 38:
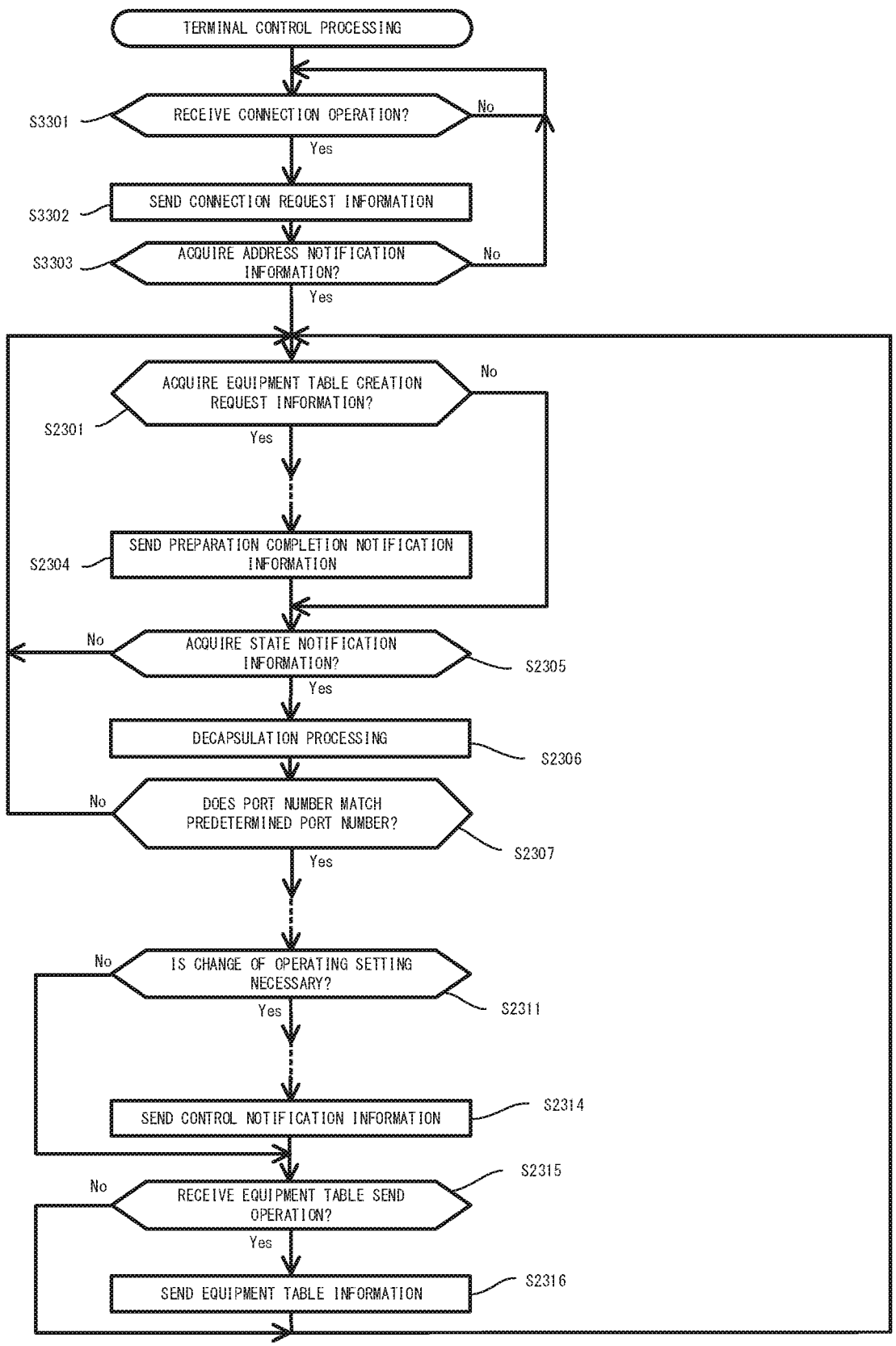
FIG. 38 is a flowchart illustrating an example of the flow of terminal control processing executed by the control device according to Embodiment 3.

Next, terminal control processing executed by the terminal device 3004 according to the present embodiment is described while referencing FIG. 38. Note that, in FIG. 38, the processes that are the same as in Embodiment 2 are denoted with the same reference numerals as used in FIG. 27. Firstly, the receiver 421 determines whether the above-described connection operation performed by the user on the inputter 405 is received (step S3301). Here, the receiver 421 repeatedly executes the processing of step S3301 as long as the connection operation is not received (step S3301; No). Conversely, when the receiver 421 determines that the connection operation is received (step S3301; Yes), the connection requester 3423 is notified of connection notification information notifying that a connection operation is performed. Then, upon notification of the connection operation information from the receiver 421, the connection requester 3423 sends the connection request information described above to the control device 3001 (step S3302). Next, the connection requester 3423 determines whether address notification information sent from the control device 3001 is acquired (step S3303). Here, when, after the connection requester 3423 sends the connection request information, address notification information cannot be acquired within a predetermined wait time (step S3303; No), the processing of step S3301 is executed again. Conversely, when determining that address notification information is acquired (step S3303; Yes), the connection requester 3423 extracts information expressing the IP address and the MAC address of the control device 3001 included in the address notification information, and saves the extracted information in the address storage 432. Then, the series of processing of step S2301 and after is executed.

As described above, in the terminal device connection mode, the control device 3001 according to the present embodiment communicates with the terminal device 3004 across the local network NW2 to which the controlled equipment 3 belongs. Due to this, the component managing the equipment table information is switchable by the control device 3001 to the cloud server 2002 and the terminal device 3004 by carrying out communication between the controlled equipment 3 and the terminal device 3004 across the common local network NW2. Accordingly, since there is no time loss in the control device 3001 when switching the local network NW2 to another local network, the controlled equipment 3 can be smoothly controlled an amount corresponding thereto.

Embodiments of the present disclosure are described above, but the present disclosure is not limited by the embodiments. For example, a configuration is possible in which the equipment table creation request information includes only the equipment identification information unique to the control device 1, different from the MAC address information assigned to the control device 1 in the payload.

In the embodiments, an example is described in which the network joining notification information in information that includes an electronic message (EL electronic message) that conforms to the EchonetLite standard, and in which the controlled equipment 3 service identification information ESV is set to "INF" and the property type information EPC is set to "0xD5" indicating an instance list notification. However, the network joining notification information is not necessarily limited to information that includes an EL electronic message.

In Embodiment 2, an example is described in which the control device 2001 includes the equipment information storage 2133 that stores the equipment table information, but the present disclosure is not limited thereto. For example, a configuration is possible in which the terminal device 2004 is provided with a function for sending the equipment table information stored in the equipment information storage 431 directly to the cloud server 2002 on the basis of information stored on a SIM card.

The various functions of the control devices 1, 2001, 3001 and the cloud servers 2, 2002 may be achieved by software, firmware, or a combination of software and firmware. In this case, the software or firmware may be written as programs, and a computer by which these various features are achievable may be achieved by storing and distributing the programs on a non-transitory computer-readable recording medium such as a compact disc read-only memory (CD-ROM), a digital versatile disc (DVD), or a magneto-optical (MO) disc, and reading out and installing the programs on a computer. Moreover, in cases in which the various functions are achieved by being divided between an operating system (OS) and an application, or are achieved by cooperation between an OS and an application, storing only the portion other than the OS on the non-transitory recording medium is permissible.

Furthermore, the various programs can be piggybacked on carrier waves and distributed via a communication network. For example, the programs may be posted to a bulletin board system (BBS) on a communication network, and distributed via the network. Moreover, a configuration is possible in which the processings described above are executed by starting these programs and, under the control of the operating system (OS), executing the programs in the same manner as other applications/programs.

This claims the benefit of International Application No. PCT/JP2020/037826, filed on Oct. 6, 2020, the entire disclosure of which is incorporated by reference herein.

INDUSTRIAL APPLICABILITY

The present disclosure is suitable as a control device of an HEMS installed in a house.

The invention claimed is:

1. A control system comprising:
a control device to control an equipment; and
a server connected to the control device across a broadband network,
the server including
an equipment information storage to store equipment table information in which equipment identification information unique to the equipment is associated with device identification information, the equipment identification information identifying the equipment on a datalink layer within a local network to which the equipment belongs, the device identification information identifying the control device to control the equipment on the datalink layer within the local network,
an equipment controller to generate control information including control parameter information for controlling the equipment, the equipment identification information, and the device identification information stored in the equipment information storage and corresponding to the equipment identification information,
a first encapsulator to generate control notification information by encapsulating the control information and adding first header information for specifying the control device as a sending destination, and
a first notification information sender to send, based on the first header information, the control notification information to the control device,
the control device including
a first decapsulator to, when the control notification information to which the first header information is added is received from the server, remove the first header information from the control notification information and decapsulate to extract the control information, and
an equipment electronic message sender to send, based on the equipment identification information included in the control information, the control information to the equipment.

2. The control system according to claim 1, wherein
the control device further includes
an equipment electronic message acquirer to acquire, from the equipment, equipment state information that includes the equipment identification information and state parameter information expressing a state of the equipment,
a second encapsulator to generate state notification information by adding the device identification information to the equipment state information, encapsulating, and adding second header information for specifying the server as a sending destination, and
a second notification information sender to send, based on the second header information, the state notification information to the server,
the server further includes
a notification information acquirer to acquire, from the control device, the state notification information to which the second header information is added, and
a second decapsulator to remove the second header information from the state notification information and decapsulate to extract the equipment state information, and
the equipment controller generates the control information based on the state parameter information included in the equipment state information.

3. The control system according to claim 2, wherein
the control device further includes an equipment table creation requester to generate, when starting communication with the server, equipment table creation request information for requesting, to the server, creation of the equipment table information, and
the server includes an equipment table creator to start the creation of the equipment table information when a determination is made by the notification information acquirer that the equipment table creation request information is acquired.

4. The control system according to claim 3, wherein
when starting communication across the local network with the control device, the equipment sends, to the control device, network joining notification information for notifying the control device that the equipment has joined the local network,
upon the equipment electronic message acquirer acquiring the network joining notification information from the equipment, the second encapsulator encapsulates the network joining notification information and adds the second header information to generate the state notification information,
the server further includes
an electronic message type determiner to determine whether the network joining notification information is included in the state notification information acquired by the notification information acquirer, and
an equipment identification information extractor to, when the network joining notification information is included in the state notification information, extract the equipment identification information included in the network joining notification information, and
the equipment table creator updates the equipment table information by associating the equipment identification information extracted by the equipment identification information extractor with the device identification information.

5. A control system comprising:
a control device to control an equipment;
a terminal device capable of communicating with the control device; and
a server connected to the control device across a broadband network,
the server including
a first equipment information storage to store equipment table information in which equipment identification information unique to the equipment is associated with device identification information, the equipment identification information identifying the equipment on a datalink layer within a local network to which the equipment belongs, the device identification information identifying the control device to control the equipment on the datalink layer within the local network,
a first equipment controller to generate control information including control parameter information for controlling the equipment, the equipment identification information, and the device identification information stored in the first equipment information storage and corresponding to the equipment identification information,
- a first encapsulator to generate control notification information by encapsulating the control information and adding first header information for specifying the control device as a sending destination, and
- a first notification information sender to send, based on the first header information, the control notification information to the control device, the terminal device including
- a second equipment information storage to store equipment table information in which the equipment identification information unique to the equipment is associated with the device identification information,
- a second equipment controller to generate the control information,
- a second encapsulator to generate control notification information by encapsulating the control information and adding first header information for specifying the control device as the sending destination, and
- a second notification information sender to send, based on the first header information, the control notification information to the control device, the control device including
- a mode switcher to perform switching to a server connection mode in which the control notification information sent from the server is acquirable and switching to a terminal device connection mode in which the control notification information sent from the terminal device is acquirable,
- a first decapsulator to, when the control notification information to which the first header information is added is received from the server or the terminal device, remove the first header information from the control notification information and decapsulate to extract the control information, and
- an equipment electronic message sender to send, based on the equipment identification information included in the control information, the control information to the equipment.

6. The control system according to claim 5, wherein the control device further includes
- an equipment electronic message acquirer to acquire, from the equipment, equipment state information that includes the equipment identification information and state parameter information expressing a state of the equipment,
- a second encapsulator to, when set to the server connection mode, generate state notification information by adding the device identification information to the equipment state information, encapsulating, and adding second header information for specifying the server as a sending destination,
- a third encapsulator to, when set to the terminal device connection mode, generate state notification information by adding the device identification information to the equipment state information, encapsulating, and adding third header information for specifying the terminal device as a sending destination, and
- a third notification information sender to send, based on the second header information or the third header information, the state notification information to the server or the terminal device, the server further includes
- a notification information acquirer to acquire, from the control device, the state notification information to which the second header information is added, and
- a second decapsulator to remove the second header information from the state notification information and decapsulate to extract the equipment state information, the first equipment controller generates the control information based on the state parameter information included in the equipment state information, the terminal device further includes
- a notification information acquirer to acquire, from the control device, the state notification information to which the third header information is added, and
- a third decapsulator to remove the third header information from the state notification information and decapsulate to extract the equipment state information, and the second equipment controller generates the control information based on the state parameter information included in the equipment state information.

7. The control system according to claim 6, wherein, in the terminal device connection mode, the control device communicates with the terminal device across a terminal local network that is different from the local network to which the equipment belongs.

8. The control system according to claim 6, wherein, in the terminal device connection mode, the control device communicates with the terminal device across the local network to which the equipment belongs.

9. The control system according to claim 5, wherein, in the terminal device connection mode, the control device communicates with the terminal device across a terminal local network that is different from the local network to which the equipment belongs.

10. The control system according to claim 5, wherein, in the terminal device connection mode, the control device communicates with the terminal device across the local network to which the equipment belongs.

11. A server comprising:
- an equipment information storage to store equipment table information in which equipment identification information unique to an equipment is associated with device identification information, the equipment identification information identifying the equipment on a datalink layer within a local network to which the equipment belongs, the device identification information identifying a control device to control the equipment on the datalink layer within the local network;
- an equipment controller to generate control information including control parameter information for controlling the equipment, the equipment identification information, and the device identification information stored in the equipment information storage and corresponding to the equipment identification information;
- a first encapsulator to generate control notification information by encapsulating the control information and adding first header information for specifying the control device as a sending destination; and
- a first notification information sender to send, based on the first header information, the control notification information to the control device.

12. A terminal device comprising:
- an equipment information storage to store equipment table information in which equipment identification information unique to an equipment is associated with device identification information, the equipment identification information identifying the equipment on a datalink layer within a local network to which the equipment belongs, the device identification information identifying a control device to control the equipment on the datalink layer within the local network;
an equipment controller to generate control information including control parameter information for controlling the equipment, the equipment identification information, and the device identification information stored in the equipment information storage and corresponding to the equipment identification information;
a first encapsulator to generate control notification information by encapsulating the control information and adding first header information for specifying the control device as a sending destination; and
a first notification information sender to send, based on the first header information, the control notification information to the control device.

13. A control device comprising:
a first decapsulator to, when control notification information generated by adding first header information to control information including (i) control parameter information for controlling an equipment, (ii) equipment identification information unique to the equipment, and (iii) device identification information is received from a server, remove the first header information and decapsulate the control notification information to extract the control information, the first header information being for specifying the control device as a sending destination, the equipment identification information identifying the equipment on a datalink layer within a local network to which the equipment belongs, the device identification information identifying the control device to control the equipment on the datalink layer within the local network; and
an equipment electronic message sender to send, based on the equipment identification information included in the control information, the control information to the equipment.

14. A control device comprising:
a mode switcher to perform switching to a server connection mode in which control notification information sent from a server is acquirable and switching to a terminal device connection mode in which the control notification information sent from a terminal device is acquirable, the control notification information being generated by adding first header information to control information including (i) control parameter information for controlling an equipment, (ii) equipment identification information unique to the equipment, and (iii) device identification information, the first header information being for specifying the control device as a sending destination, the equipment identification information identifying the equipment on a datalink layer within a local network to which the equipment belongs, the device identification information identifying the control device to control the equipment on the datalink layer within the local network;
a first decapsulator to, when the control notification information to which the first header information is added is received from the server or the terminal device, remove the first header information from the control notification information and decapsulate to extract the control information; and
an equipment electronic message sender to send, based on the equipment identification information included in the control information, the control information to the equipment.

15. A communication control method using (i) a control device to control an equipment and (ii) a server connected to the control device across a broadband network and configured to store equipment table information in which equipment identification information unique to the equipment is associated with device identification information, the equipment identification information identifying the equipment on a datalink layer within a local network to which the equipment belongs, the device identification information identifying the control device to control the equipment on the datalink layer within the local network, the communication control method comprising:
generating control information including control parameter information for controlling the equipment, the equipment identification information, and the device identification information stored in the server and corresponding to the equipment identification information;
generating control notification information by encapsulating the control information and adding first header information for specifying the control device as a sending destination;
sending, based on the first header information, the control notification information to the control device;
when the control notification information to which the first header information is added is received from the server, extracting the control information by removing the first header information and decapsulating the control notification information; and
sending, based on the equipment identification information included in the control information, the control information to the equipment.

16. A communication control method using (i) a control device to control an equipment, (ii) a server connected to the control device across a broadband network and configured to store equipment table information in which equipment identification information unique to the equipment is associated with device identification information, and (iii) a terminal device to store the equipment table information, the equipment identification information identifying the equipment on a datalink layer within a local network to which the equipment belongs, the device identification information identifying the control device to control the equipment on the datalink layer within the local network, the communication control method comprising:
generating, by the server, control information including control parameter information for controlling the equipment, the equipment identification information, and the device identification information stored in the server and corresponding to the equipment identification information;
generating, by the server, control notification information by encapsulating the control information and adding first header information for specifying the control device as a sending destination;
sending, by the server, based on the first header information, the control notification information to the control device;
storing, by the terminal device, equipment table information in which equipment identification information unique to the equipment is associated with the device identification information;
generating, by the terminal device, the control information;

generating, by the terminal device, control notification information by encapsulating the control information and adding first header information for specifying the control device as the sending destination;

sending, by the terminal device, based on the first header information, the control notification information to the control device;

performing, by the control device, switching to a server connection mode in which the control notification information sent from the server is acquirable and switching to a terminal device connection mode in which the control notification information sent from the terminal device is acquirable;

when the control device receives from the server the control notification information to which the first header information is added, extracting, by the control device, the control information by removing the first header information and decapsulating the control notification information; and sending, by the control device, based on the equipment identification information included in the control information, the control information to the equipment.

17. A non-transitory recording medium storing a program for causing a computer to function as:

an equipment information storage to store equipment table information in which equipment identification information unique to an equipment is associated with device identification information, the equipment identification information identifying the equipment on a datalink layer within a local network to which the equipment belongs, the device identification information identifying a control device to control the equipment on the datalink layer within the local network;

an equipment controller to generate control information including control parameter information for controlling the equipment, the equipment identification information, and the device identification information stored in the equipment information storage and corresponding to the equipment identification information;

a first encapsulator to generate control notification information by encapsulating the control information and adding first header information for specifying the control device as a sending destination; and a first notification information sender to send, based on the first header information, the control notification information to the control device.

18. A non-transitory recording medium storing a program for causing a computer to function as:

a first decapsulator to, when control notification information generated by adding first header information to control information including (i) control parameter information for controlling an equipment, (ii) equipment identification information unique to the equipment, and (iii) device identification information is received from a server, remove the first header information and decapsulate the control notification information to extract the control information, the first header information being for specifying a control device to control the equipment as a sending destination, the equipment identification information identifying the equipment on a datalink layer within a local network to which the equipment belongs, the device identification information identifying the control device on the datalink layer within the local network; and an equipment electronic message sender to send, based on the equipment identification information included in the control information, the control information to the equipment.

19. A non-transitory recording medium storing a program for causing a computer to function as:

a mode switcher to perform switching to a server connection mode in which control notification information sent from a server is acquirable and switching to a terminal device connection mode in which the control notification information sent from a terminal device is acquirable, the control notification information being generated by adding first header information to control information including (i) control parameter information for controlling an equipment, (ii) equipment identification information unique to the equipment, and (iii) device identification information, the first header information being for specifying a control device to control the equipment as a sending destination, the equipment identification information identifying the equipment on a datalink layer within a local network to which the equipment belongs, the device identification information identifying the control device on the datalink layer within the local network;

a first decapsulator to, when the control notification information to which the first header information is added is received from the server or the terminal device, remove the first header information from the control notification information and decapsulate to extract the control information; and an equipment electronic message sender to send, based on the equipment identification information included in the control information, the control information to the equipment.

* * * * *